United States Patent
Camelio et al.

(10) Patent No.: US 12,221,507 B2
(45) Date of Patent: Feb. 11, 2025

(54) MONOBIDENTATE, BIS-BIDENTATE, AND TETRABIDENTATE GUANIDINE GROUP IV TRANSITION METAL OLEFIN COPOLYMERIZATION CATALYSTS

(71) Applicant: Dow Global Technologies LLC, Midland, MI (US)

(72) Inventors: Andrew M. Camelio, Midland, MI (US); Brad C. Bailey, Midland, MI (US); Robert D. J. Froese, Midland, MI (US); Sukrit Mukhopadhyay, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 567 days.

(21) Appl. No.: 17/615,440

(22) PCT Filed: May 28, 2020

(86) PCT No.: PCT/US2020/034832
§ 371 (c)(1),
(2) Date: Nov. 30, 2021

(87) PCT Pub. No.: WO2020/243241
PCT Pub. Date: Dec. 3, 2020

(65) Prior Publication Data
US 2022/0235154 A1    Jul. 28, 2022

Related U.S. Application Data

(60) Provisional application No. 62/855,306, filed on May 31, 2019.

(51) Int. Cl.
*C08F 4/64* (2006.01)
*C08F 4/659* (2006.01)
(Continued)

(52) U.S. Cl.
CPC ...... *C08F 4/64044* (2013.01); *C08F 4/65904* (2013.01); *C08F 210/14* (2013.01); *C08F 210/16* (2013.01); *C08F 2410/01* (2013.01)

(58) Field of Classification Search
CPC ............. C08F 4/64044; C08F 4/65904; C08F 2410/01
See application file for complete search history.

(56) References Cited

U.S. PATENT DOCUMENTS

2007/0167315 A1    7/2007    Arriola et al.

FOREIGN PATENT DOCUMENTS

EP    2671639 A1    4/2012
JP    2002523571 A    7/2002
(Continued)

OTHER PUBLICATIONS

Chinese Office Action dated Nov. 23, 2023, pertaining to CN Patent Application No. 202080033291.8, 8 pgs.
(Continued)

*Primary Examiner* — Catherine S Branch
(74) *Attorney, Agent, or Firm* — Dinsmore & Shohl LLP

(57) ABSTRACT

Processes for polymerizing polyolefins include contacting ethylene and optionally one or more ($C_3$-$C_{12}$)α-olefin in the presence of a catalyst system, wherein the catalyst system comprises a metal-ligand complex having a structure according to formula (I).

(Continued)

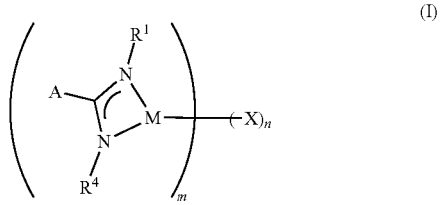

(I)

14 Claims, 4 Drawing Sheets

(51) Int. Cl.
  *C08F 210/14* (2006.01)
  *C08F 210/16* (2006.01)

(56) References Cited

FOREIGN PATENT DOCUMENTS

| | | |
|---|---|---|
| JP | 2015525268 A | 9/2015 |
| WO | 200012568 A1 | 3/2000 |
| WO | 2011102989 A1 | 8/2011 |
| WO | 2014139861 A1 | 9/2014 |

OTHER PUBLICATIONS

Bailey, Guanidinates as chelating anionic ligands for early, middle and late transition metals: syntheses, crystal structures of [Ti{n2-(NPh)2CNEt2}2C12], [Ru{n2-(NPh)2CHHPh}3] and [Pt{n2-(NPh)2-CNHP}2], Journal Chem Soc, Dalton Transations, 2000, 1887-1891.
Banerjee, Fabrication of ZrO2 and ZrN Films by Metalorganic Chemical Vapor Depositin Employing New ZR Precursors, Crystal Grow Design, 2012, 5079-5089, 12, ACS Publications.
Chen, Preparation of Zirconium Guanidinate Complexes from the Direct Insertion of a Carbondiimine and Aminolysis Using a Guanidine. Comparsion of Reactions, Organometallics, 2012, 3443-3446, 31 ACS Publications.
Coles, Exploration of the Suitability of Bicyclic Guanidinates as Ligands in Catalytic Chemistry Mediated by Titanium, Organometallics, 2003, 5201-5211, 22.
Coles, Titanium complexes incorporating bicyclic guanidinate ligands. Structure of a novel titanium-aluminium complex, J Chem Soc., Dalton Communication, 2001, 1169-1171.
Devi, Synthesis and charactersation of zirconium-amido guanidianto complex: a potential precursor for ZrO2 thin films, Dalton Transactions, 2007, 1671-1676, The Royal Society of Chemistry.
Duncan, Synthesis, Structural Investigation, and Reactivity of Neutral and Cationic Bis(guanidinateo)zirconium(IV) Complexes, Oranometallics, 2001, 1808-1819, 20.
Fernandex-Galan, Migratory Insertion Reactions in Asymmetrical Guanidinate-Supported Zirconium Complexes, Organometallics, 2012, 8360-8369, 31.
Gott, Chiral Alkoxide-Functionalized Guanidinates from Ring-Opening Rearrangement of Aminooxazaolinate Complexes, Organometallics, 2007, 136-142, 26.
Haas, A Highly Efficient Titanium Catalyst for the Synthesis of Ultrahigh-Molecular Weight Polyethylene (UHMWPE), Chem Euro Journal 2013, 9132-9136, 19.
Hirotsu, Extreme N=N Bond Elongation and Facile N-Atom Functionalization Reactions within Two Structurally Versatile new Families of Group 4 Bimetallic "Side-on-Bridged" Dinitrogen Complexes for Zirconium and Hafnium, Journal of Americal Chemical Society, 2007, 12690-12692, 129.
Kirillov, Synthesis and Structural Diversity of Group 4 Metal Complexes with Multidentate Tethered Phnoxy-Amidine and Phenoxy-Amidinate Ligands, Organometallics, 2012, 3228-3240, 31 ACS Publications.
Milanov, Guanidinate-Stabilized Monomerica Hafnium Amide Complexes as Promising Precursors for MOCD of HfO2, Inorganic Chemistry, 2006, 11008-11018, 45.
Mullins, Reactivity of a Titanium Dinitrogen Complex Supported by Guanidinate Ligands: Investigation of Solution Behavior and a Novel Rearrangement of Guanidinate Ligands, Inorganic Chemistry, 2001, 6952-6963, 40.
Obenauf, Efficient Synthesis of Aluminium-Terminated Polyethylene by Means of Irreversible Coordinative Chain-Transfer Polymerisation using a Guanidinatotitanium Catalyst, European Journal of Inorganic Chemistry, 2014, 1446-1453.
Ong, Catalytic C=N Bond metathesis of carbodiimides by group 4 and 5 imido complexes supported by guanidinate ligands, Chem Community 2003, 2612-2613, The Royal Society of Chemistry.
Ong, Catalytic Constructions and Reconstruction of Guanidines: Ti-Mediated Guanylation of Amines and Transamination of Guanidines, Journal of American Chemical Society, 2003, 8100-8101, 2003, 125.
Ong, Formation of a Guanidinate-Supported Titanium Imido Complex: A Catalyst for Alkyne Hydroamination, Organometallics, 2002, 2839-2841, 21.
Ong, Transformations of Aryl Isocyanide on Guanidinate-Supported Organozirconium Complexes to Yield Terminal mido, Iminoacyl, and Enediamido Ligands, Organometallics, 2002, 1-3, 21, No. 1, American Chemical Society.
Panda, Highly Reactive Metal-Nitrogen Bond Induced C—H Bond Activation and Azametallacycle Formation, Organometallics, 2010, 34-37, 29, American Chemical Society.
Pillai, Talorized Nonostructuring of End-Group-Functionalized High-Density Polyethylene Synthesized by an Efficient Catalytic Version of Ziegler's "Aufbaureaktion", Chemistry European Journal, 2012, 13974-13978, 18.
Potts, Synthesis of Zirconium Guanidinate Complexes and the Formation of Zirconium Carbonitride via Low Pressure CVD, Organometallics 2009, 1838-1844, 28.
Shen, Reaction of [o:n5-(C-9H6)C2B9H10]Zr(NMe2)(DME) with Guanindines: Metllacarborane-Mediated C—N Bond Cleavage and 1,5-Sigmatropic Rearrangement, American Chemical Society, 2007, 12934-12935, 129.
Shen, Synthesis, Structural Characterization, and Reactivity of Group 4 Metal Complexes Derived from 1-Indenyl-1,2-carborane, Organometallics, 2008, 1157-1168, 27.
Sun, Synthesis, characterization and crystail struture of zirconium complex containing amidinate, guanidinate and amide ligand sets, Inorganica Chimica Acta 362, 2009, 4251-4254, Elsevier.
Wang, Dichlorido(N,N'-diisopropylpiperidine-1-carboximidamidato-k2N,N')titanium(IV), Acta Crystallographica, 2001, 1-10, E67, m125.
Ward, 2-Aminopyrrolines: New Chiral Amidinate Ligands and a Rigid Well-Defined Molecular Structure and Their Coordinaiton to TilV, Inorganic Chemistry, 2006, 7777-7787, 45.
Wasslen, A Family of Heteroleptic Titanium Guanidinates: Synthesis, Thermolysis, and Surface Reactivity, American Chemical Society, 2010, 1976-1982, 49 No. 4.
Xu, Heteroleptic Guanidinate- and Amidinate-Based Complexes of Hafnium as New Precursors for MOCVD of HfO2, Euro J. Inorg Chem 2010, 1679-1688.
Brazil Office Action dated Sep. 13, 2023, pertaining to BR Patent Application No. BR112021022070.4, 10 pgs.
Japanese Office Action dated May 7, 2024, pertaining to JP Patent Application No. 2021-570924, 14 pgs.
International Search Report and Written Opinion issued by the European Patent Office acting as International Searching Authority for International Patent Application PCT/US2020/034832 dated Sep. 2, 2020 (15 total pages).
Duncan, Andrew P., et al., "Synthesis, structural investigation, and reactivity of neutral and cationic bis(guanidinato) zirconium(IV) complexes," Organometallics, vol. 20, No. 9, pp. 1808-1819 (Mar. 30, 2021).

(56) References Cited

OTHER PUBLICATIONS

Coles, M. P., et al., "Exploration of the Suitability of Bicyclic Guanidinates as Ligands in Catalytic Chemistry mediated by Titanium," Organometallics, Vo. 22, No. 25, pp. 5201-5211 (Dec. 8, 2003).
JP Office Action dated Nov. 5, 2024, pertaining to JP Patent Application No. 2021-570924, 9 pgs.

Ligand 1

Ligand 2

Ligand 3

Ligand 4

Ligand 5

Ligand 6

Ligand 7

Ligand 8

Ligand 9

Ligand 10

Ligand 11

Ligand 14

Ligand 13

Ligand 12

Ligand 15

Ligand 16

Lignad 17

MONOBIDENTATE, BIS-BIDENTATE, AND TETRABIDENTATE GUANIDINE GROUP IV TRANSITION METAL OLEFIN COPOLYMERIZATION CATALYSTS

CROSS REFERENCE TO RELATED APPLICATION

This application claims priority to U.S. Provisional Patent Application No. 62/855,306, filed on May 31, 2019, the entire disclosure of which is hereby incorporated by reference.

TECHNICAL FIELD

Embodiments of the present disclosure generally relate to olefin polymerization catalyst systems and processes, and, more specifically, to the olefin polymerization catalyst systems including monobidentate, bis-bidentate, and tetradentate Group IV transition metal catalysts and to olefin polymerization processes incorporating the catalyst systems.

BACKGROUND

Olefin-based polymers such as polyethylene, ethylene-based polymers, polypropylene, and propylene-based polymers are produced via various catalyst systems. Selection of such catalyst systems used in the polymerization process of the olefin-based polymers is an important factor contributing to the characteristics and properties of such olefin based polymers.

Ethylene-based polymers are manufactured for a wide variety of articles. The polyethylene polymerization process can be varied in a number of respects to produce a wide variety of resultant polyethylene resins having different physical properties that render the various resins suitable for use in different applications. The ethylene monomers and, optionally, one or more co-monomers are present in liquid diluents (such as solvents), such as an alkane or isoalkane, for example isobutene. Hydrogen may also be added to the reactor. The catalyst systems for producing ethylene-based may typically comprise a chromium-based catalyst system, a Ziegler-Natta catalyst system, and/or a molecular (either metallocene or non-metallocene) catalyst system. The reactants in the diluent and the catalyst system are circulated at an elevated polymerization temperature around the reactor, thereby producing ethylene-based homopolymer or copolymer. Either periodically or continuously, part of the reaction mixture, including the polyethylene product dissolved in the diluent, together with unreacted ethylene and one or more optional co-monomers, is removed from the reactor. The reaction mixture, when removed from the reactor, may be processed to remove the polyethylene product from the diluent and the unreacted reactants, with the diluent and unreacted reactants typically being recycled back into the reactor. Alternatively, the reaction mixture may be sent to a second reactor, serially connected to the first reactor, where a second polyethylene fraction may be produced.

Despite the number of currently available homogeneous solution olefin polymerization catalyst systems, there is a need for high temperature polymerization catalysts that have improved molecular properties facilitating the production of high molecular weight (Mw) polymers having narrow polydispersities (PDIs), and/or high molecular weight (Mw) ethylene/comonomer copolymers having a range of comonomer incorporation (i.e. 0-20 mol % of 1-hexene or 1-octene, etc), and/or high molecular weight (Mw) polymers that can undergo chain transfer with chain transfer agents (CSAs) to produce olefin block copolymers (OBCs).

SUMMARY

Embodiments of this disclosure include polymerization processes. These polymerization processes produce ethylene-based polymers. The polymerization process comprising contacting ethylene and optionally one or more ($C_3$-$C_{12}$) α-olefin in the presence of a catalyst system, wherein the catalyst system comprises a metal-ligand complex having a structure according to formula (I):

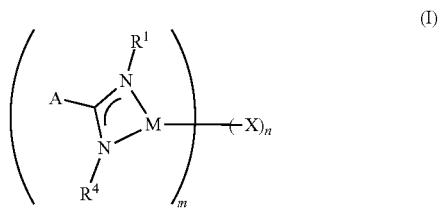

In formula (I), M is titanium, zirconium, or hafnium. Each X is a monodentate or bidentate ligand independently chosen from unsaturated ($C_2$-$C_{20}$)hydrocarbon, unsaturated ($C_2$-$C_{50}$)heterohydrocarbon, ($C_1$-$C_{50}$)hydrocarbyl, ($C_1$-$C_{50}$) heterohydrocarbyl, ($C_6$-$C_{50}$)aryl, ($C_6$-$C_{50}$)heteroaryl, cyclopentadienyl, substituted cyclopentadienyl, ($C_4$-$C_{12}$)diene, halogen, —$OR^X$, —$N(R^X)_2$, or —$NCOR^X$, wherein each $R^X$ is ($C_1$-$C_{30}$)hydrocarbyl or —H. Subscript n of $(X)_n$ is 1, 2, or 3. Subscript m is 1 or 2; and m plus n equals 3 or 4 (m+n=3 or 4).

In formula (I), each $R^1$ is $R^{1a}$ or $R^{1b}$; each $R^4$ is $R^{4a}$ or $R^{4b}$; and $R^{1a}$, $R^{1b}$, $R^{4a}$, and $R^{4b}$ are independently chosen from —H, ($C_2$-$C_{40}$)hydrocarbyl, ($C_1$-$C_{40}$)heterohydrocarbyl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, $R^CS(O)_2$—, $(R^C)_2C=N$—, $R^CC(O)O$—, $R^COC(O)$—, $R^CC(O)N(R)$—, $(R^C)_2NC(O)$—, or halogen.

In formula (I), each A is independently —$NR^2R^3$; each $R^2$ is $R^{2a}$ or $R^{2b}$; each $R^3$ is $R^{3a}$ or $R^{3b}$; $R^{2a}$, $R^{2b}$, $R^{3a}$, and $R^{3b}$ are independently —H or ($C_1$-$C_{40}$)hydrocarbyl; provided that when (1) m is 2 and (2) all of $R^{2a}$, $R^{2b}$, $R^{3a}$, and $R^{3b}$ are methyl, at least one of $R^{1a}$, $R^{1b}$, $R^{4a}$, and $R^{4b}$ is not 2-propyl; when m is 1, each X is identical; and any of $R^1$ and $R^2$, or $R^2$ and $R^3$, or $R^3$ and $R^4$ optionally may be connected to form a ring.

DETAILED DESCRIPTION

Figure 1:
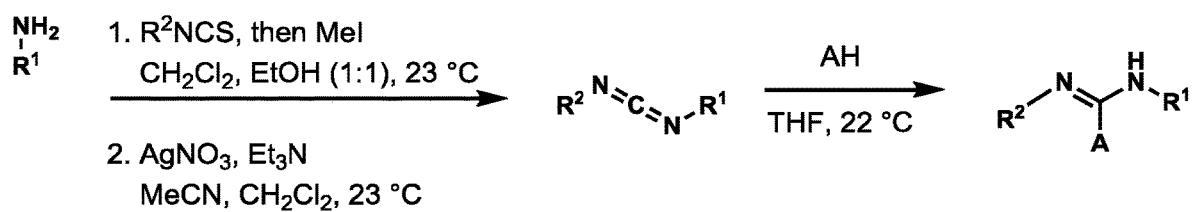
FIG. 1 is a general synthetic scheme that may be used to synthesize the ligand.
Figure 2:
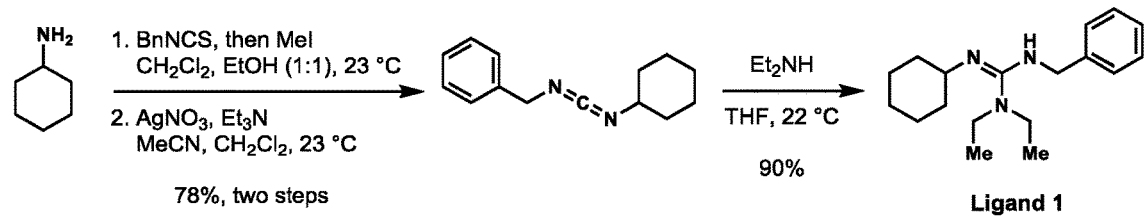
FIG. 2 is the synthetic scheme for the synthesis of Ligand 1.

Specific embodiments of catalyst systems will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Common abbreviations are listed below:

R, Z, M, X and n: as defined above; Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf: trifluoromethane sulfonate; THF: tetrahydrofuran; $Et_2O$: diethyl ether; $CH_2Cl_2$: dichloromethane; CV: column volume (used in column chromatography); EtOAc: ethyl acetate; $C_6D_6$: deuterated benzene or benzene-d6: $CDCl_3$: deuterated chloroform; $Na_2SO_4$: sodium sulfate; $MgSO_4$: magnesium sulfate; HCl: hydrogen chloride; n-BuLi: butyllithium; t-BuLi: tert-butyllithium; $Cu_2O$: Copper (I) Oxide; N,N'-DMEDA: N,N'-dimethylethylenediamine; $K_3PO_4$: Potassium phosphate tribasic; $Pd(AmPhos)Cl_2$: Bis(di-tert-butyl(4-dimethylaminophenyephosphine)dichloropalladium(II); Pd(dppf)$Cl_2$: [1,1'-Bis(diphenylphosphino)ferrocene]palladium(II) dichloride; $AgNO_3$: Silver nitrate; $K_2CO_3$: potassium carbonate; $Cs_2CO_3$: cesium carbonate; i-PrOBPin: 2-isopropoxy-4,4,5,5-tetramethyl-1,3,2-dioxaborolane; $BrCl_2CCCl_2Br$: 1,2-dibromotetrachloroethane; $HfCl_4$: hafnium(IV) chloride; $HfBn_4$: hafnium(IV) tetrabenzyl; $ZrCl_4$: zirconium(IV) chloride; $ZrBn_4$: zirconium(IV) tetrabenzyl; $ZrBn_2Cl_2(OEt_2)$: zirconium (IV) dibenzyl dichloride mono-diethyletherate; $HfBn_2Cl_2(OEt_2)$: hafnium (IV) dibenzyl dichloride mono-diethyletherate; $TiBn_4$: titanium (IV) tetrabenzyl; $Zr(CH_2SiMe_3)_4$: zirconium (IV) tetrakis-trimethylsilylmethyl; $Hf(CH_2SiMe_3)_4$: hafnium (IV) tetrakis-trimethylmethyl; $N_2$: nitrogen gas; PhMe: toluene; PPR: parallel pressure reactor; MAO: methylaluminoxane; MMAO: modified methylaluminoxane; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days; $R_f$: retention fraction; TLC; thin-layered chromatography; rpm: revolution per minute.

The term "independently selected" followed by multiple options is used herein to indicate that individual R groups appearing before the term, such as $R^1$, $R^2$, $R^3$, $R^4$, and $R^5$, can be identical or different, without dependency on the identity of any other group also appearing before the term.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "$(C_x$-$C_y)$" means that the unsubstituted form of the chemical group has from x carbon atoms to y carbon atoms, inclusive of x and y. For example, a $(C_1$-$C_{50})$alkyl is an alkyl group having from 1 to 50 carbon atoms in its unsubstituted form. In some embodiments and general structures, certain chemical groups may be substituted by one or more substituents such as $R^S$. An $R^S$ substituted version of a chemical group defined using the "$(C_x$-$C_y)$" parenthetical may contain more than y carbon atoms depending on the identity of any groups $R^S$. For example, a "$(C_1$-$C_{50})$alkyl substituted with exactly one group $R^S$, where $R^S$ is phenyl ($-C_6H_5$)" may contain from 7 to 56 carbon atoms. Thus, in general when a chemical group defined using the "$(C_x$-$C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "$(C_1$-$C_{50})$hydrocarbyl" means a hydrocarbon radical of from 1 to 50 carbon atoms and the term "$(C_1$-$C_{50})$hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a $(C_1$-$C_{50})$hydrocarbyl may be an unsubstituted or substituted $(C_1$-$C_{50})$alkyl, $(C_3$-$C_{50})$cycloalkyl, $(C_3$-$C_{20})$cycloalkyl-$(C_1$-$C_{20})$alkylene, $(C_6$-$C_{40})$aryl, or $(C_6$-$C_{20})$aryl-$(C_1$-$C_{20})$alkylene (such as benzyl ($-CH_2-C_6H_5$)).

The terms "$(C_1$-$C_{50})$alkyl" and "$(C_1$-$C_{18})$alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted $(C_1$-$C_{50})$alkyl are unsubstituted $(C_1$-$C_{20})$alkyl; unsubstituted $(C_1$-$C_{10})$alkyl; unsubstituted $(C_1$-$C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1$-$C_{40})$alkyl are substituted $(C_1$-$C_{20})$alkyl, substituted $(C_1$-$C_{10})$alkyl, trifluoromethyl, and $[C_{45}]$alkyl. The term "$[C_{45}]$alkyl." means there is a maximum of 45 carbon atoms in the radical, including substituents, and is, for example, a $(C_{27}$-$C_{40})$alkyl substituted by one $R^S$, which is a $(C_1$-$C_5)$alkyl, respectively. Each $(C_1$-$C_5)$alkyl may be methyl, trifluoromethyl, ethyl, 1-propyl, 1-methylethyl, or 1,1-dimethylethyl.

The term "$(C_6$-$C_{50})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclyc aromatic hydrocarbon radical is present, at least one of the rings of the radical is aromatic. The other ring or rings of the aromatic radical may be independently fused or non-fused and aromatic or non-aromatic. Examples of unsubstituted $(C_6$-$C_{50})$aryl include: unsubstituted $(C_6$-$C_{20})$aryl, unsubstituted $(C_6$-$C_{18})$aryl; 2-$(C_1$-$C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6$-$C_{40})$aryl include: substituted $(C_1$-$C_{20})$aryl; substituted $(C_6$-$C_{18})$aryl; 2,4-bis($[C_{20}]$alkyl)-phenyl; polyfluorophenyl; pentafluorophenyl; and fluoren-9-one-1-yl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl cyclononyl, and cyclodecyl. Examples of substituted $(C_3-C_{40})$cycloalkyl are substituted $(C_3-C_{20})$cycloalkyl, substituted $(C_3-C_{10})$, cycloalkyl, cyclopentanon-2-yl, and 1-fluorocyclohexyl.

Examples of $(C_1-C_{50})$hydrocarbylene include unsubstituted or substituted $(C_6-C_{50})$arylene, $(C_3-C_{50})$cycloalkylene, and $(C_1-C_{50})$alkylene (e.g., $(C_1-C_{20})$alkylene). The diradicals may be on the same carbon atom (e.g., —CH$_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or an α,ω-diradical, and others a 1,2-diradical. The α,ω-diradical is a diradical that has maximum carbon backbone spacing between the radical carbons. Some examples of $(C_2-C_{20})$alkylene α,ω-diradicals include ethan-1,2-diyl (i.e. —CH$_2$CH$_2$—), propan-1,3-diyl (i.e. —CH$_2$CH$_2$C$_2$—), 2-methylpropan-1,3-diyl (i.e. —CH$_2$CH(CH$_3$)CH$_2$—). Some examples of $(C_6-C_{50})$arylene α,ω-diradicals include phenyl-1,4-diyl, napthalen-2,6-diyl, or napthalen-3,7-diyl.

The term "$(C_1-C_{50})$alkylene" means a saturated straight chain or branched chain diradical (i.e., the radicals are not on ring atoms) of from 1 to 50 carbon atoms that is unsubstituted or substituted by one or more $R^S$. Examples of unsubstituted $(C_1-C_{50})$alkylene are unsubstituted $(C_1-C_{20})$alkylene, including unsubstituted —CH$_2$CH$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —CH$_2$C*HCH$_3$, and —(CH$_2$)$_4$C*(H)(CH$_3$), in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, —CF$_2$—, —C(O)—, and —(CH$_2$)$_{14}$C(CH$_3$)$_2$(CH$_2$)$_5$— (i.e., a 6,6-dimethyl substituted normal-1,20-eicosylene). Since as mentioned previously two $R^S$ may be taken together to form a $(C_1-C_{18})$ alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo [2.2.1]heptane, and 2,3-bis (methylene)bicyclo[2.2.2]octane.

The term "$(C_3-C_{50})$cycloalkylene" means a cyclic diradical (i.e., the radicals are on ring atoms) of from 3 to 50 carbon atoms that is unsubstituted or substituted by one or more $R^S$.

The term "heteroatom," refers to an atom other than hydrogen or carbon. Examples of groups containing one or more than one heteroatom include O, S, S(O), S(O)$_2$, Si(R$^C$)$_2$, P(R$^P$), N(R$^N$), —N=C(R$^C$)$_2$, —Ge(R$^C$)$_2$—, or —Si(R$^C$)—, where each R$^C$ and each R$^P$ is unsubstituted $(C_1-C_{18})$hydrocarbyl or —H, and where each R$^N$ is unsubstituted $(C_1-C_{18})$hydrocarbyl. The term "heterohydrocarbon" refers to a molecule or molecular framework in which one or more carbon atoms of a hydrocarbon are replaced with a heteroatom. The term "$(C_1-C_{50})$heterohydrocarbyl" means a heterohydrocarbon radical of from 1 to 50 carbon atoms, and the term "$(C_1-C_{50})$heterohydrocarbylene" means a heterohydrocarbon diradical of from 1 to 50 carbon atoms. The heterohydrocarbon of the $(C_1-C_{50})$heterohydrocarbyl or the $(C_1-C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The $(C_1-C_{50})$heterohydrocarbyl may be unsubstituted or substituted. Non-limiting examples of the $(C_1-C_{50})$heterohydrocarbyl include $(C_1-C_{50})$heteroalkyl, $(C_1-C_{50})$hydrocarbyl-O—, $(C_1-C_{50})$hydrocarbyl-S—, $(C_1-C_{50})$hydrocarbyl-S (O)—, $(C_1-C_{50})$hydrocarbyl-S(O)$_2$—, $(C_1-C_{50})$hydrocarbyl-Si(R$^C$)$_2$—, $(C_1-C_{50})$hydrocarbyl-N(R$^N$)—, $(C_1-C_{50})$hydrocarbyl-P(R$^P$)—, $(C_2-C_{50})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{50})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_1-C_{50})$heteroaryl" means an unsubstituted or substituted (by one or more $R^S$) mono-, bi-, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclyc heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_xC_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 6,5,6-; or 6,6,6-ring system. An example of the fused 5,6, 5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The term "$(C_1\text{-}C_{50})$heteroalkyl" means a saturated straight or branched chain radicals containing one to fifty carbon atoms, or fewer carbon atoms and one or more of the heteroatoms. The term "$(C_1\text{-}C_{50})$heteroalkylene" means a saturated straight or branched chain diradicals containing from 1 to 50 carbon atoms and one or more than one heteroatoms. The heteroatoms of the heteroalkyls or the heteroalkylenes may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, $S(O)$, and $S(O)_2$, wherein each of the heteroalkyl and heteroalkylene groups are unsubstituted or are substituted by one or more $R^S$.

Examples of unsubstituted $(C_2\text{-}C_{40})$heterocycloalkyl include unsubstituted $(C_2\text{-}C_{20})$heterocycloalkyl, unsubstituted $(C_2\text{-}C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means the anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, or (in heteroatom-containing groups) one or more carbon-nitrogen, carbon-phosphorous, or carbon-silicon double bonds, not including double bonds that may be present in substituents $R^S$, if any, or in (hetero) aromatic rings, if any.

Embodiments of this disclosure include polymerization processes. These polymerization processes produce ethylene-based polymers. The polymerization process comprising contacting ethylene and optionally one or more $(C_3\text{-}C_{12})$ α-olefin in the presence of a catalyst system, wherein the catalyst system comprises a metal-ligand complex having a structure according to formula (I):

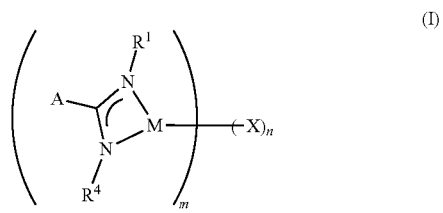

(I)

In formula (I), M is titanium, zirconium, or hafnium. Each X is a monodentate or bidentate ligand independently chosen from unsaturated $(C_2\text{-}C_{20})$hydrocarbon, unsaturated $(C_2\text{-}C_{50})$heterohydrocarbon, $(C_1\text{-}C_{50})$hydrocarbyl, $(C_1\text{-}C_{50})$heterohydrocarbyl, $(C_6\text{-}C_{50})$aryl, $(C_6\text{-}C_{50})$heteroaryl, cyclopentadienyl, substituted cyclopentadienyl, $(C_4\text{-}C_{12})$diene, halogen, $-OR^X$, $-N(R^X)_2$, or $-NCOR^X$, wherein each $R^X$ is $(C_1\text{-}C_{30})$hydrocarbyl or $-H$. Subscript n of $(X)_n$ is 1, 2, or 3. Subscript m is 1 or 2; and m plus n equals 3 or 4 (m+n=3 or 4).

In formula (I), each $R^1$ is $R^{1a}$ or $R^{1b}$; each $R^4$ is $R^{4a}$ or $R^{4b}$; and $R^{1a}$, $R^{1b}$, $R^{4a}$, and $R^{4b}$ are independently chosen from hydrogen (—H), $(C_2\text{-}C_{40})$hydrocarbyl, $(C_6\text{-}C_{40})$aryl, $(C_1\text{-}C_{40})$heterohydrocarbyl, $(C_5\text{-}C_{40})$heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $R^CS(O)_2-$, $(R^C)_2C=N-$, $R^CC(O)O-$, $R^COC(O)-$, $R^CC(O)N(R)-$, $(R^C)_2NC(O)-$, or halogen.

In formula (I), each A is independently $-NR^2R^3$; each $R^2$ is $R^{2a}$ or $R^{2b}$; each $R^3$ is $R^{3a}$ or $R^{3b}$; $R^{2a}$, $R^{2b}$, $R^{3a}$, and $R^{3b}$ are independently —H or $(C_1\text{-}C_{40})$hydrocarbyl; provided that when (1) m is 2 and (2) all of $R^{2a}$, $R^{2b}$, $R^{3a}$, and $R^{3b}$ are methyl, at least one of $R^{1a}$, $R^{1b}$, $R^{4a}$, and $R^{4b}$ is not 2-propyl; when m is 1, each X is identical; and any of $R^1$ and $R^2$, or $R^2$ and $R^3$, or $R^3$ and $R^4$ optionally may be connected to form a ring.

In some embodiments of formula (I), m is 2, n is 2, and the metal-ligand complex has a structure according to formula (II):

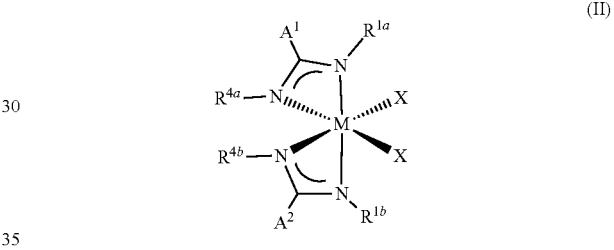

(II)

In formula (II), $R^{1a}$, $R^{1b}$, $R^{4a}$, $R^{4b}$; M and X are as defined in formula (I). $A^1$ and $A^2$ are independently A as defined in formula (I).

In one or more embodiments, in formulas (I) and (II), each $R^1$, $R^{1a}$, or $R^{1b}$ and each $R^4$, $R^{4a}$, or $R^{4b}$ are independently $(C_1\text{-}C_{40})$alkyl, $(C_1\text{-}C_{40})$heteroalkyl, $(C_6\text{-}C_{40})$aryl, or $(C_5\text{-}C_{40})$heteroaryl.

In one or more embodiments, in formulas (I) and (II), each $R^1$, $R^{1a}$, or $R^{1b}$ and each $R^4$, $R^{4a}$, or $R^{4b}$ are independently benzyl, cyclohexyl, 2,6-dimethylphenyl, tert-butyl, or ethyl.

In one or more embodiments, in formula (III), m is 2, n is 2, and $R^{4a}$ and $R^{4b}$ are covalently linked, whereby the metal-ligand complex comprises a divalent radical Q consisting of the two covalently linked groups $R^{4a}$ and $R^{4b}$. The metal-ligand complex has a structure according to formula (III):

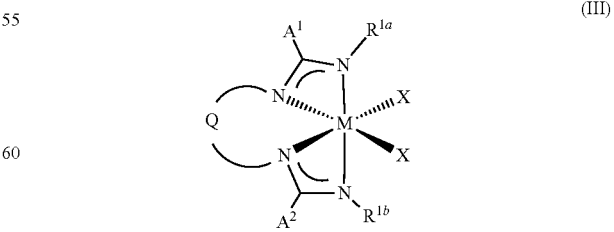

(III)

In formula (III), Q is $(C_2\text{-}C_{12})$alkylene, $(C_2\text{-}C_{12})$heteroalkylene, $(C_6\text{-}C_{50})$arylene, $(C_4\text{-}C_{50})$heteroarylene, ($-CH_2Si(R^C)_2CH_2-$), ($-CH_2CH_2Si(R^C)_2CH_2CH_2-$), ($-CH_2Ge$ ($R^C$)$_2$CH$_2$—), or (—CH$_2$CH$_2$Ge($R^C$)$_2$CH$_2$CH$_2$—); and $R^{1a}$, $R^{1b}$, M, and X are as defined in formula (I), and $A^1$ and $A^2$ are as defined in formula (II).

In one or more embodiments, in formula (III), Q is chosen from —(CH$_2$)$_x$—, where x is from 2 to 5. In some embodiments, Q is —(CH$_2$)$_4$—.

In some embodiments, in formula (III), $R^{1a}$ and $R^{1b}$ are 2-propyl or 2,6-dimethylphenyl.

In various embodiments, in formulas (I), (II), and (III), each A is a carbazolyl, imidazolyl, indolyl, pyrrolyl, or pyrazolyl. In some embodiments, each A, $A^1$ and $A^2$ is a ring structure having one of the following structures:

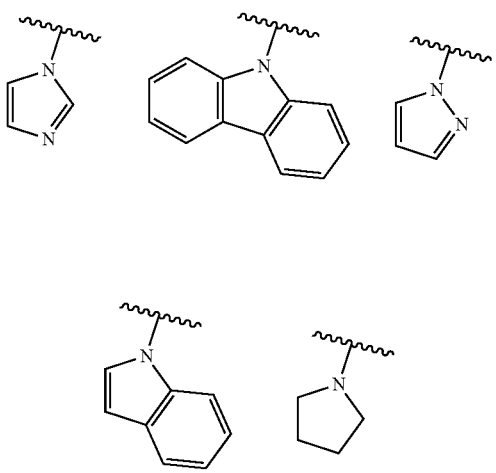

In formulas (I), (II), and (III), each A, $A^1$ and $A^2$ is independently —NR$^2$R$^3$; each $R^2$ is $R^{2a}$ or $R^{2b}$; each $R^3$ is $R^{3a}$ or $R^{3b}$. In one or more embodiments, in formulas (I), (II), and (III), $R^{2a}$, $R^{2b}$, $R^{3a}$, and $R^{3b}$ are (C$_1$-C$_{20}$)alkyl, (C$_1$-C$_{20}$)heteroalkyl, (C$_1$-C$_{20}$)aryl, or (C$_1$-C$_{20}$)heteroaryl. In some embodiments, $R^{2a}$, $R^{2b}$, $R^{3a}$, and $R^{3b}$ are methyl, ethyl, 1-propyl, 2-propyl, n-butyl, tert-butyl, 2-methylpropyl (iso-butyl), n-butyl, n-hexyl, cyclohexyl, n-octyl, or tert-octyl.

In various embodiments, in formulas (I), (II), and (III), $R^{1a}$, $R^{1b}$, $R^{4a}$, and $R^{4b}$ are independently chosen from cyclohexyl, benzyl, 2-propyl, or 2,6-dimethylphenyl.

In one or more embodiments, when $R^1$ and $R^4$ are 2-propyl, $R^2$ and $R^3$ are not methyl. In one or more embodiments, when $R^1$ and $R^4$ are 2-propyl, $R^2$ and $R^3$ are not —N(CH$_3$)$_2$. In one embodiment of formula (II), $R^{1a}$ is not covalently connected to $R^{2b}$ or $R^{3b}$ to form a ring.

In the metal-ligand complex according to formulas (I) (II), and (III), each X bonds with M through a covalent bond, a dative bond, or an ionic bond. In some embodiments, each X is identical. The metal-ligand complex has 6 or fewer metal-ligand bonds and can be overall charge-neutral or may have a positive-charge associated with the metal center. In some embodiments, the catalyst system includes a metal-ligand complex according to formula (I), in which M is zirconium or hafnium; each X is independently chosen from (C$_1$-C$_{20}$)alkyl, (C$_1$-C$_{20}$)heteroalkyl, (C$_6$-C$_{20}$)aryl, (C$_4$-C$_{20}$)heteroaryl, (C$_4$-C$_{12}$)diene, or a halogen.

In some embodiments, X is a monodentate ligand, and the monodentate ligand may be a monoanionic ligand. Monoanionic ligands have a net formal oxidation state of −1. Each monoanionic ligand may independently be hydride, (C$_1$-C$_{40}$)hydrocarbyl carbanion, (C$_1$-C$_{40}$)heterohydrocarbyl carbanion, halide, nitrate, carbonate, phosphate, sulfate, HC(O)O$^-$, HC(O)N(H)$^-$, (C$_1$-C$_{40}$)hydrocarbylC(O)O$^-$, (C$_1$-C$_{40}$)hydrocarbylC(O)N((C$_1$-C$_{20}$)hydrocarbyl)$^-$, (C$_1$-C$_{40}$)hydrocarbylC(O)N(H)$^-$, $R^K R^L B^-$, $R^K R^L N^-$, $R^K O^-$, $R^K S^-$, $R^K R^L P^-$, or $R^M R^K R^L Si^-$, where each $R^K$, $R^L$, and $R^M$ independently is hydrogen, (C$_1$-C$_{40}$)hydrocarbyl, or (C$_1$-C$_{40}$)heterohydrocarbyl, or $R^K$ and $R^L$ are taken together to form a (C$_2$-C$_{40}$)hydrocarbylene or (C$_1$-C$_{20}$)heterohydrocarbylene and is as defined above.

In other embodiments, at least one monodentate ligand X, independently from any other ligands X, may be a neutral ligand. In specific embodiments, the neutral ligand is a neutral Lewis base group such as $R^Q NR^K R^L$, $R^K OR^L$, $R^K SR^L$; or $R^Q PR^K R^L$, where each $R^Q$ independently is hydrogen, [(C$_1$-C$_{10}$)hydrocarbyl]$_3$Si(C$_1$-C$_{10}$)hydrocarbyl, (C$_1$-C$_{40}$)hydrocarbyl, [(C$_1$-C$_{10}$)hydrocarbyl]$_3$Si, or (C$_1$-C$_{40}$)heterohydrocarbyl and each $R^K$ and $R^L$ independently is as previously defined.

Additionally, each X can be a monodentate ligand that, independently from any other ligands X, is a halogen, unsubstituted (C$_1$-C$_{20}$)hydrocarbyl, unsubstituted (C$_1$-C$_{20}$)hydrocarbylC(O)O—, or $R^K R^L N$—, wherein each of $R^K$ and $R^L$ independently is an unsubstituted(C$_1$-C$_{20}$)hydrocarbyl. In some embodiments, each monodentate ligand X is a chlorine atom, (C$_1$-C$_{10}$)hydrocarbyl (e.g., (C$_1$-C$_6$)alkyl or benzyl), unsubstituted (C$_1$-C$_{10}$)hydrocarbylC(O)O—, or $R^K R^L N$—, wherein each of $R^K$ and $R^L$ independently is an unsubstituted (C$_1$-C$_{10}$)hydrocarbyl. In one or more embodiments of formula (I), (II), and (III), X is benzyl, chloro, —CH$_2$SiMe$_3$, or phenyl.

In further embodiments, each X is selected from methyl; ethyl; 1-propyl; 2-propyl; 1-butyl; 2,2,-dimethylpropyl; trimethylsilylmethyl; phenyl; benzyl; or chloro. In some embodiments, each X is the same. In other embodiments, at least two X are different from each other. In the embodiments in which at least two X are different from at least one X, X is a different one of methyl; ethyl; 1-propyl; 2-propyl; 1-butyl; 2,2,-dimethylpropyl; trimethylsilylmethyl; phenyl; benzyl; and chloro. In further embodiments, the bidentate ligand is 2,2-dimethyl-2-silapropane-1,3-diyl or 1,3-butadiene.

In some embodiments, any or all of the chemical groups (e.g., X and $R^1$-$R^4$) of the metal-ligand complex of formula (I) may be unsubstituted. In other embodiments, none, any, or all of the chemical groups X and $R^1$-$R^4$ of the metal-ligand complex of formula (I) may be substituted with one or more than one $R^S$. When two or more than two $R^S$ are bonded to a same chemical group of the metal-ligand complex of formula (I), the individual $R^S$ of the chemical group may be bonded to the same carbon atom or heteroatom or to different carbon atoms or heteroatoms. In some embodiments, none, any, or all of the chemical groups X and $R^1$-$R^4$ may be persubstituted with $R^S$. In the chemical groups that are persubstituted with $R^S$, the individual $R^S$ may all be the same or may be independently chosen.

Figure 3:
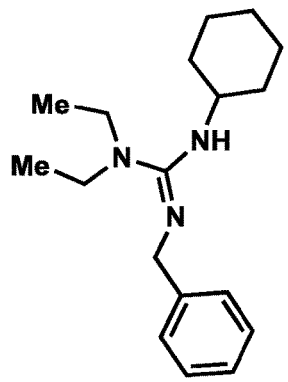
FIGS. 3-5 are structures of the ligand of this disclosure.
Figure 3:
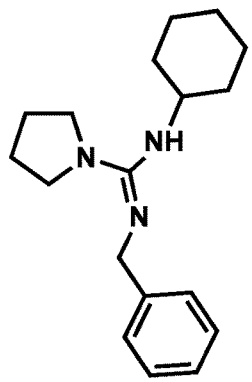
Figure 3:
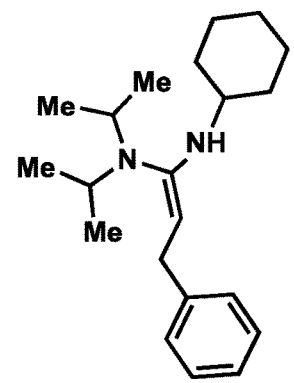
Figure 3:
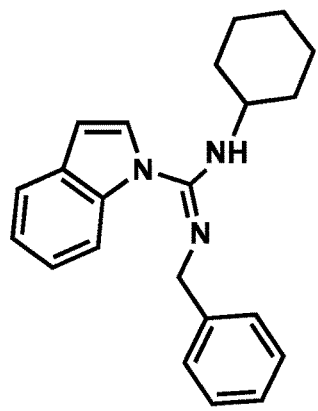
Figure 3:
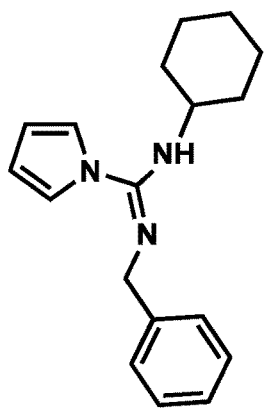
Figure 3:
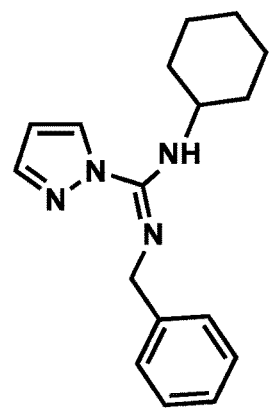
Figure 3:
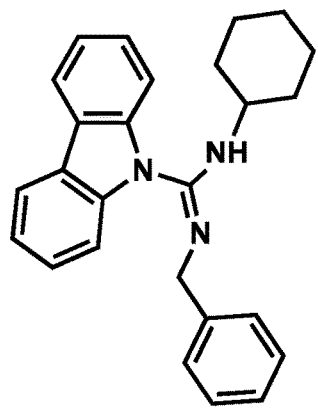
Figure 3:
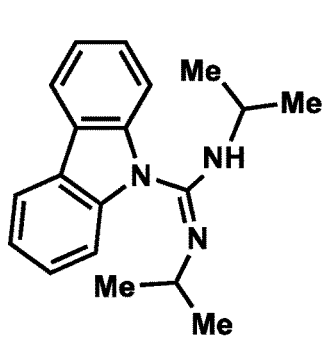
Figure 3:
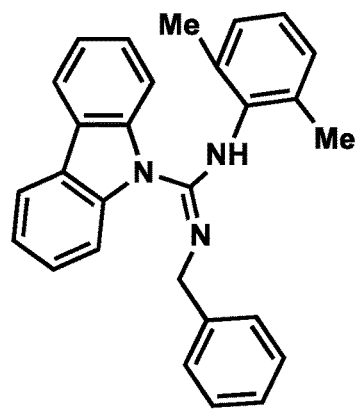
Figure 4:
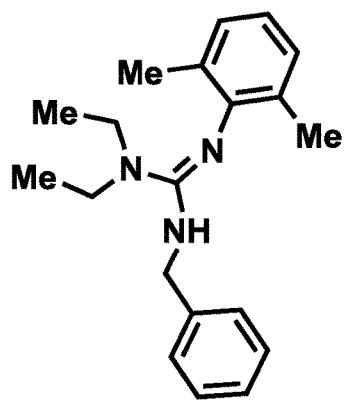
Figure 4:
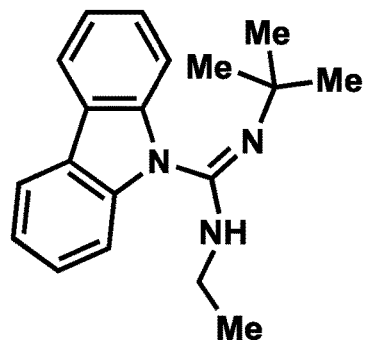
Figure 4:
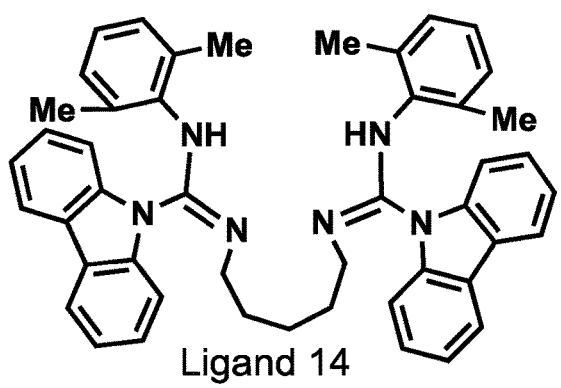
Figure 4:
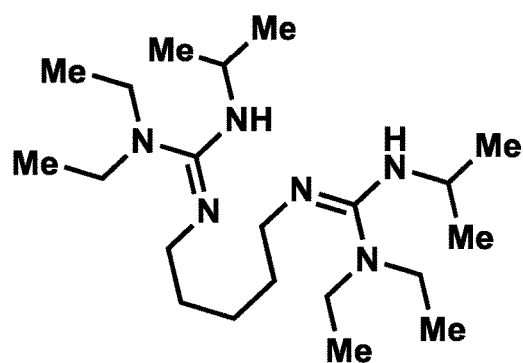
Figure 4:
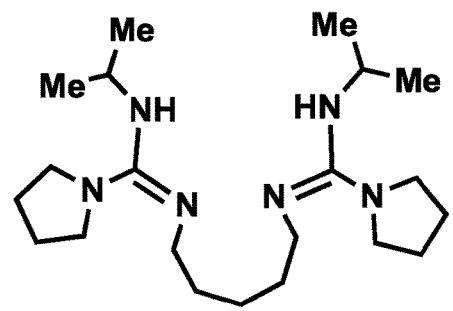
Figure 5:
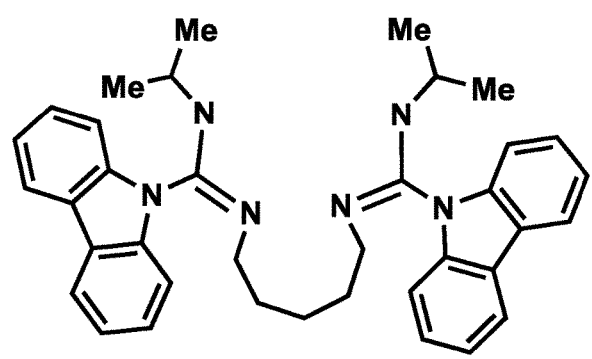
Figure 5:
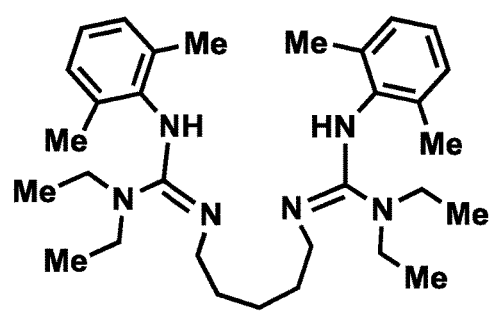
Figure 5:
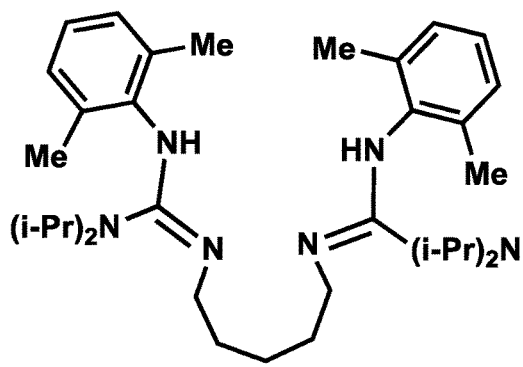

In illustrative embodiments, the catalyst systems may include a metal-ligand complex according to formula (I) having the structure of any of the Procatalysts 1-74 listed below which are synthesized from the corresponding Ligands 1-17, as shown in FIGS. 3-5:

Procatalyst 1
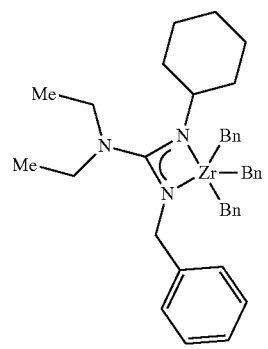
Procatalyst 2
Procatalyst 3
Procatalyst 4
Procatalyst 5
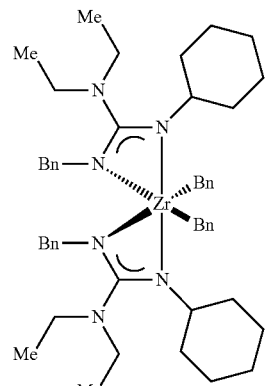
Procatalyst 6
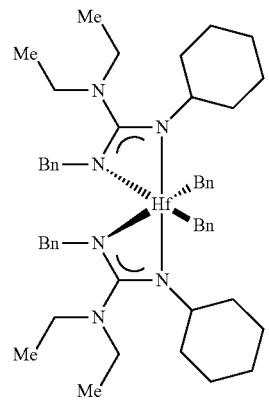
Procatalyst 7
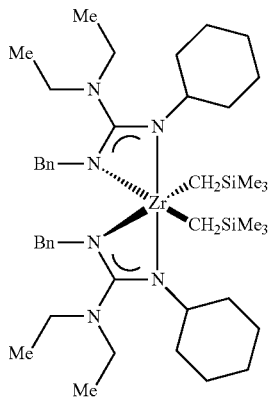
Procatalyst 8
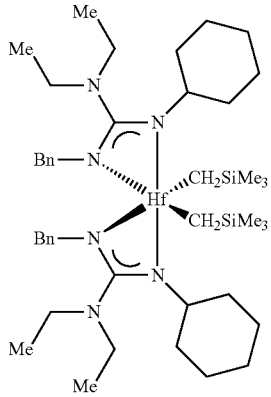

Procatalyst 9
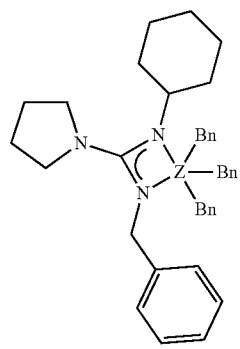
Procatalyst 10
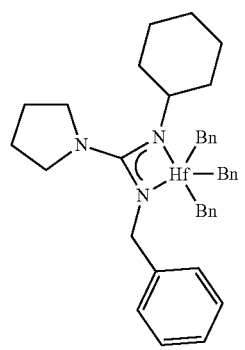
Procatalyst 11
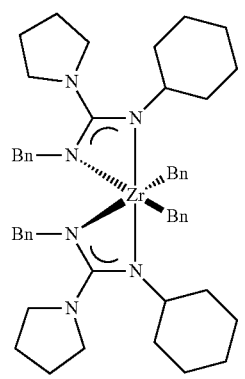
Procatalyst 12
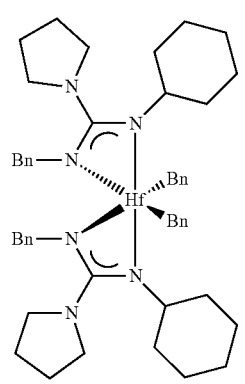
Procatalyst 13
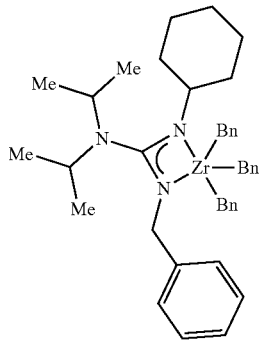
Procatalyst 14
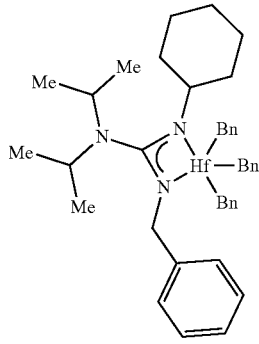
Procatalyst 15
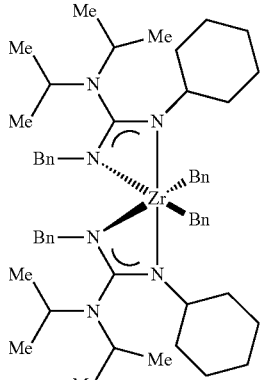
Procatalyst 16
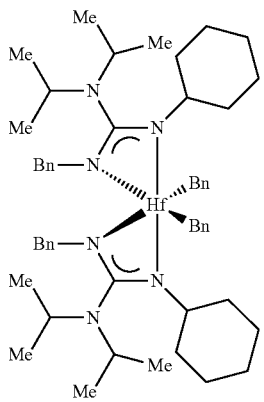

Procatalyst 17
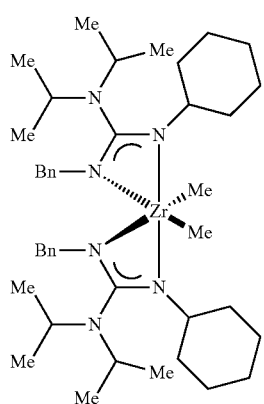
Procatalyst 18
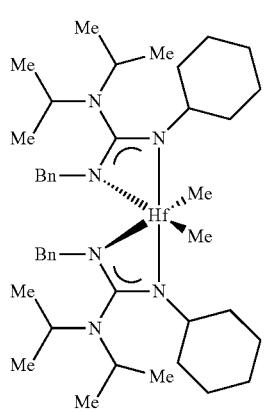
Procatalyst 19
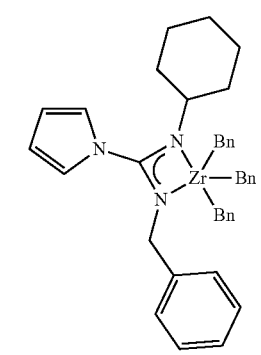
Procatalyst 20
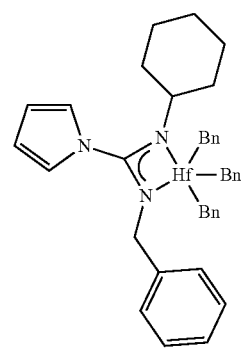
Procatalyst 21
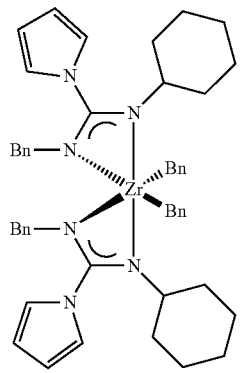
Procatalyst 22
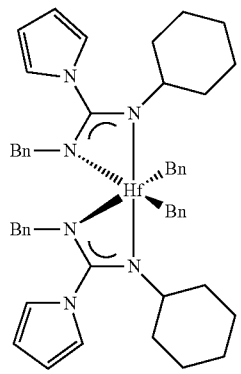
Procatalyst 23
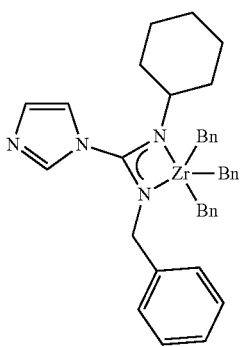
Procatalyst 24
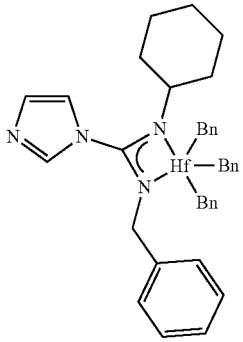

Procatalyst 25
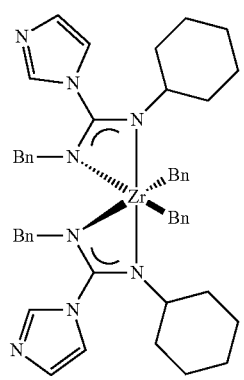
Procatalyst 26
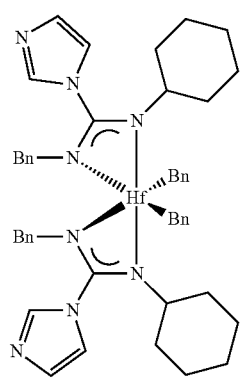
Procatalyst 27
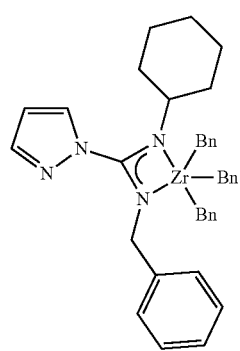
Procatalyst 28
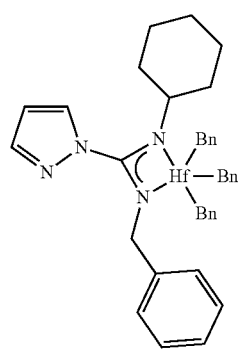
Procatalyst 29
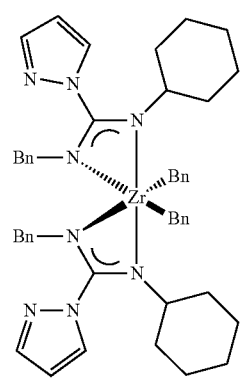
Procatalyst 30
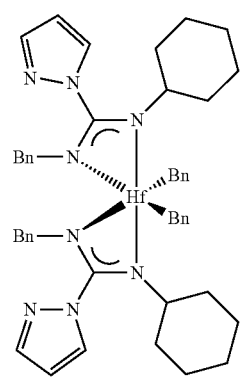
Procatalyst 31
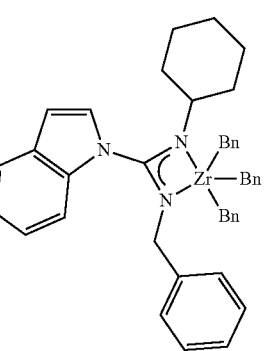
Procatalyst 32
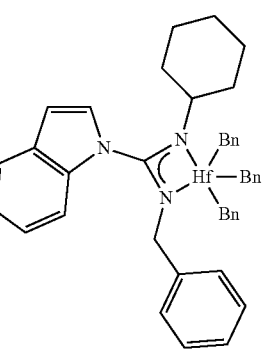

Procatalyst 33
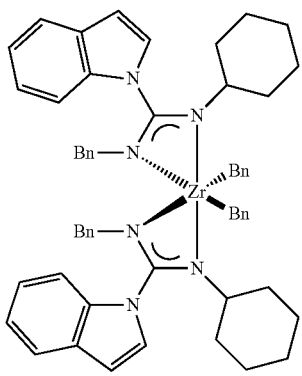
Procatalyst 34
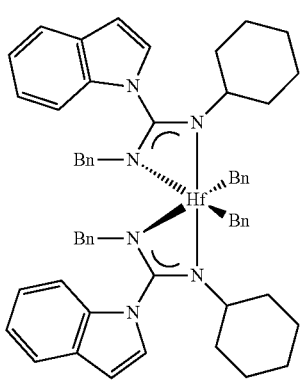
Procatalyst 35
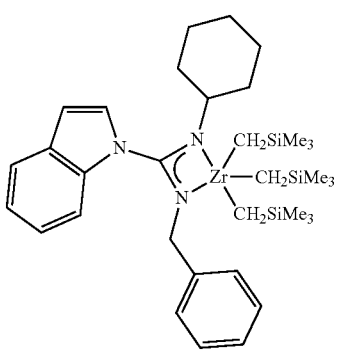
Procatalyst 36
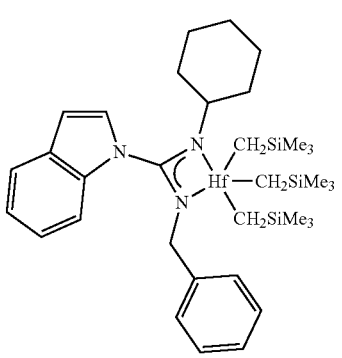
Procatalyst 37
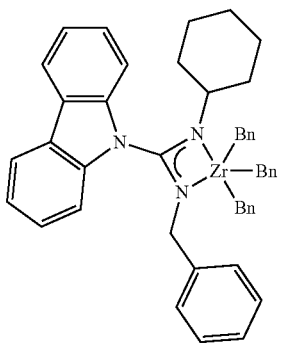
Procatalyst 38
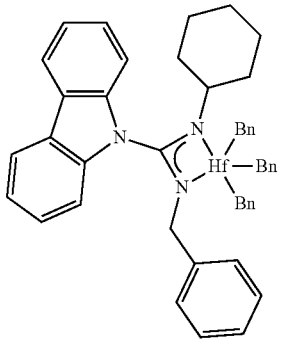
Procatalyst 39
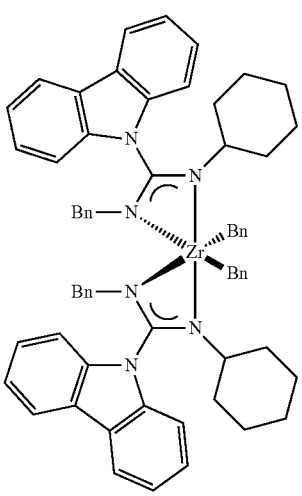

Procatalyst 40
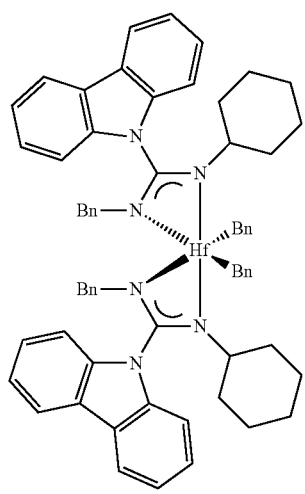
Procatalyst 41
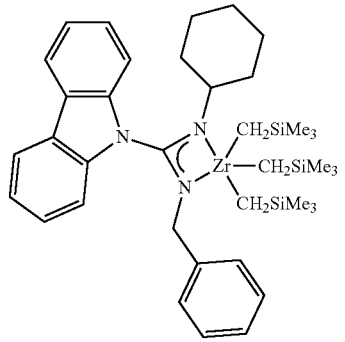
Procatalyst 42
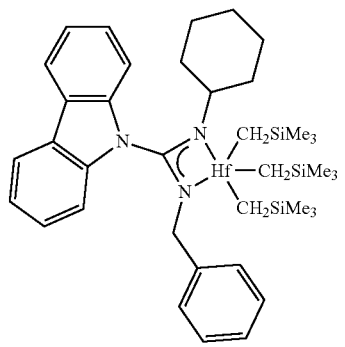
Procatalyst 43
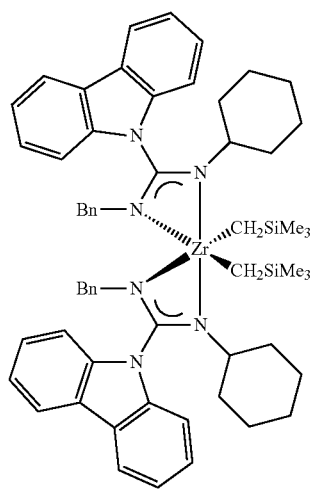
Procatalyst 44
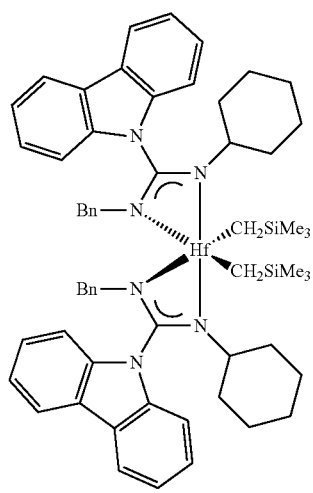
Procatalyst 45
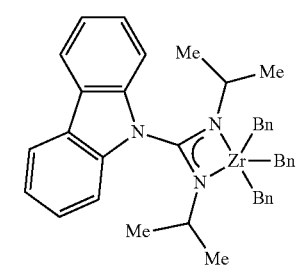
Procatalyst 46
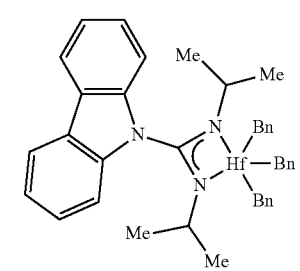

Procatalyst 47
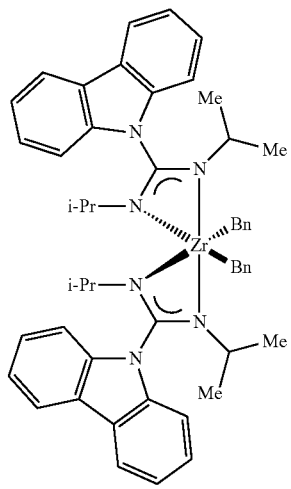
Procatalyst 48
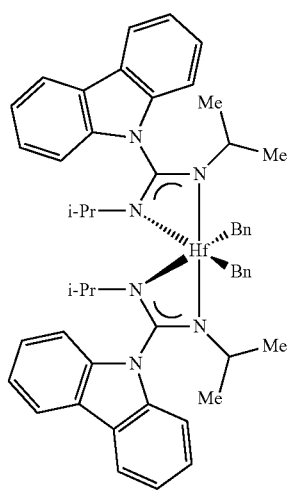
Procatalyst 49
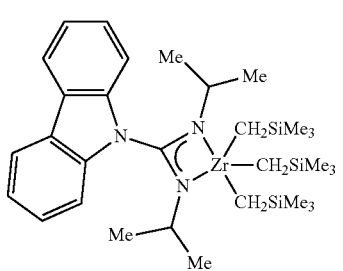
Procatalyst 50
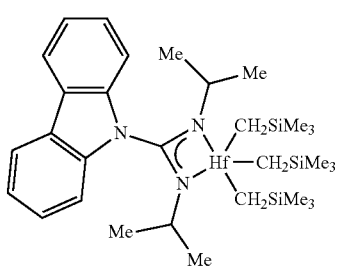
Procatalyst 51
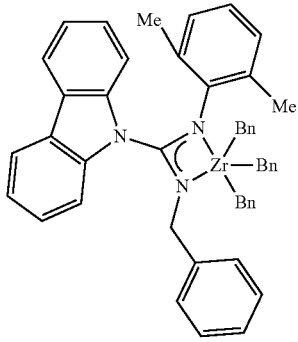
Procatalyst 52
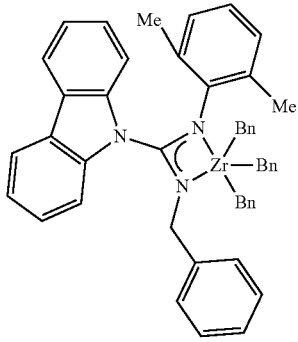
Procatalyst 53
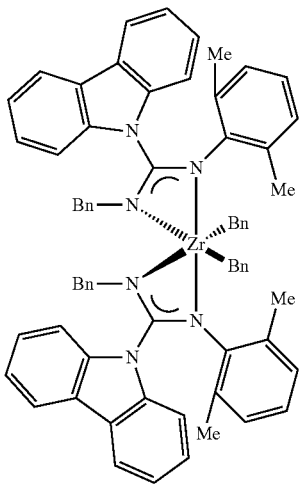

Procatalyst 54
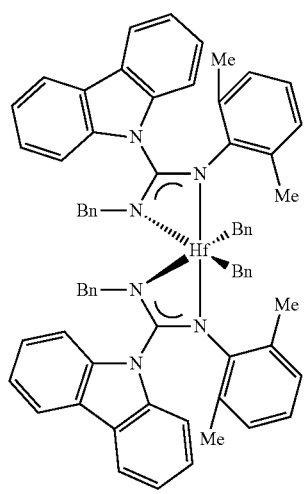
Procatalyst 55
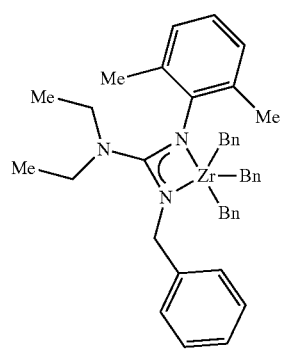
Procatalyst 56
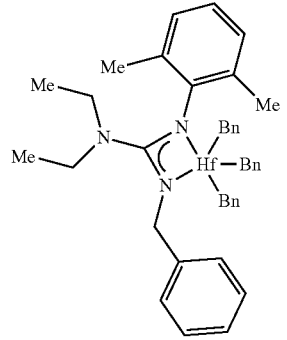
Procatalyst 57
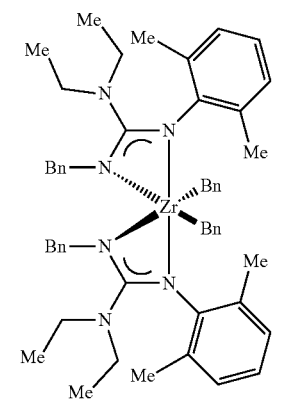
Procatalyst 58
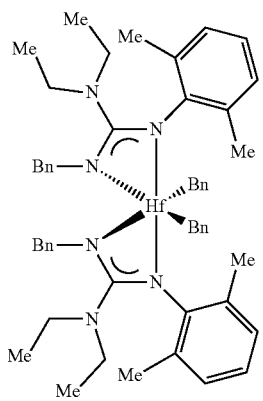
Procatalyst 59
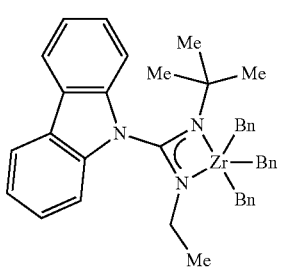
Procatalyst 60
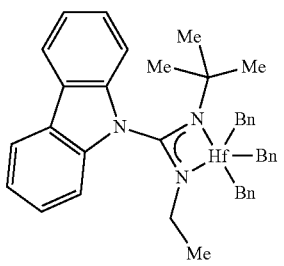
Procatalyst 61
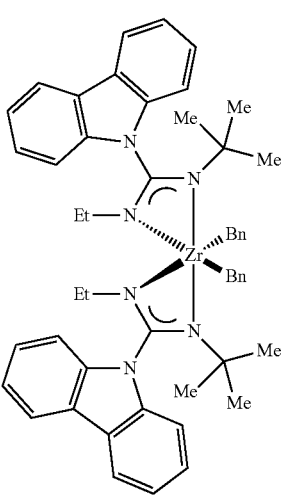

Procatalyst 62
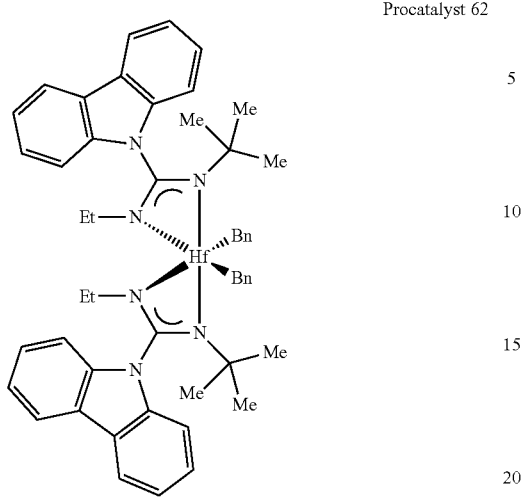
Procatalyst 63
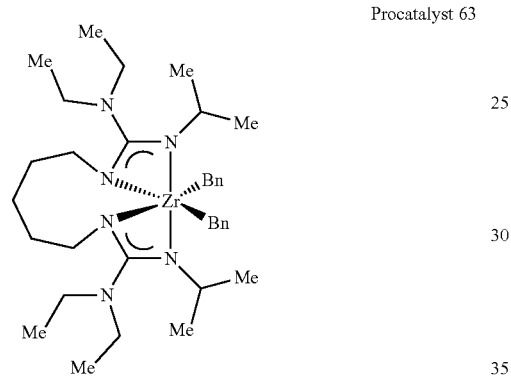
Procatalyst 64
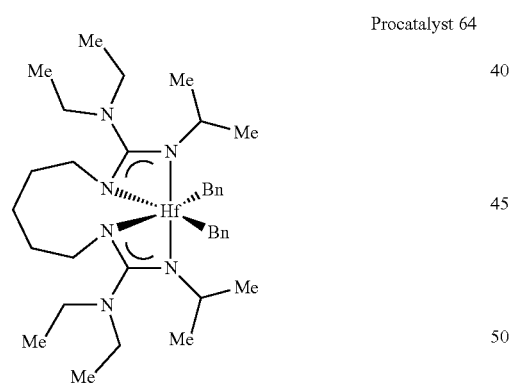
Procatalyst 65
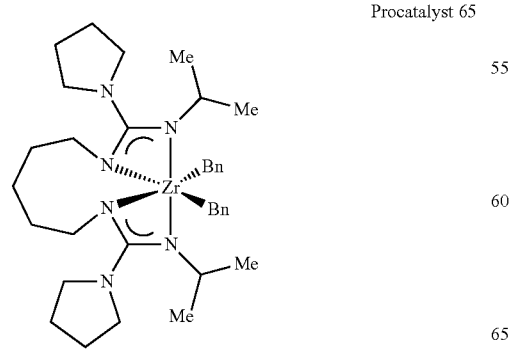
Procatalyst 66
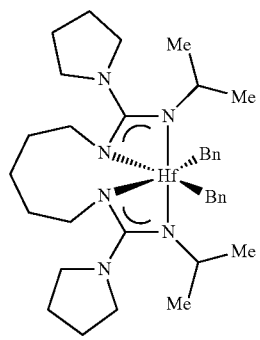
Procatalyst 67
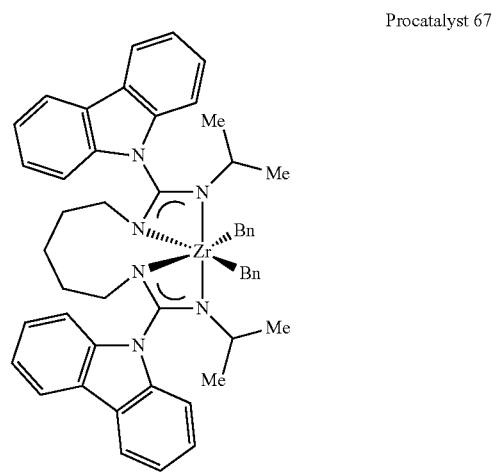
Procatalyst 68
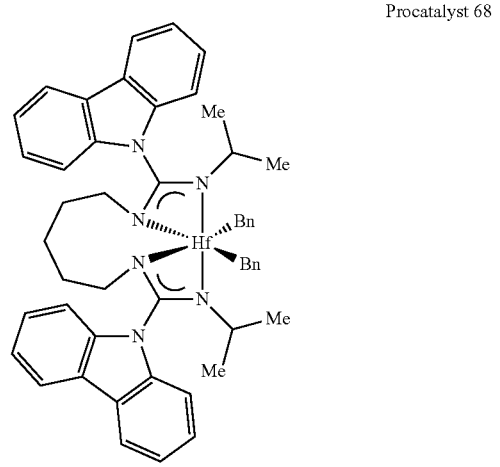

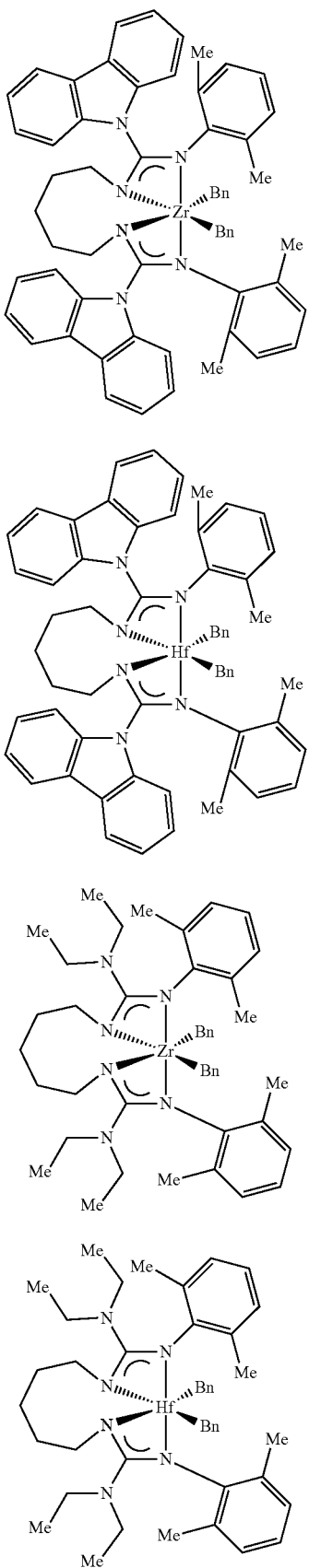

Procatalyst 69

Procataylst 70

Procataylst 71

Procataylst 72

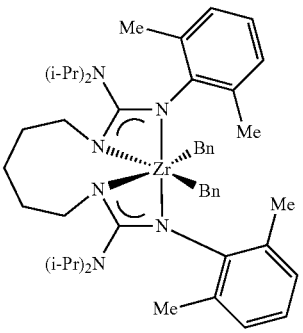

Procataylst 73

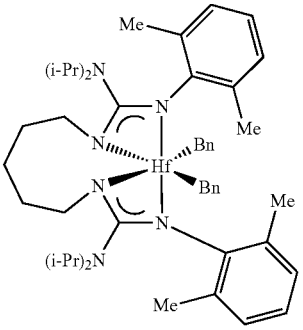

Procatalyst 74

Chain Shuttling and/or Chain Transfer Agent

In one or more embodiments, the polymerization processes of this disclosure include contacting ethylene and/or one or more $(C_3\text{-}C_{12})\alpha$-olefins in a reactor in the presence of a catalyst system and a chain transfer agent or chain shuttling agent. In such embodiments, the polymerization process includes three components: (A) a procatalyst comprising a metal-ligand complex having a structure of formula (I) and, optionally, a cocatalyst; (B) an olefin polymerization catalyst having a comonomer selectivity different from that of the procatalyst (A); and (C) the chain transfer agent or chain shuttling agent.

As additions to a catalyst system, chain transfer agents and chain shuttling agents are compounds capable of transferring polymer chains between two catalyst molecules in a single polymerization reactor. The catalyst molecules may have the same structure or different structures. When the catalyst molecules have different structures, they may have different monomer selectivites. Whether the compounds function as chain transfer agents or as chain shuttling agents depends on the type of polymerization reactor, even though the three components (A)-(C) previously described may be chemically identical in either type of polymerization reactor. For example, in a batch reactor with a single-catalyst system or a dual-catalyst system, the compounds function as chain transfer agents. In a continuous reactor with a dual-catalyst system, the compounds function as chain shuttling agents. In general, compounds that function as chain transfer agents in a batch reactor also can function as chain shuttling agents in a continuous reactor; conversely, molecules that function as chain shuttling agents also can function as chain transfer agents. Therefore, in embodiments of polymerization processes in this disclosure, it should be understood that disclosure of a compound as a "chain transfer agent" further constitutes disclosure of the same compounds as a "chain shuttling agent." Thus, the terms "chain transfer agent" and "chain shuttling agent" are interchangeable with respect to chemical compounds but are distinguishable when a process is specified to occur within a particular kind of polymerization reactor.

A catalyst's chain transfer ability is initially evaluated by running a campaign in which the level of chain transfer or shuttling agent (CSA) is varied to observe the depression in molecular weight and narrowing of the PDI expected for a shuttling catalyst. The molecular weight of the polymer generated by catalysts with potential to be good chain shuttlers will be more sensitive to the addition of CSA than the polymer molecular weight generated by catalysts exhibiting poorer shuttling or slower chain transfers kinetics. The Mayo equation (Equation 1) describes how a chain transfer agent decreases the number average chain length ($\overline{X}_n$) from the native number average chain length ($\overline{X}_{n0}$) where no chain transfer agent is present. Equation 2 defines a chain transfer or chain shuttling constant, Ca, as the ratio of chain transfer and propagation rate constants. By assuming that the vast majority of chain propagation occurs through ethylene insertion and not comonomer incorporation, Equation 3 describes the expected Mn of a polymerization. $Mn_0$ is the native molecular weight of the catalyst in the absence of chain shuttling agent and Mn is the molecular weight that is observed with chain shuttling agent (Mn=$Mn_0$ with no chain shuttling agent).

$$\frac{1}{\overline{X}_n} = \frac{1}{\overline{X}_{n_0}} + \frac{k_{tr}[\text{chain transfer agent}]}{k_p[\text{monomer}]} \quad \text{Equation 1}$$

$$Ca = \frac{k_{tr}}{k_p} \quad \text{Equation 2}$$

$$\frac{1}{Mn} = \frac{1}{Mn_0} + Ca\frac{[CSA]}{[\text{monomer}] \times 28} \quad \text{Equation 3}$$

[Monomer] = Equation 4

(Mol % C2) × [ethylene] + (Mol % C8) × [octene]

Typically, chain transfer agents comprise a metal that is Al, B, or Ga being in a formal oxidation state of +3; or a metal that is Zn or Mg being in a formal oxidation state of +2. Chain transfer agents suitable for processes of this disclosure are described in U.S. Patent Application Publication Number US 2007/0167315, which is incorporated herein by reference in its entirety.

In one or more embodiments of the polymerization process, the chain transfer agent, when present, may be chosen from diethylzinc, di(iso-butyl)zinc, di(n-hexyl)zinc, di(n-octyl)zinc, triethylaluminum, trioctylaluminum, triethylgallium, iso-butylaluminum bis(dimethyl(t-butyl)siloxane), iso-butylaluminum bis(di(trimethylsilyl)amide), n-octylaluminum di(pyridine-2-methoxide), bis(n-octadecyl) iso-butylaluminum, iso-butylaluminum bis(di(n-pentyl)amide), n-octylaluminum bis(2,6-di-t-butylphenoxide, n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), ethylzinc (t-butoxide), dimethylmagnesium, dibutylmagnesium, and n-butyl-sec-butylmagnesium.

Cocatalyst Component

The catalyst system comprising a metal-ligand complex of formula (I) may be rendered catalytically active by any technique known in the art for activating metal-based catalysts of olefin polymerization reactions. For example, the procatalyst according to a metal-ligand complex of formula (I) may be rendered catalytically active by contacting the complex to, or combining the complex with, an activating co-catalyst. Additionally, the metal-ligand complex according for formula (I) includes both a procatalyst form, which is neutral, and a catalytic form, which may be positively charged due to the loss of a monoanionic ligand, such a benzyl or phenyl. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activating co-catalysts include Group 13 metal compounds containing ($C_1$-$C_{20}$)hydrocarbyl substituents as described herein. In some embodiments, Group 13 metal compounds are tri(($C_1$-$C_{20}$)hydrocarbyl)-substituted-aluminum or tri(($C_1$-$C_{20}$)hydrocarbyl)-boron compounds. In other embodiments, Group 13 metal compounds are tri(hydrocarbyl)-substituted-aluminum, tri(($C_1$-$C_{20}$)hydrocarbyl)-boron compounds, tri(($C_1$-$C_{10}$)alkyl)aluminum, tri(($C_6$-$C_{18}$)aryl) boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris(($C_1$-$C_{20}$)hydrocarbyl borate (e.g. trityl tetrafluoroborate) or a tri(($C_1$-$C_{20}$)hydrocarbyl)ammonium tetra(($C_1$-$C_{20}$)hydrocarbyl)borane (e.g. bis(octadecyl)methylammonium tetrakis(pentafluorophenyl)borane). As used herein, the term "ammonium" means a nitrogen cation that is a (($C_1$-$C_{20}$)hydrocarbyl)$_4$N$^+$ a (($C_1$-$C_{20}$)hydrocarbyl)$_3$N(H)$^+$, a (($C_1$-$C_{20}$)hydrocarbyl)$_2$N(H)$_2^+$, ($C_1$-$C_{20}$)hydrocarbylN(H)$_3^+$, or N(H)$_4^+$, wherein each ($C_1$-$C_{20}$)hydrocarbyl, when two or more are present, may be the same or different.

Combinations of neutral Lewis acid activating co-catalysts include mixtures comprising a combination of a tri (($C_1$-$C_4$)alkyl)aluminum and a halogenated tri(($C_6$-$C_{18}$)aryl) boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of metal-ligand complex):(tris(pentafluoro-phenylborane): (alumoxane) [e.g., (Group 4 metal-ligand complex):(tris (pentafluoro-phenylborane):(alumoxane)] are from 1:1:1 to 1:10:30, in other embodiments, from 1:1:1.5 to 1:5:10.

The catalyst system that includes the metal-ligand complex of formula (I) may be activated to form an active catalyst composition by combination with one or more cocatalysts, for example, a cation forming cocatalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to modified methyl aluminoxane (MMAO), bis(hydrogenated tallow alkyl)methyl, tetrakis(pentafluorophenyl)borate(1-) amine, and combinations thereof.

In some embodiments, more than one of the foregoing activating co-catalysts may be used in combination with each other. A specific example of a co-catalyst combination is a mixture of a tri(($C_1$-$C_4$)hydrocarbyealuminum, tri(($C_1$-$C_4$)hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl) borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Polyolefins

The catalytic systems described in the preceding paragraphs are utilized in the polymerization of olefins, primarily ethylene and propylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decease, and 4-methyl-1-pentene. For example, the one or more α-olefin co-monomers may be selected from the group consisting of propylene, 1-butene, 1-hexene, and 1-octene; or in the alternative, from the group consisting of 1-hexene and 1-octene.

The ethylene based polymers, for example homopolymers and/or interpolymers (including copolymers) of ethylene and optionally one or more co-monomers such as α-olefins, may comprise from at least 50 percent by weight monomer units derived from ethylene. All individual values and subranges encompassed by "from at least 50 weight percent" are disclosed herein as separate embodiments; for example, the ethylene based polymers, homopolymers and/or interpolymers (including copolymers) of ethylene and optionally one or more co-monomers such as α-olefins may comprise at least 60 weight percent monomer units derived from ethylene; at least 70 weight percent monomer units derived from ethylene; at least 80 weight percent monomer units derived from ethylene; or from 50 to 100 weight percent monomer units derived from ethylene; or from 80 to 100 weight percent units derived from ethylene.

In some embodiments, the ethylene based polymers may comprise at least 90 mole percent units derived from ethylene. All individual values and subranges from at least 90 mole percent are included herein and disclosed herein as separate embodiments. For example, the ethylene based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments of the ethylene based polymer, the amount of additional α-olefin is less than 50%; other embodiments include at least 0.5 mole percent (mol %) to 25 mol %; and in further embodiments the amount of additional α-olefin includes at least 5 mol % to 10 mol %. In some embodiments, the additional α-olefin is 1-octene.

Any conventional polymerization processes may be employed to produce the ethylene based polymers. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene based polymer may be produced via solution polymerization in a dual reactor system, for example a dual loop reactor system, wherein ethylene and optionally one or more α-olefins are polymerized in the presence of the catalyst system, as described herein, and optionally one or more co-catalysts. In another embodiment, the ethylene based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene based polymer may be produced via solution polymerization in a single reactor system, for example a single loop reactor system, in which ethylene and optionally one or more α-olefins are polymerized in the presence of the catalyst system, as described within this disclosure, and optionally one or more cocatalysts, as described in the preceding paragraphs.

The ethylene based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene based polymers may contain any amounts of additives. The ethylene based polymers may compromise from about 0 to about 10 percent by the combined weight of such additives, based on the weight of the ethylene based polymers and the one or more additives. The ethylene based polymers may further comprise fillers, which may include, but are not limited to, organic or inorganic fillers. The ethylene based polymers may contain from about 0 to about 20 weight percent tillers such as, for example, calcium carbonate, talc, or $Mg(OH)_2$, based on the combined weight of the ethylene based polymers and all additives or fillers. The ethylene based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal-ligand complex of formula (I). The polymer resulting from such a catalyst system that incorporates the metal ligand complex of formula (I) may have a density according to ASTM D792 (incorporated herein by reference in its entirety) from 0.850 g/cm$^3$ to 0.950 g/cm$^3$, from 0.880 g/cm$^3$ to 0.920 g/cm$^3$, from 0.880 g/cm$^3$ to 0.910 g/cm$^3$, or from 0.880 g/cm$^3$ to 0.900 g/cm$^3$, for example.

In another embodiment, the polymer resulting from the catalyst system that includes the metal-ligand complex of formula (I) has a melt flow ratio ($I_{10}/I_2$) from 5 to 15, in which melt index $I_2$ is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 10, and in others, the melt flow ratio is from 5 to 9.

In some embodiments, the polymer resulting from the catalyst system that includes the metal-ligand complex of formula (I) has a molecular-weight distribution (MWD) from 1 to 25, where MWD is defined as $M_w/M_n$ with $M_w$ being a weight-average molecular weight and $M_n$ being a number-average molecular weight. In other embodiments, the polymers resulting from the catalyst system have a MWD from 1 to 6. Another embodiment includes a MWD from 1 to 3; and other embodiments include MWD from 1.5 to 2.5.

Embodiments of the catalyst systems described in this disclosure yield unique polymer properties as a result of the high molecular weights of the polymers formed and the amount of the co-monomers incorporated into the polymers.

All solvents and reagents are obtained from commercial sources and used as received unless otherwise noted. Anhydrous toluene, hexanes, tetrahydrofuran, and diethyl ether are purified via passage through activated alumina and, in some cases, Q-5 reactant. Solvents used for experiments performed in a nitrogen-filled glovebox are further dried by storage over activated 4 Å molecular sieves. Glassware for moisture-sensitive reactions is dried in an oven overnight prior to use. NMR spectra are recorded on Varian 400-MR and VNMRS-500 spectrometers. LC-MS analyses are performed using a Waters e2695 Separations Module coupled with a Waters 2424 ELS detector, a Waters 2998 PDA detector, and a Waters 3100 ESI mass detector. LC-MS separations are performed on an XBridge C18 3.5 µm 2.1×50 mm column using a 5:95 to 100:0 acetonitrile to water gradient with 0.1% formic acid as the ionizing agent. HRMS analyses are performed using an Agilent 1290 Infinity LC with a Zorbax Eclipse Plus C18 1.8 µm 2.1×50 mm column coupled with an Agilent 6230 TOF Mass Spectrometer with electrospray ionization. $^1$H NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1$H NMR data are reported in ppm downfield from internal tetramethylsilane (TMS, δ scale) using residual protons in the deuterated solvent as references. $^{13}$C NMR data are determined with $^1$H decoupling, and the chemical shifts are reported downfield from tetramethylsilane (TMS, δ scale) in ppm versus the using residual carbons in the deuterated solvent as references.

General Procedure for PPR Screening Experiments

Polyolefin catalysis screening is performed in a high throughput parallel pressure reactor (PPR) system. The PPR system is composed of an array of 48 single-cell (6×8 matrix) reactors in an inert-atmosphere glovebox. Each cell is equipped with a glass insert with an internal working liquid volume of approximately 5 mL. Each cell has independent controls for pressure, and the liquid in the cell is continuously stirred at 800 rpm. Catalyst solutions, unless otherwise noted, are prepared by dissolving an appropriate amount of a procatalyst in toluene. All liquids (for example, solvent, 1-octene, chain shuttling agent solutions as appropriate to the experiment, and catalyst solutions) are added to the single-cell reactors via robotic syringes. Gaseous reagents (i.e. ethylene, $H_2$) are added to the single-cell reactors via a gas injection port. Prior to each run, the reactors are heated to 80° C., purged with ethylene, and vented.

A portion of Isopar-E is added to the reactors. The reactors are heated to the run temperature and pressured to the appropriate psig with ethylene. Toluene solutions of reagents are added in the following order: (1) 1-octene with 500 nmol of scavenger MMAO-3A; (2) activator (cocatalyst-1, cocatalyst-2, etc); and (3) catalyst.

Each liquid addition is chased with a small amount of Isopar-E so that after the final addition, a total reaction volume of 5 mL is reached. Upon addition of the catalyst, the PPR software begins monitoring the pressure of each cell. The pressure (within approximately 2-6 psig) is maintained by the supplemental addition of ethylene gas by opening the valve at the set point minus 1 psi and closing it when the pressure reached 2 psi higher. All drops in pressure are cumulatively recorded as "Uptake" or "Conversion" of the ethylene for the duration of the run or until the uptake or conversion requested value is reached, whichever occurs first. Each reaction is quenched with the addition of 10% carbon monoxide in argon for 4 minutes at 40-50 psi higher than the reactor pressure. A shorter "Quench Time" means that the catalyst is more active. In order to prevent the formation of too much polymer in any given cell, the reaction is quenched upon reaching a predetermined uptake level (50 psig for 120° C. runs, 75 psig for 150° C. runs). After all the reactions are quenched, the reactors are allowed to cool to 70° C. The reactors are vented, purged for 5 minutes with nitrogen to remove carbon monoxide, and the tubes are removed. The polymer samples are dried in a centrifugal evaporator at 70° C. for 12 hours, weighed to determine polymer yield, and submitted for IR (1-octene incorporation) and GPC (molecular weight) analysis.

SymRAD HT-GPC Analysis

The molecular weight data is determined by analysis on a hybrid Symyx/Dow built Robot-Assisted Dilution High-Temperature Gel Permeation Chromatographer (Sym-RAD-GPC). The polymer samples are dissolved by heating for 120 minutes at 160° C. in 1,2,4-trichlorobenzene (TCB) at a concentration of 10 mg/mL stabilized by 300 parts per million (ppm) of butylated hydroxyl toluene (BHT). Each sample was diluted to 1 mg/mL immediately before the injection of a 250 µL aliquot of the sample. The GPC is equipped with two Polymer Labs PLgel 10 µm MIXED-B columns (300×10 mm) at a flow rate of 2.0 mL/minute at 160° C. Sample detection is performed using a PolyChar IR4 detector in concentration mode. A conventional calibration of narrow polystyrene (PS) standards is utilized with apparent units adjusted to homo-polyethylene (PE) using known Mark-Houwink coefficients for PS and PE in TCB at this temperature.

1-Octene Incorporation IR Analysis

The running of samples for the HT-GPC analysis precedes the IR analysis. For the IR anylsis, a 48-well HT silicon wafer is utilized for deposition and analysis of 1-octene incorporation of samples. For the analysis, the samples are heated to 160° C. for less than or equal to 210 minutes; the samples are reheated to remove magnetic GPC stir bars and are shaken with glass-rod stir bars on a J-KEM Scientific heated robotic shaker. Samples are deposited while being heated using a Tecan MiniPrep 75 deposition station, and the 1,2,4-trichlorobenzene is evaporated off the deposited wells of the wafer at 160° C. under nitrogen purge. The analysis of 1-octene is performed on the HT silicon wafer using a NEXUS 670 E.S.P. FT-IR.

Batch Reactor Polymerization Procedure

The batch reactor polymerization reactions are conducted in a 4 L Parr™ batch reactor. The reactor is heated by an electrical heating mantle, and is cooled by an internal serpentine cooling coil containing cooling water. Both the reactor and the heating/cooling system are controlled and monitored by a Camile™ TG process computer. The bottom of the reactor is fitted with a dump valve that empties the reactor contents into a stainless steel dump pot. The dump pot is prefilled with a catalyst kill solution (typically 5 mL of an Irgafos/Irganox/toluene mixture). The dump pot is vented to a 30 gallon blow-down tank, with both the pot and the tank purged with nitrogen. All solvents used for polymerization or catalyst makeup are run through solvent purification columns to remove any impurities that may affect polymerization. The 1-octene and IsoparE are passed through two columns, the first containing A2 alumina, the second containing Q5. The ethylene is passed through two columns, the first containing A204 alumina and 4 Å molecular sieves, the second containing Q5 reactant. The $N_2$, used for transfers, is passed through a single column containing A204 alumina, 4 Å molecular sieves and Q5.

The reactor is loaded first from the shot tank that may contain IsoparE solvent and/or 1-octene, depending on reactor load. The shot tank is filled to the load set points by use of a lab scale to which the shot tank is mounted. After liquid feed addition, the reactor is heated up to the polymerization temperature set point. If ethylene is used, it is added to the reactor when the ethylene is at the reaction temperature to maintain reaction pressure set point. The amount of ethylene added is monitored by a micro-motion flow meter. For some experiments, the standard conditions at 120° C. are 88 g ethylene and 568 g 1-octene in 1155 g of IsoparE, and the standard conditions at 150° C. are 81 g ethylene and 570 g 1-octene in 1043 g of IsoparE.

The procatalyst and activators are mixed with the appropriate amount of purified toluene to achieve a molarity solution. The procatalyst and activators are handled in an inert glove box, drawn into a syringe and pressure transferred into the catalyst shot tank. The syringe is rinsed three times with 5 mL of toluene. Immediately after the catalyst is added, the run timer begins. If ethylene is used, it is added by the Camile to maintain reaction pressure set point in the reactor. The polymerization reactions are run for 10 minutes, then the agitator is stopped, and the bottom dump valve is opened to empty reactor contents to the dump pot. The contents of the dump pot are poured into trays and placed in a lab hood where the solvent was evaporated off overnight. The trays containing the remaining polymer are transferred to a vacuum oven, where they are heated up to 140° C. under vacuum to remove any remaining solvent. After the trays cool to ambient temperature, the polymers were weighed for yield to measure efficiencies, and submitted for polymer testing.

EXAMPLES

Examples 1 to 45 are synthetic procedures for ligand intermediates, ligands, and isolated procatalysts. Structures of Ligands 1-17 are provided in FIGS. 3-5. Procatalysts 1 to 74 were synthesized from the Ligands 1-17. The general synthetic scheme is illustrated One or more features of the present disclosure are illustrated in view of the examples as follows:

Example 1

Synthesis of Monocarbodiimide Intermediate to Ligand 1

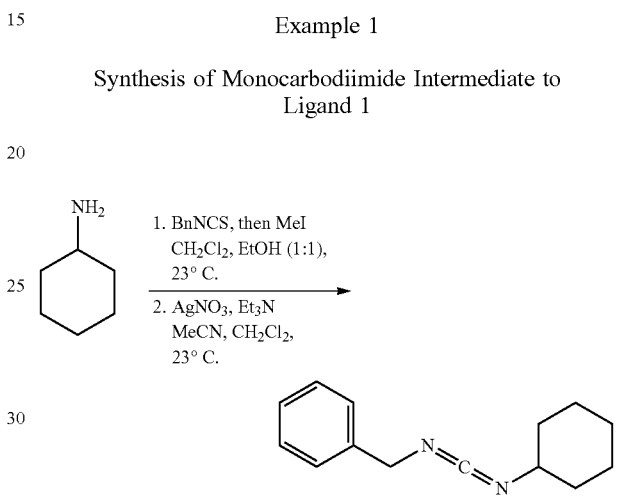

To a solution of benzylisothiocyanate (2.00 mL, 15.079 mmol, 1.00 eq) in $CH_2Cl_2$ (50 mL) was added neat cyclohexylamine (1.70 mL, 15.079 mmol, 1.00 eq) via syringe. After stirring (300 rpm) for 24 hrs at 23° C., EtOH (50 mL) was added following which iodomethane (1.40 mL, 22.620 mmol, 2.00 eq) was added. After stirring for 24 hrs at 23° C. the clear pale yellow solution was neutralized with a saturated aqueous mixture of $NaHCO_3$ (50 mL), following which aqueous NaOH (15 mL, 1 N) was added, the biphasic mixture was stirred vigorously (1000 rpm) for 2 mins, poured into a separatory funnel, partitioned, organics were washed with a saturated aqueous mixture of $NaHCO_3$ (3×25 mL), residual organics were extracted from the aqueous layer using $CH_2Cl_2$ (2×20 mL), combined, dried over solid $Na_2SO_4$, decanted, and concentrated to afford the crude methylisothiourea as a clear golden yellow oil (3.740 g, 14.252 mmol, 95%). NMR indicated product which exists as a complex mixture of isomers. The crude material was used in the subsequent reaction without purification.

To a clear golden yellow solution of the crude isothiourea (3.740 g, 14.252 mmol, 1.00 eq) and $Et_3N$ (1.586 g, 2.20 mL, 15.677 mmol, 1.10 eq) in MeCN—$CH_2Cl_2$ (150 mL, 1:1) in an oven-dried brown jar at 23° C. was added solid $AgNO_3$ (2.542 g, 14.965 mmol, 1.05 eq) all at once. After stirring (500 rpm) for 2 hrs the canary yellow heterogeneous mixture was removed diluted with hexanes (100 mL), stirred vigorously (1000 rpm) for 2 mins, suction filtered over a pad of celite, rinsed with hexanes (3×25 mL), concentrated to ~10 mL, hexanes (25 mL) was added, the dark yellow was concentrated to ~10 mL, this process was repeated 2× more to remove residual MeCN, $CH_2Cl_2$, and to triturate residual silver and ammonium salts, the resultant dark yellow-brown heterogeneous mixture was diluted with hexanes (25 mL), suction filtered through a pad of celite, rinsed with hexanes (3×25 mL), and concentrated to afford the monocarbodiimide as a clear pale yellow oil (2.510 g, 11.712 mmol, 82%). NMR indicated product.

Characterization of the Thiourea:

$^1$H NMR (500 MHz, Chloroform-d) δ 7.39-7.27 (m, 5H), 6.16 (br s, 1H), 5.79 (br s, 1H), 4.61 (br s, 2H), 3.80-3.90 (m, 1H), 1.94 (dq, J=12.6, 4.0 Hz, 2H), 1.64 (dt, J=13.8, 3.9 Hz, 2H), 1.56 (dq, J=12.2, 4.0 Hz, 1H), 1.37-1.27 (m, 2H), 1.14 (tt, J=15.3, 7.6 Hz, 3H). $^{13}$C NMR (126 MHz, Chloroform-d) δ 180.54, 136.88, 128.92, 127.92, 127.54, 52.96, 48.38, 32.69, 25.31, 24.51.

Characterization of the Methylisothiourea:

$^1$H NMR (500 MHz, Chloroform-d) δ 7.34 (dt, J=14.8, 7.6 Hz, 4H), 7.23 (t, J=7.3 Hz, 1H), 4.70-4.30 (m, 2H), 4.25-3.90 (m, 1H), 3.90-3.40 (m, 1H), 2.38 (s, 3H), 2.09-1.80 (m, 2H), 1.72 (dt, J=13.4, 4.1 Hz, 1H), 1.62 (dt, J=13.0, 4.0 Hz, 1H), 1.37 (q, J=12.5 Hz, 2H), 1.20 (q, J=12.2 Hz, 3H). $^{13}$C NMR (126 MHz, Chloroform-d) δ 150.83, 141.74, 128.23, 127.35, 126.42, 54.16, 50.70, 34.61, 25.81, 24.92, 14.44. HRMS (ESI): calc'd $C_{15}H_{22}N_2S$ [M+H]$^+$ 263.1577; found 263.1555.

Characterization of the Monocarbodiimide:

$^1$H NMR (500 MHz, Chloroform-d) δ 7.38-7.24 (m, 5H), 4.35 (s, 2H), 3.15 (dp, J=8.3, 3.8 Hz, 1H), 1.72 (ddt, J=56.9, 13.0, 4.0 Hz, 4H), 1.55-1.48 (m, 1H), 1.31-1.09 (m, 5H). $^{13}$C NMR (126 MHz, Chloroform-d) δ 140.72, 138.70, 128.55, 127.68, 127.43, 55.68, 50.72, 34.68, 25.37, 24.48. HRMS (ESI): calc'd $C_{14}H_{18}N_2$ [M+H]$^+$ as 215.1543; found 215.1536.

Example 2

Synthesis of Ligand 1

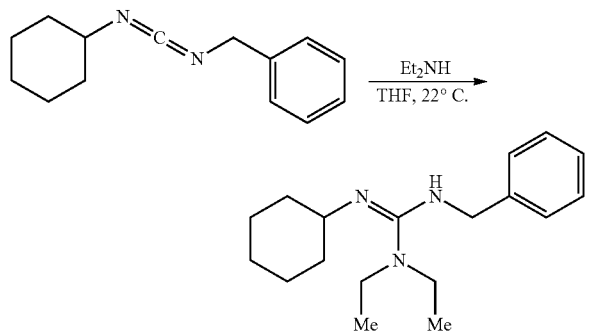

To a solution of Et$_2$NH (5.0 mL) in anhydrous deoxygenated THF (5.0 mL) in a nitrogen filled glovebox at 22° C. was added a solution of the carbodiimide (90.0 mg, 0.4200 mmol, 1.00 eq) in THF (0.90 mL) in a slow dropwise manner. After stirring (300 rpm) for 24 hrs the clear colorless solution was concentrated, suspended in hexanes (3 mL), concentrated, this suspension/concentration process was continued 3× more to remove residual Et$_2$NH and triturate insoluble impurities, the white amorphous solid was suspended in hexanes (5 mL), stirred vigorously (1000 rpm) for 2 mins, filtered through a 0.45 μm PTFE filter, rinsed with hexanes (3×5 mL), and concentrated to afford the guanidine as a clear pale yellow amorphous oil (0.109 g, 0.3792 mmol, 90%). NMR indicated product which exists as a complex mixture of isomers and tautomers.

$^1$H NMR (500 MHz, Benzene-d$_6$) δ 7.56 (d, J=7.5 Hz, 2H), 7.25 (t, J=7.6 Hz, 2H), 7.11 (d, J=10.5 Hz, 1H), 4.45-4.30 (m, 2H), 3.19 (q, J=7.1 Hz, 4H), 3.25-3.00 (m, 2H), 1.84-1.31 (m, 4H), 1.06 (q, J=13.4, 10.2 Hz, 10H), 0.81 (dq, J=74.8, 12.2 Hz, 2H). $^{13}$C NMR (126 MHz, Benzene-d$_6$) δ 155.66, 143.13, 128.11, 125.95, 53.42, 51.62, 42.74, 34.50, 25.49, 25.31, 24.89, 12.66.

Example 3

Synthesis of Ligand 2

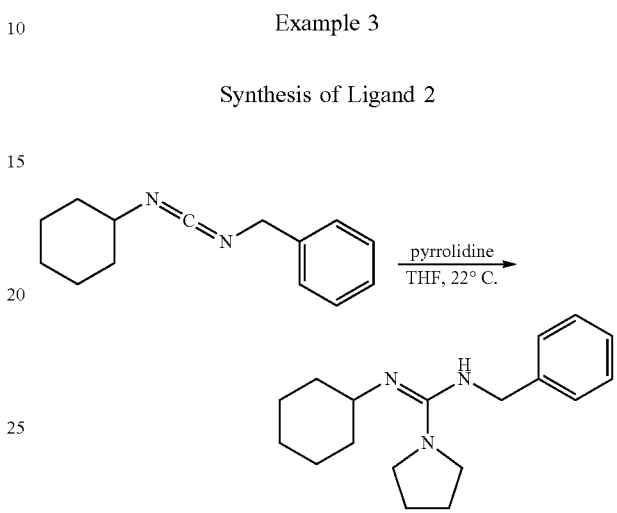

To a solution of pyrrolidine (3.0 mL) in anhydrous deoxygenated THF (2.5 mL) in a nitrogen filled glovebox at 22° C. was added a solution of the carbodiimide (50.0 mg, 0.2333 mmol, 1.00 eq) in THF (0.50 mL) in a slow dropwise manner. After stirring (300 rpm) for 24 hrs the clear colorless solution was concentrated, suspended in hexanes (3 mL), concentrated, this suspension/concentration process was continued 3× more to remove residual pyrrolidine and triturate insoluble impurities, the white amorphous solid was suspended in hexanes (5 mL), stirred vigorously (1000 rpm) for 2 mins, filtered through a 0.45 μm PTFE filter, rinsed with hexanes (3×5 mL), and concentrated to afford the guanidine as a clear pale yellow amorphous oil (55.5 mg, 0.1944 mmol, 83%). NMR indicated product which exists as a complex mixture of isomers and hydrogen bonding tautomers/isomers.

$^1$H NMR (500 MHz, Benzene-d$_6$) δ 7.62 (d, J=7.4 Hz, 2H), 7.27 (t, J=7.6 Hz, 2H), 7.20-7.05 (m, 1H), 4.55-4.35 (m, 2H), 3.45-3.27 (m, 4H), 3.26-3.17 (m, 1H), 3.10-2.94 (m, 1H), 1.86-1.68 (m, 2H), 1.56-1.41 (m, 6H), 1.40-0.71 (m, 6H). $^{13}$C NMR (126 MHz, Benzene-d$_6$) δ 154.99, 143.50, 128.07, 127.93, 125.90, 53.14, 51.67, 48.12, 34.74, 25.51, 25.30, 25.14.

Example 4

Synthesis of Ligand 3

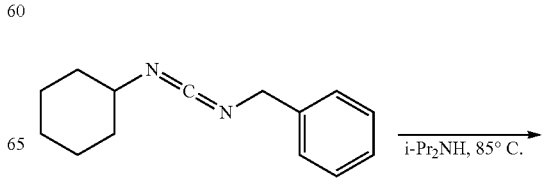

-continued

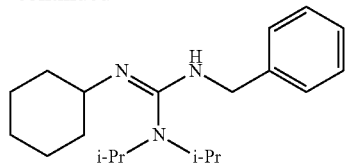

To a solution of diisopropylamine (5.0 mL) and the carbodiimide (35.0 mg, 0.1633 mmol, 1.00 eq) was placed in a mantle heated to 85° C. and after stirring (300 rpm) for 48 hrs the clear colorless solution was concentrated, suspended in hexanes (3 mL), concentrated, this suspension/concentration process was continued 3× more to remove residual diisopropylamine and triturate insoluble impurities, the white amorphous solid was suspended in hexanes (5 mL), stirred vigorously (1000 rpm) for 2 mins, filtered through a 0.45 μm PTFE filter, rinsed with hexanes (3×5 mL), and concentrated to afford the guanidine as a clear colorless amorphous oil (36.0 mg, 0.1141 mmol, 70%). NMR indicated product which exists as a complex mixture of isomers and tautomers. (*) Denotes chemical shifts of the minor isomer $^1$H NMR (500 MHz, Benzene-d$_6$) δ 7.58 (d, J=7.6 Hz, 2H), 7.24 (p, J=11.4, 9.4 Hz, 2H), 7.10 (d, J=16.5 Hz, 1H), (4.88-4.67 (m, 2H)*) 4.43-4.33 (m, 2H), (4.06-3.92 (m, 1H)*) 3.67-3.49 (m, 2H), 3.07 (br s, 1H) 3.01-2.86 (m, 1H), 2.15-1.86 (m, 2H), 1.86-1.35 (m, 4H), 1.27 (dd, J=22.4, 6.7 Hz, 12H), 1.29-1.20 (m, 2H), 1.13-0.69 (m, 2H), (0.97-0.90 (m, 12H)*). $^{13}$C NMR (126 MHz, Benzene-d$_6$) δ 155.13, 143.25, 128.10, 127.09, 125.90, (53.52*) 51.95, 49.37, 47.62 (46.99*), 34.65 (33.25*), (26.10*) 25.47 (24.92*), 21.81, 20.98.

Example 5

Synthesis of Ligand 4

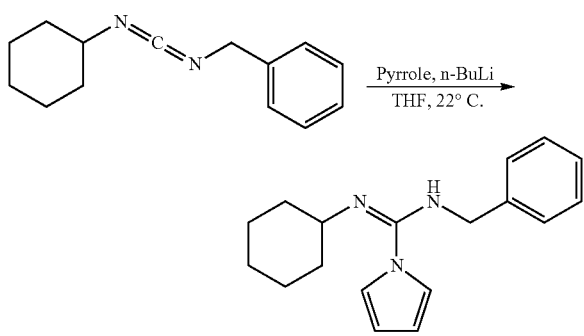

To a solution of pyrrole (16.0 μL, 0.2333 mmol, 1.00 eq) in anhydrous deoxygenated THF (2 mL) in a nitrogen filled glovebox at 22° C. was added n-BuLi (10.0 μL, 0.0233 mmol, 0.10 eq, titrated 2.40 M in hexanes) neat via syringe in a slow dropwise manner. After stirring (300 rpm) for 2 mins a solution of the carbodiimide (50.0 mg, 0.2333 mmol, 1.00 eq) in THF (0.50 mL) was added in a slow dropwise manner. After stirring for 24 hrs the pale yellow solution was concentrated, suspended in hexanes (5 mL), concentrated, this suspension/concentration process was continued 3× more to remove residual THF and pyrrole, the resultant opaque mixture was suspended in hexanes (5 mL), stirred vigorously (1000 rpm) for 1 min, filtered through a 0.45 μm PTFE filter, rinsed with hexanes (3×5 mL), and concentrated to afford the guanidine as a clear pale yellow amorphous oil (55.5 mg, 0.1972 mmol, 85%). NMR indicated product which exists a complex mixture of isomers and tautomers.

Product Exists as a Complex Mixture of Isomers and Tautomers: (*) Denotes Minor Isomer $^1$H NMR (500 MHz, Benzene-d$_6$) δ 7.40-7.30 (m, 2H), 7.29-6.92 (m, 3H), 6.69-6.58 (br s, 2H), 6.25-6.14 (br s, 2H), 4.50-4.32 (br s, 2H) (4.26 (s, 2H)*), (3.76 (s, 1H)*) 3.61-3.43 (br s, 2H), 3.30-3.13 (m, 1H), 1.98-1.83 (m, 2H), 1.73-1.16 (m, 4H), 1.16-1.04 (m, 2H), 0.99-0.53 (m, 2H). $^{13}$C NMR (126 MHz, Benzene-d$_6$) δ 142.41, (128.31*) 128.14, (127.10*) 126.08, 119.74, (110.09*) 109.26, 52.26, 50.02, (35.64*) (34.41*) 32.53, 25.74, 24.73.

Example 6

Synthesis of Ligand 5

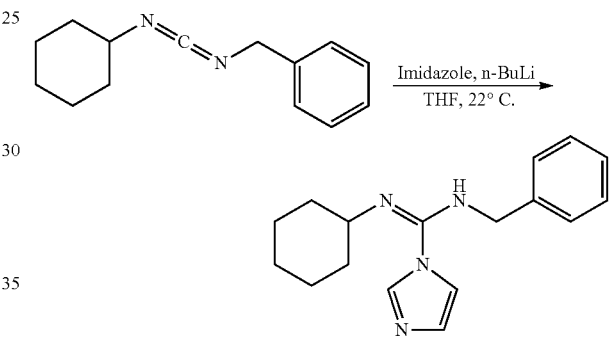

To a solution of imidazole (15.9 mg, 0.2333 mmol, 1.00 eq) in anhydrous deoxygenated THF (2 mL) in a nitrogen filled glovebox at 22° C. was added n-BuLi (5.0 μL, 0.0166 mmol, 0.05 eq, titrated 2.40 M in hexanes) neat via syringe in a slow dropwise manner. After stirring (300 rpm) for 2 mins a solution of the carbodiimide (50.0 mg, 0.2333 mmol, 1.00 eq) in THF (0.50 mL) was added in a slow dropwise manner. After stirring for 48 hrs the pale yellow solution was concentrated, suspended in PhH-hexanes (5 mL, 1:1), concentrated, this suspension/concentration process was continued 3× more to remove residual THF and pyrrolidine, the resultant opaque mixture was suspended in PhH-hexanes (5 mL, 1:1), stirred vigorously (1000 rpm) for 1 min, filtered through a 0.45 μm PTFE filter, rinsed with PhH-hexanes (3×5 mL, 1:1), and concentrated to afford the guanidine as a clear pale yellow amorphous foam (63.9 mg, 0.2263 mmol, 95%). NMR indicated product which exists as a mixture of isomers and tautomers.

Product Exists as Complex Mixture of Isomers and Tautomers: (*) Denotes Minor Isomer $^1$H NMR (400 MHz, Benzene-d$_6$) δ 7.26 (d, J=7.8 Hz, 2H), 7.19-6.95 (m, 5H), 6.57-6.48 (m, 1H), 4.23-4.14 (br s, 2H), 3.70 (br s, 1H), 3.00-2.80 (m, 1H), 1.91 (m, 2H), 1.66-1.28 (m, 4H), 1.19-0.76 (m, 4H). $^{13}$C NMR (101 MHz, Benzene-d$_6$) δ 141.65, 141.12, 135.57, 129.09, (128.29*) 128.20 (128.15*), (127.52*), 126.96, 126.27, 117.68, (56.30*) 52.13, 50.25 (45.91*), 35.40, 32.37, 25.69, 24.75 (24.23*).

Example 7

Synthesis of Ligand 6

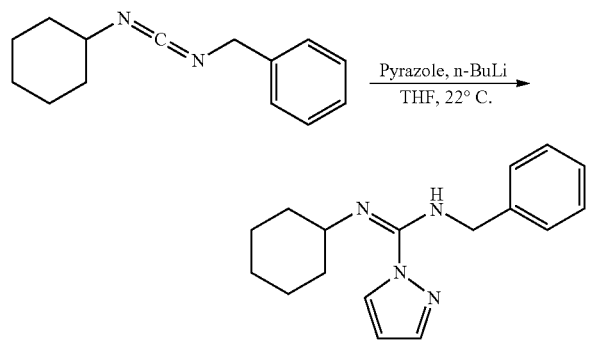

To a solution of pyrazole (15.9 mg, 0.2333 mmol, 1.00 eq) in anhydrous deoxygenated THF (2 mL) in a nitrogen filled glovebox at 22° C. was added n-BuLi (10.0 µL, 0.0233 mmol, 0.10 eq, titrated 2.40 M in hexanes) neat via syringe in a slow dropwise manner. After stirring (300 rpm) for 2 mins a solution of the carbodiimide (50.0 mg, 0.2333 mmol, 1.00 eq) in THF (0.50 mL) was added in a slow dropwise manner. After stirring for 48 hrs the pale yellow solution was concentrated, suspended in hexanes (5 mL), concentrated, this suspension/concentration process was continued 3× more to remove residual THF and pyrazole, the resultant opaque mixture was suspended in hexanes (5 mL), stirred vigorously (1000 rpm) for 1 min, filtered through a 0.45 µm PTFE filter, rinsed with hexanes (3×5 mL), and concentrated to afford the guanidine as a clear colorless amorphous oil (58.6 mg, 0.2075 mmol, 89%). NMR indicated product which exists as a complex mixture of isomers and tautomers.

Product Exists as Complex Mixture of Isomers and Tautomers: (*) Denotes Minor Isomer $^1$H NMR (400 MHz, Benzene-$d_6$) δ 8.42 (d, J=2.6 Hz, 1H), 7.46 (d, J=7.5 Hz, 2H), 7.38-6.95 (m, 3H), 6.22 (d, J=9.8 Hz, 1H), 6.03-5.91 (m, 1H) (5.91-5.80 (m, J=4.6, 2.4 Hz, 1H)*), (4.90-4.76 (d, J=15.2 Hz, 2H)*) 4.64 (s, 2H), 4.58-4.38 (m, 1H), (4.18-4.10 (m, J=6.0 Hz, 1H)*), (3.62-3.49 (m, 1H)*) 3.48-3.32 (m, 1H), 2.08-1.83 (m, 2H), 1.83-0.74 (m, 8H). $^{13}$C NMR (101 MHz, Benzene-$d_6$) δ 143.90, 142.03, (139.77*) 139.74, 129.61, 128.19, 127.26, 126.31, 107.39 (106.16*), (51.99*) 51.28, 33.81, (25.74*) 25.25, (24.59*) 24.20.

Example 8

Synthesis of Ligand 7

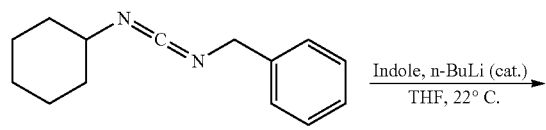

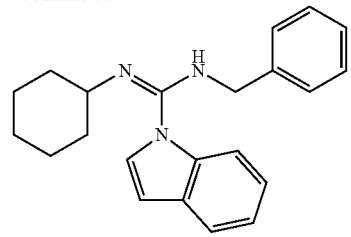

To a solution of indole (27.3 mg, 0.2333 mmol, 1.00 eq) in anhydrous deoxygenated THF (2 mL) in a nitrogen filled glovebox at 22° C. was added n-BuLi (5.0 µL, 0.0166 mmol, 0.05 eq, titrated 2.40 M in hexanes) neat via syringe in a slow dropwise manner. After stirring (300 rpm) for 2 mins a solution of the carbodiimide (50.0 mg, 0.2333 mmol, 1.00 eq) in THF (0.50 mL) was added in a slow dropwise manner. After stirring for 48 hrs the pale yellow solution was concentrated, suspended in hexanes (5 mL), concentrated, this suspension/concentration process was continued 3× more to remove residual THF and pyrrolidine, the resultant opaque mixture was suspended in hexanes (5 mL), stirred vigorously (1000 rpm) for 1 min, filtered through a 0.45 µm PTFE filter, rinsed with hexanes (3×5 mL), and concentrated to afford the guanidine as a clear pale yellow amorphous foam (73.6 mg, 0.2221 mmol, 95%). NMR indicated product exists as a complex mixture of isomers and tautomers.

Product Exists as a Complex Mixture of Isomers and Tautomers: (*) Denotes Minor Isomer $^1$H NMR (500 MHz, Benzene-$d_6$) δ 7.62-7.52 (m, 1H), 7.44-7.30 (br s, 1H), 7.30-7.06 (m, 6H), 7.06-6.98 (m, 1H), 6.85-6.71 (br s, 1H), 6.49-6.31 (br s, 1H), 4.35-4.07 (br s, 2H), (3.99-3.72 (m, 1H)*), 3.72-3.38 (m, 1H), 3.10-2.73 (m, 1H), 2.09-1.74 (m, 2H), 1.74-0.61 (m, 8H). $^{13}$C NMR (126 MHz, Benzene-$d_6$) δ 141.97, 135.45, 128.14, 127.93, 127.17, 126.17, 125.88, 123.06, 122.91, 121.08, 120.94, 111.32, 103.54, (56.36*) 52.36, 50.32 (46.12*), (35.52*) (34.07*) 32.63, (26.83*) 25.57, 24.73, (24.23*).

Example 9

Synthesis of Ligand 8

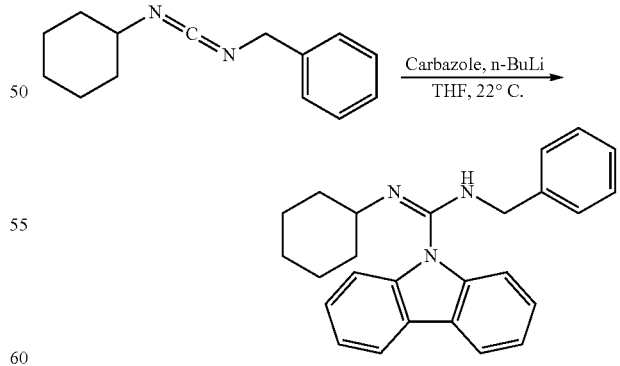

To a solution of carbazole (39.0 mg, 0.2333 mmol, 1.00 eq) in anhydrous deoxygenated THF (2 mL) in a nitrogen filled glovebox at 22° C. was added n-BuLi (10.0 µL, 0.0233 mmol, 0.10 eq, titrated 2.40 M in hexanes) neat via syringe in a slow dropwise manner. After stirring (300 rpm) for 2 mins a solution of the carbodiimide (50.0 mg, 0.2333 mmol, 1.00 eq) in THF (0.50 mL) was added in a slow dropwise manner. After stirring for 48 hrs the pale yellow solution was concentrated, suspended in hexanes (5 mL), concentrated, this suspension/concentration process was continued 3× more to remove residual THF and triturate insoluble impurities, the resultant opaque mixture was suspended in hexanes (5 mL), stirred vigorously (1000 rpm) for 1 min, filtered through a 0.45 μm PTFE filter, rinsed with hexanes (3×5 mL), and concentrated to afford the guanidine as an amorphous yellow oil (72.3 mg, 0.1887 mmol, 81%). NMR indicated product which exists as a complex mixture of isomers and tautomers.

Product Exists as a Mixture of Complex Isomers: (*) Denotes Minor Isomer $^1$H NMR (400 MHz, Benzene-d$_6$) δ 8.01-7.82 (m, 2H), 7.43-7.29 (m, 2H), 7.29-7.23 (m, 3H), 7.22-6.94 (m, 6H), 4.32-4.10 (br s, 2H) (4.05-3.84 (br s, 2H)*), 3.61-3.37 (br s, 1H), 3.07-2.82 (br s, 1H), 2.15-1.84 (m, 2H), 1.80-0.66 (m, 8H). $^{13}$C NMR (101 MHz, Benzene-d$_6$) δ 141.92, 139.10, 127.74, 127.51, 126.94, 126.34, 126.01, 123.20, 120.39, 120.27, 110.55, (56.67*) 52.66, 50.23 (46.15*), (35.48*) 32.65, 25.67, 24.80.

Example 10

Synthesis of Ligand 9

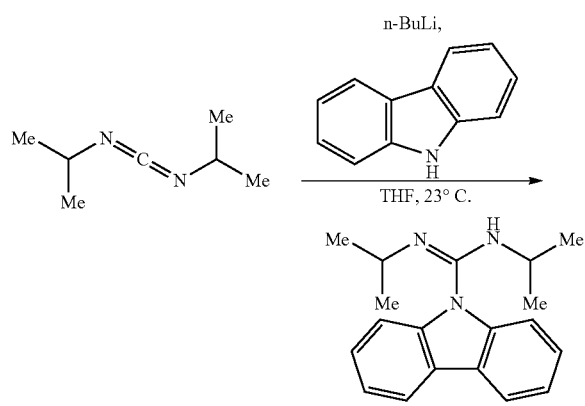

To a solution of carbazole (265.0 mg, 1.585 mmol, 1.00 eq) in anhydrous deoxygenated THF (5 mL) in a nitrogen filled glovebox at 23° C. was added n-BuLi (60.0 μL, 0.1585 mmol, 0.10 eq, titrated 2.61 M in hexanes) neat via syringe in a slow dropwise manner. After stirring (300 rpm) for 2 mins a solution of the carbodiimide (200.0 mg, 0.25 mL, 1.585 mmol, 1.00 eq) in THF (5 mL) was added in a slow dropwise manner. After stirring for 48 hrs the pale yellow solution was concentrated, suspended in hexanes (5 mL), concentrated, this suspension/concentration process was continued 3× more to remove residual THF and triturate insoluble impurities, the resultant opaque mixture was suspended in hexanes/PhH (5 mL, 2:1), stirred vigorously (1000 rpm) for 1 min, filtered through a 0.45 μm PTFE filter, rinsed with hexanes/PhH (3×5 mL, 2:1), and concentrated to afford the guanidine as an amorphous pale yellow foam (317.0 mg, 1.080 mmol, 68%). NMR indicated product which exists as a complex mixture of isomers and tautomers.

Product Exists as a Mixture of Complex Isomers: Only Major Isomer Chemical Shifts are Listed.

$^1$H NMR (500 MHz, Benzene-d$_6$) δ 8.01-7.85 (m, J=7.7 Hz, 2H), 7.46-7.24 (m, 4H), 7.23-7.13 (m, 2H), 4.35-3.95 (br s, 1H), 3.44-3.17 (m, 1H), 3.17-2.93 (br s, 1H), 1.18-0.74 (m, 12H). $^{13}$C NMR (126 MHz, Benzene-d$_6$) δ 139.46, 128.17, 126.28, 122.98, 120.42, 120.27, 110.04, 48.94, 42.96, 25.09, 21.94.

Example 11

Synthesis of Intermediates to Ligands 10 & 11

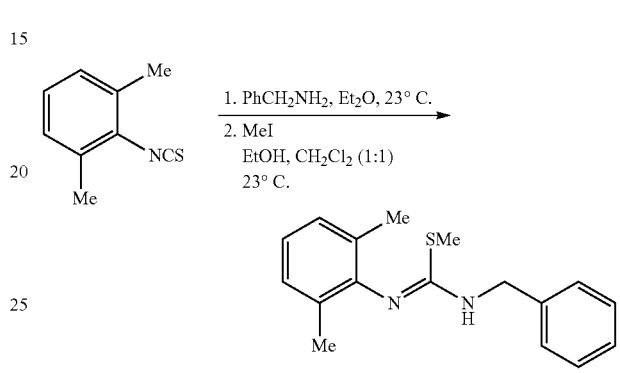

To a stirring (500 rpm) solution of the isothiocyanate (1.85 mL, 12.252 mmol, 1.00 eq) in Et$_2$O (125 mL) at 23° C. was added benzylamine (1.34 mL, 12.252 mmol, 1.00 eq) neat via syringe in a dropwise manner. After 12 hrs the clear colorless solution was concentrated to afford the thiourea as an off-white solid (3.310 g, 12.252 mmol, 100%). NMR indicated product which was used in the subsequent reaction without further purification.

To a stirring (500 rpm) solution of the thiourea (3.285 g, 12.149 mmol, 1.00 eq) in EtOH—CH$_2$Cl$_2$ (100 mL, 1:1) at 23° C. was added iodomethane (3.10 mL, 48.596 mmol, 4.00 eq) neat via syringe. After 12 hrs the clear pale yellow solution was neutralized with a saturated aqueous mixture of NaHCO$_3$ (100 mL), aqueous NaOH (15 mL, 1 N) was then added, the biphasic mixture was stirred vigorously (1000 rpm) for 2 mins, poured into a separatory funnel, partitioned, organics were washed with a saturated aqueous mixture of NaHCO$_3$ (3×50 mL), residual organics were extracted from the aqueous layer using CH$_2$Cl$_2$ (2×25 mL), combined, dried over solid Na$_2$SO$_4$, decanted, and concentrated to afford the methylisothiourea as a pale yellow solid (3.450 g, 12.149 mmol, 100%). The material was used in the subsequent reaction without further purification.

Characterization Data for the Crude Methylisothiourea:

$^1$H NMR (500 MHz, Chloroform-d) δ 7.36 (d, J=5.5 Hz, 3H), 7.33-7.27 (m, 2H), 7.04-6.98 (m, 2H), 6.87 (t, J=7.5 Hz, 1H), 4.74-4.46 (m, 3H), 2.45-2.34 (m, 3H), 2.12 (s, 6H). $^{13}$C NMR (126 MHz, Chloroform-d) δ 152.80, 146.31, 138.75, 129.32, 128.63, 127.90, 127.55, 127.45, 122.71, 47.09, 18.07, 13.80.

Characterization Data for the Thiourea:

$^1$H NMR (500 MHz, Chloroform-d) δ 7.65 (s, 1H), 7.32-7.27 (m, 2H), 7.26-7.22 (m, 3H), 7.16 (dd, J=8.5, 6.5 Hz, 1H), 7.10 (d, J=7.5 Hz, 2H), 5.72-5.54 (m, 1H), 4.85 (d, J=5.4 Hz, 2H), 2.26 (s, 6H). $^{13}$C NMR (126 MHz, Chloroform-d) δ 181.26, 137.63, 137.30, 132.68, 129.04, 128.67, 127.63, 127.51, 49.17, 18.10.

Example 12

Synthesis of the Monocarbodiimide Intermediate to Ligands 10 & 11

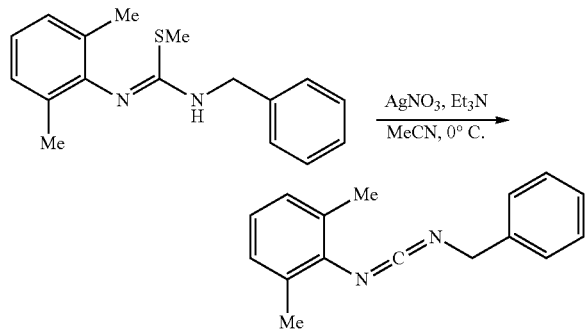

A solution of the thioguanidine (3.698 g, 13.002 mmol, 1.00 eq) and Et₃N (4.00 mL, 28.604 mmol, 2.20 eq) in MeCN (130 mL) in an oven-dried brown jar protected from light was placed in an ice water bath for 30 mins upon which solid AgNO₃ (4.528 g, 26.654 mmol, 2.05 eq) was added all at once. After stirring (500 rpm) for 2 hrs hexanes (150 mL) was added to the canary yellow heterogeneous mixture, stirred vigorously (1000 rpm) for 2 mins, suction filtered over a pad of celite, concentrated to ~10 mL, further diluted with hexanes (50 mL), concentrated to ~10 mL, this process was repeated 3× more to remove residual MeCN, the now yellow heterogeneous mixture was diluted with hexanes (50 mL), suction filtered over a pad of celite, and concentrated to afford the monocarbodiimide as a clear pale yellow oil (1.781 g, 7.536 mmol, 58%). NMR indicated product.

$^1$H NMR (400 MHz, Chloroform-d) δ 7.39 (d, J=4.3 Hz, 4H), 7.35-7.29 (m, 1H), 7.00 (d, J=7.9 Hz, 2H), 6.93 (dd, J=8.5, 6.3 Hz, 1H), 4.55 (s, 2H), 2.26 (s, 6H). $^{13}$C NMR (101 MHz, Chloroform-d) δ 138.04, 136.34, 134.33, 132.32, 128.67, 128.07, 127.62, 127.50, 124.27, 50.57, 18.84.

Example 13

Synthesis of Ligand 10

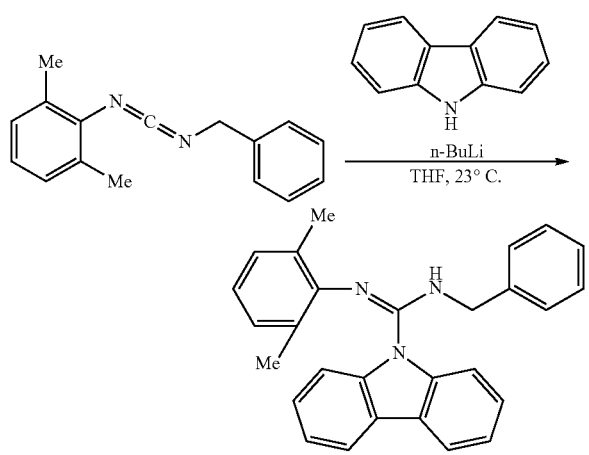

To a solution of carbazole (0.144 g, 0.6094 mmol, 1.00 eq) in anhydrous deoxygenated THF (5 mL) in a nitrogen filled glovebox at 23° C. was added n-BuLi (25.0 μL, 0.0609 mmol, 0.10 eq, titrated 2.50 M in hexanes) neat via syringe in a slow dropwise manner. After stirring (300 rpm) for 2 mins a solution of the carbodiimide (0.102 g, 0.6094 mmol, 1.00 eq) in THF (5 mL) was added in a slow dropwise manner. After stirring for 48 hrs the pale yellow solution was concentrated, suspended in hexanes/PhMe (5 mL, 1:1), concentrated, this suspension/concentration process was continued 3× more to remove residual THF and triturate insoluble impurities, the resultant opaque mixture was suspended in hexanes/PhMe (5 mL, 1:1), stirred vigorously (1000 rpm) for 1 min, filtered through a 0.45 μm PTFE filter, rinsed with hexanes/PhH (3×5 mL, 1:1), and concentrated to afford the guanidine as an amorphous pale yellow foam (0.197 g, 0.4875 mmol, 80%). NMR indicated product which exists as a mixture of isomers and tautomers.

Product Exists as a Mixture of Isomers: Only Major Isomer Chemical Shifts are Listed.

$^1$H NMR (500 MHz, Benzene-d₆) δ 8.05-7.79 (m, 4H), 7.40-7.24 (m, 2H), 7.24-7.09 (m, 4H), 7.09-6.69 (m, 6H), 4.64-4.31 (br s, 1H), 3.60-3.30 (br s, 2H), 2.15 (s, 6H). $^{13}$C NMR (126 MHz, Benzene-d₆) δ 145.15, 139.53, 128.49, 128.32, 128.14, 127.95, 127.25, 126.30, 125.50, 124.41, 123.39, 123.28, 120.99, 120.13, 112.48, 47.76, 18.55.

Example 14

Synthesis of Ligand 11

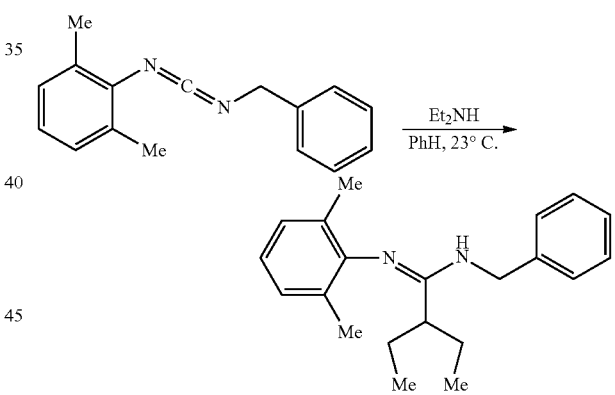

To a solution of Et₂NH (5.0 mL) in anhydrous deoxygenated THF (5.0 mL) in a nitrogen filled glovebox at 22° C. was added a solution of the carbodiimide (0.144 g, 0.6094 mmol, 1.00 eq) in anhydrous deoxygenated benzene (1.0 mL) in a slow dropwise manner. After stirring (300 rpm) for 48 hrs the clear colorless solution was concentrated, suspended in hexanes (3 mL), concentrated, this suspension/concentration process was continued 3× more to remove residual Et₂NH and triturate insoluble impurities, the clear golden yellow foam was suspended in hexanes (5 mL), stirred vigorously (1000 rpm) for 2 mins, filtered through a 0.45 μm PTFE filter, rinsed with hexanes (3×5 mL), and concentrated to afford the guanidine as a clear golden yellow amorphous oil (0.118 g, 0.3813 mmol, 63%). NMR indicated product.

$^1$H NMR (500 MHz, Benzene-d₆) δ 7.07-7.03 (m, 2H), 7.02-6.97 (m, 2H), 6.97-6.92 (m, 1H), 6.90-6.81 (m, 3H), 3.81 (d, J=6.4 Hz, 2H), 3.63-3.56 (m, 1H), 3.09 (q, J=7.1 Hz, 4H), 2.16 (s, 6H), 1.00 (t, J=7.0 Hz, 6H). $^{13}$C NMR (126 MHz, Benzene-d$_6$) δ 152.67, 147.85, 139.70, 129.14, 128.26, 128.14, 126.91, 123.27, 121.47, 48.19, 42.60, 18.50, 12.79.

Example 15

Synthesis of Ligand 12

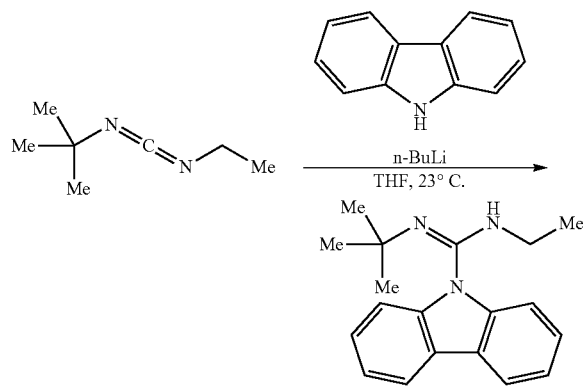

To a solution of carbazole (0.265 g, 1.585 mmol, 1.00 eq) in anhydrous deoxygenated THF (5 mL) in a nitrogen filled glovebox at 23° C. was added n-BuLi (63.0 μL, 0.1585 mmol, 0.10 eq, titrated 2.50 M in hexanes) neat via syringe in a slow dropwise manner. After stirring (300 rpm) for 2 mins a solution of the carbodiimide (0.25 mL, 1.585 mmol, 1.00 eq) in THF (5 mL) was added in a slow dropwise manner. After stirring for 48 hrs the pale yellow solution was concentrated, suspended in hexanes/PhMe (5 mL, 1:1), concentrated, this suspension/concentration process was continued 3× more to remove residual THF and triturate insoluble impurities, the resultant opaque mixture was suspended in hexanes/PhMe (5 mL, 1:1), stirred vigorously (1000 rpm) for 1 min, filtered through a 0.45 μm PTFE filter, rinsed with hexanes/PhH (3×5 mL, 1:1), and concentrated to afford the guanidine as an amorphous pale yellow foam (0.395 g, 1.347 mmol, 85%). NMR indicated product which exists as a mixture of isomers and tautomers.
Product Exists as a Mixture of Isomers: Only Major Isomer Chemical Shifts are Listed.

$^1$H NMR (400 MHz, Benzene-d$_6$) δ 7.92 (dt, J=7.8, 1.0 Hz, 2H), 7.37 (d, J=8.2 Hz, 2H), 7.29 (ddd, J=8.2, 7.1, 1.2 Hz, 2H), 7.15 (ddd, J=8.1, 7.1, 1.1 Hz, 2H), 3.63-3.44 (br s, 1H), 2.93-2.75 (m, 2H), 1.24 (s, 9H), 1.01-0.90 (m, 3H). $^{13}$C NMR (101 MHz, Benzene-d$_6$) δ 139.49, 139.23, 126.27, 122.94, 120.41, 120.25, 110.31, 50.71, 43.62, 28.21, 17.20.

Example 16

Synthesis of Intermediate to Ligands 13, 14, & 15

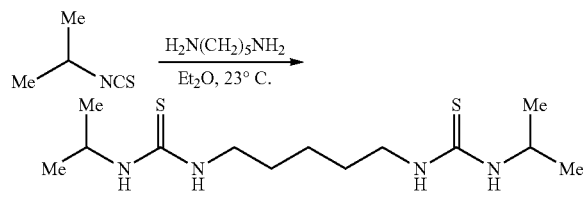

To a vigorously stirring (1000 rpm) solution of the isothiocyanate (2.11 mL, 19.77 mmol, 2.00 eq) in anhydrous ethyl ether (50 mL) at 23° C. under nitrogen was added a solution of cadaverine (1.16 mL, 9.88 mmol, 1.00 eq) neat dropwise via syringe over 2 mins. The clear colorless solution instantly changed to a white heterogeneous mixture which was vigorously (1000 rpm) stirred for 12 hrs upon which an aliquot was removed, concentrated, and NMR indicated product. The white mixture was concentrated to afford the bisthiourea (3.01 g, 9.88 mmol, 100%). NMR indicated product. The material was used in the subsequent reaction without further purification.

$^1$H NMR (400 MHz, DMSO-d$_6$) δ 7.16 (br s, 2H), 7.09 (br s, 2H), 4.18 (br s, 2H), 3.33-3.24 (m, 4H), 1.43 (p, J=7.3 Hz, 4H), 1.21 (tt, J=8.2, 6.0 Hz, 2H), 1.05 (dd, J=6.5, 0.9 Hz, 12H). $^{13}$C NMR (101 MHz, DMSO-d$_6$) δ 181.25, 45.21, 43.72, 29.03, 24.29, 22.79. HRMS (ESI): calc'd C$_{13}$H$_{28}$N$_4$S$_2$ [M+H]$^+$ as 305.2255; found 305.2285.

Example 17

Synthesis of Intermediate to Ligands 13, 14 & 15

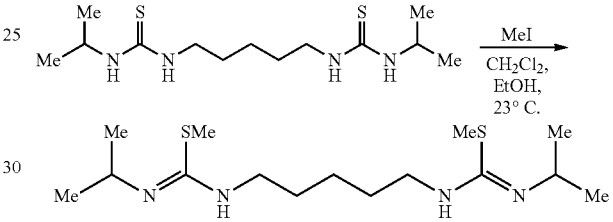

To a mixture of the bisthiourea (850.0 mg, 2.79 mmol, 1.00 eq) in CH$_2$Cl$_2$ and ethanol (40 mL, 1:1) at 23° C. was added iodomethane (0.70 mL, 11.16 mmol, 4.00 eq). The white mixture was stirred (300 rpm) for 12 hrs, the now clear colorless homogeneous solution was neutralized with an aqueous saturated mixture of NaHCO$_3$ (60 mL) and CH$_2$Cl$_2$ (20 mL), the white mixture was stirred vigorously (1000 rpm) for 5 mins, and then an aqueous solution of NaOH (10 mL, 1 N) was added. The now clear colorless biphasic mixture was poured into a separatory funnel, partitioned, and the organics were washed with an aqueous saturated mixture of NaHCO$_3$ (3×20 mL). Residual organics were back extracted from the aqueous with CH$_2$Cl$_2$ (3×10 mL), combined, washed with brine (20 mL), dried over solid Na$_2$SO$_4$, decanted, and concentrated to afford the isothiourea as an off-white solid (866.7 mg, 2.61 mmol, 94%). NMR of the solid indicated product. The material was used in the subsequent reaction without further purification.

$^1$H NMR (400 MHz, Chloroform-d) δ 3.82 (br s, 3H), 3.23 (br s, 5H), 2.32 (br s, 6H), 1.57 (p, J=7.3 Hz, 4H), 1.47-1.34 (m, 2H), 1.11 (d, J=6.3 Hz, 12H). $^{13}$C NMR (126 MHz, Chloroform-d) δ 149.84, 46.11, 30.63, 24.95, 23.78, 23.59, 14.35. HRMS (ESI): calc'd C$_{15}$H$_{32}$N$_4$S$_2$ [M+H]$^+$ as 333.2630; found 333.2634.

Example 18

Synthesis of Intermediate to Ligands 13, 14, & 15

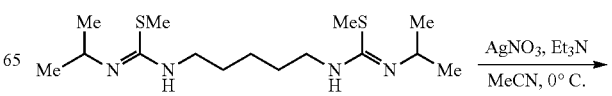

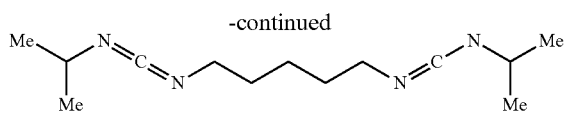

A solution of the bismethylisothiourea (2.363 g, 7.105 mmol, 1.00 eq) and Et₃N (2.10 mL, 14.921 mmol, 2.10 eq) in non-anhydrous acetonitrile (140 mL) in a brown jar protected from light was placed in an ice water bath for 20 mins upon which solid AgNO₃ (2.474 g, 14.565 mmol, 2.05 eq) was added all at once. After stirring (500 rpm) for 2 hrs the yellow heterogeneous mixture was diluted with hexanes (100 mL), stirred vigorously (1000 rpm) for 2 mins, suction filtered cold through a pad of celite, rinsed with hexanes (4×20 mL), the resultant golden yellow filtrate solution was concentrated to ~10 mL, hexanes (50 mL) was added, concentrated to ~10 mL, this process was repeated 3× more to remove residual acetonitrile and triturate residual solid impurities, hexanes (50 mL) was added, the mixture was suction filtered through a pad of celite, and concentrated to afford the biscarbodiimide as a clear colorless oil (1.558 g, 6.590 mmol, 93%). NMR indicated product.

¹H NMR (500 MHz, Chloroform-d) δ 3.56 (hept, J=6.4 Hz, 2H), 3.22 (t, J=6.8 Hz, 4H), 1.68-1.51 (m, 4H), 1.51-1.37 (m, 2H), 1.22 (d, J=6.4 Hz, 12H). ¹³C NMR (126 MHz, Chloroform-d) δ 140.12, 48.91, 46.65, 30.90, 24.59, 24.11. HRMS (ESI): calc'd C₁₃H₂₄N₄ [M+H]⁺ as 237.2035; found 237.2027.

Example 19

Synthesis of Ligand 13

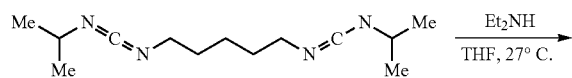

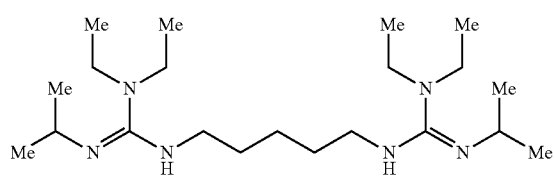

To a stirring (300 rpm) solution of Et₂NH (5 mL) at 27° C. was added a solution of the biscarbodiimide (137.4 mg, 0.5813 mmol, 1.00 eq) in anhydrous de-oxygenated THF (2 mL) in a slow dropwise manner at 27° C. After stirring for 72 hrs the now pale yellow solution was concentrated, hexanes (5 mL) was added, the mixture was concentrated, this process was repeated 3× more to remove residual Et₂NH and insoluble impurities, the viscous foam was suspended in hexanes (5 mL), stirred vigorously (1000 rpm), filtered through a 0.45 μm submicron filter, rinsed with hexanes (3×3 mL), and concentrated to afford the bisguanidine as a clear viscous amorphous foam (217.3 mg, 0.5679 mmol, 98%). NMR indicated product which exists as a complex mixture of isomers and tautomers.

Product Exists as a Complex Isomeric/Tautomeric Mixture: Only Major Isomer is Listed ¹H NMR (500 MHz, Benzene-d₆) δ 3.34 (tdd, J=12.5, 6.2, 2.3 Hz, 4H), 3.11 (dq, J=14.0, 7.1, 6.3 Hz, 8H), 2.92 (dd, J=15.4, 9.0 Hz, 2H), 2.66-2.55 (m, 2H), 1.87 (p, J=7.0 Hz, 4H), 1.41-1.33 (m, 2H), 1.23 (d, J=6.1 Hz, 12H), 1.05 (tt, J=7.0, 2.3 Hz, 12H). ¹³C NMR (126 MHz, Benzene-d₆) δ 154.50, 47.90, 45.87, 42.72, 32.55, 25.22, 23.49, 12.65. HRMS (ESI): calc'd C₂₁H₄₆N₆ [M+H]⁺ as 383.3857; found 383.3855.

Example 20

Synthesis of Ligand 14

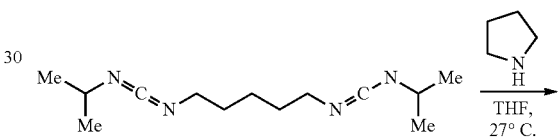

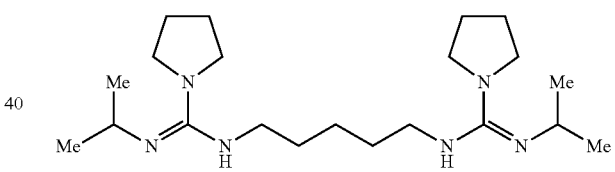

To a stirring (300 rpm) solution of pyrrolidine (5 mL) was added a solution of the biscarbodiimide (137.4 mg, 0.5813 mmol, 1.00 eq) in anhydrous deoxygenated THF (2 mL) in a slow dropwise manner at 27° C. After stirring for 72 hrs the now pale yellow solution was concentrated, hexanes (5 mL) was added, the mixture was concentrated, this process was repeated 3× more to remove residual Et₂NH, the viscous foam was suspended in hexanes (5 mL), stirred vigorously (1000 rpm), filtered through a 0.45 μm submicron filter, rinsed with hexanes (3×3 mL), and concentrated to afford the bisguanidine as a white viscous amorphous foam (150.6 mg, 0.3978 mmol, 68%). NMR indicated product which exists as a complex mixture of isomers and tautomers.

Product Exists as a Complex Isomeric/Tautomeric Mixture: Only Major Isomer is Listed ¹H NMR (500 MHz, Benzene-d₆) δ 3.43-3.34 (m, 4H), 3.31 (d, J=6.5 Hz, 8H), 2.94 (q, J=6.9 Hz, 2H), 1.95 (p, J=7.1 Hz, 4H), 1.84 (q, J=7.6 Hz, 4H), 1.75 (t, J=8.0 Hz, 4H), 1.57-1.50 (m, 2H), 1.50-1.39 (m, 12H). ¹³C NMR (126 MHz, Benzene-d₆) δ 154.08, 48.17, 47.98, 45.69, 32.95, 32.43, 25.72, 25.08, 23.77. HRMS (ESI): calc'd C₂₁H₄₂N₆ [M+H]⁺ as 379.3544; found 379.3556.

Example 21

Synthesis of Ligand 15

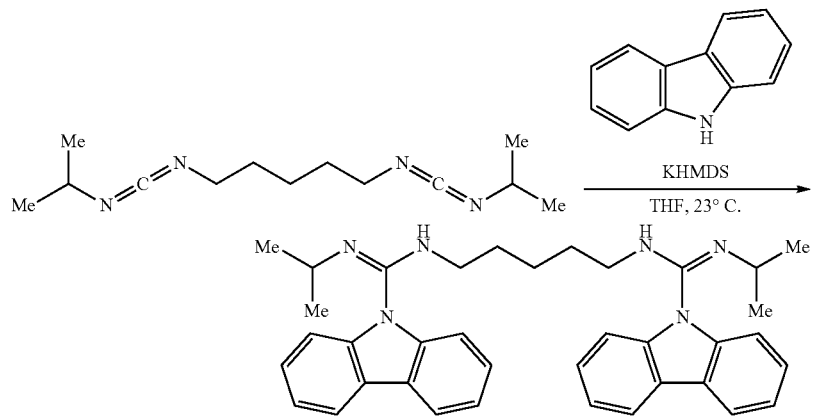

To a solution of carbazole (0.165 g, 0.9850 mmol, 2.00 eq) in anhydrous deoxygenated THF (2.5 mL) in a nitrogen filled glovebox at 23° C. was added a solution of KHMDS (0.20 mL, 0.0985 mmol, 0.20 eq, non-titrated 0.5 M in PhMe). The now clear pale orange solution was stirred (300 rpm) for 2 mins following which a solution of the biscarbodiimide (0.116 g, 0.4925 mmol, 1.00 eq) in THF (2.5 mL) in a slow dropwise manner. After stirring (300 rpm) for 72 hrs the clear golden orange solution was concentrated, suspended in hexanes (3 mL), concentrated, this suspension/concentration process was continued 3× more to remove residual THF and triturate insoluble impurities, the pale yellow amorphous solid was suspended in PhH/hexanes (5 mL, 1:1), stirred vigorously (1000 rpm) for 2 mins, filtered through a 0.45 μm PTFE filter, rinsed with PhH/hexanes (3×5 mL, 1:1), and concentrated to afford the bisguanidine as a clear pale yellow amorphous foam (0.281 g, 0.4914 mmol, 99%). NMR indicated product which exists as a complex mixture of isomers and tautomers.

Product Exists as a Complex Mixture of Isomers: (*) Denotes Minor Isomer $^1$H NMR (500 MHz, Benzene-d$_6$) δ 8.00-7.87 (m, 4H), 7.44-7.23 (m, 8H), 7.17 (d, J=8.3 Hz, 4H), 4.33-3.92 (m, 2H), 3.39-3.05 (m, 4H), 3.04-2.75 (m, 2H), 1.55-1.16 (m, 4H), 1.16-1.06 (m, 2H), 1.07-0.85 (m, 12H). $^{13}$C NMR (126 MHz, Benzene-d$_6$) δ 141.00, (139.40*) 139.18, 128.19, 126.23, 123.01, (120.39*) 120.36 (120.22*), 110.48, 48.76, 42.95 (41.95*), 31.59, 25.23, 22.05.

Example 22

Synthesis of Intermediate to Ligands 16-18

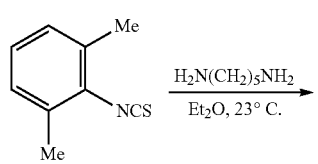

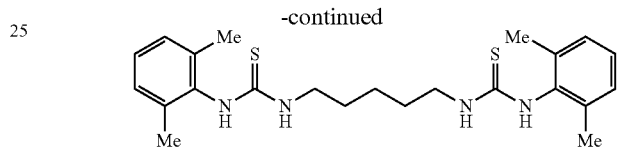

To a vigorously stirring (1000 rpm) solution of 2,6-dimethylphenylisothiocyanate (1.85 mL, 12.252 mmol, 2.00 eq) in Et$_2$O (65 mL) was added cadaverine (0.72 mL, 6.126 mmol, 1.00 eq) in slow dropwise fashion over 1 min. The clear colorless solution was allowed to stir vigorously at 23° C. for 12 hrs upon which the white heterogeneous mixture was placed in an ice water bath for 1 hr, suction filtered cold, the white filtered solid was washed with cold Et$_2$O (3×20 mL), and dried in vacuo to afford the bisthiourea as a white powder (2.331 g, 5.438 mmol, 89%). NMR indicated product.

$^1$H NMR (500 MHz, Acetone-d$_6$) δ 8.45-8.21 (br s, 1H), 7.19-7.04 (m, 6H), 6.64-6.27 (br s, 1H), 3.62-3.48 (m, 4H), 2.22 (s, 12H), 1.64-1.47 (br s, 4H), 1.36-1.16 (br s, 2H). $^{13}$C NMR (126 MHz, Acetone-d$_6$) δ 181.44, 137.22, 134.45, 128.35, 127.98, 44.44, 28.91, 23.82, 17.40.

Example 23

Synthesis of Intermediate to Ligands 16-18

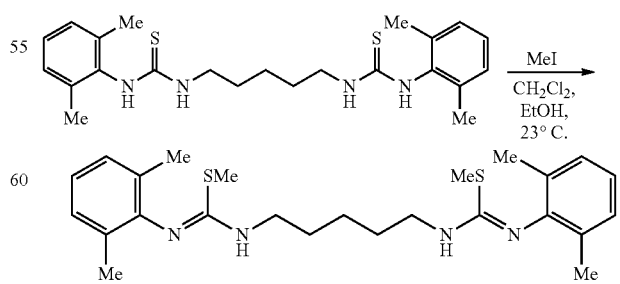

To a solution of the bisthiourea (2.331 g, 5.438 mmol, 1.00 eq) in EtOH—CH$_2$Cl$_2$ (100 mL, 1:1) at 23° C. was added iodomethane (3.087 g, 1.40 mL, 21.752 mmol, 4.00 eq). After stirring (500 rpm) for 12 hrs the clear pale yellow solution was neutralized with a saturated aqueous mixture of $NaHCO_3$ (100 mL), then aqueous NaOH (15 mL, 1 N) was added slowly, the biphasic white heterogeneous mixture was stirred vigorously (1000 rpm) for 2 mins, poured into a separatory funnel, partitioned, organics were washed with a saturated aqueous mixture of $NaHCO_3$ (3×50 mL), residual organics were extracted from the aqueous layer using $CH_2Cl_2$ (2×25 mL), combined, washed with brine (1×50 mL), dried over solid $Na_2SO_4$, decanted, and concentrated to afford the bismethylisothiourea (2.483 g, 5.438 mmol, 100%). NMR indicated product as a mixture of isomers/tautomers along with minor impurities. The crude material was used in the subsequent reaction without further purification.

$^1$H NMR (500 MHz, Chloroform-d) δ 7.00 (d, J=7.5 Hz, 4H), 6.86 (t, J=7.5 Hz, 2H), 4.40-4.13 (br s, 2H), 3.49-3.20 (br s, 4H), 2.51-2.27 (br s, 6H), 2.10 (s, 12H), 1.71-1.50 (br s, 4H), 1.46-1.25 (br s, 2H). $^{13}$C NMR (126 MHz, Chloroform-d) δ 152.52, 146.60, 129.25, 127.89, 122.52, 43.01, 29.90, 24.07, 18.01, 13.66.

Example 24

Synthesis of Intermediate to Ligands 16-18

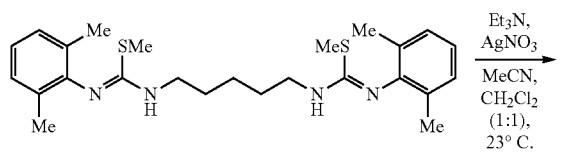

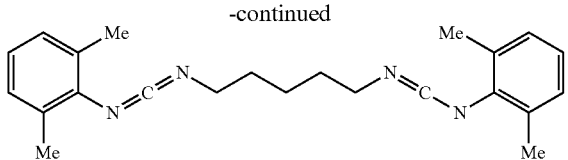

To a stirring (500 rpm) solution of the bismethylisothiourea (2.493 g, 5.459 mmol, 1.00 eq) and $Et_3N$ (3.20 mL, 22.928 mmol, 4.20 eq) in non-anhydrous $CH_2Cl_2$ and acetonitrile (110 mL, 1:1) at 23° C. in a brown jar protected from light was added solid $AgNO_3$ (3.709 g, 21.836 mmol, 4.00 eq) all at once. After 3.5 hrs the golden brown heterogeneous mixture was diluted with hexanes (100 mL), stirred vigorously (1000 rpm) for 2 mins, suction filtered through a pad of celite, concentrated to ~10 mL, hexanes (50 mL) was added, concentrated to ~10 mL, this process was repeated 3× more, hexanes (50 mL) was added, the mixture was suction filtered through a pad of celite, and concentrated to afford the biscarbodiimide as a pale golden yellow oil (1.575 g, 4.370 mmol, 80%). NMR indicated product.

$^1$H NMR (500 MHz, Chloroform-d) δ 7.01 (dq, J=7.3, 0.7 Hz, 4H), 6.93 (dd, J=8.2, 6.8 Hz, 2H), 3.40 (t, J=6.8 Hz, 4H), 2.34 (s, 12H), 1.74-1.66 (m, 4H), 1.59-1.51 (m, 2H). $^{13}$C NMR (126 MHz, Chloroform-d) δ 136.80, 133.75, 132.19, 128.12, 124.11, 46.67, 30.72, 24.27, 18.93. HRMS (ESI): calc'd $C_{23}H_{28}N_4$ [M+H]$^+$ as 361.2314; found 361.2299.

Example 25

Synthesis of Ligand 16

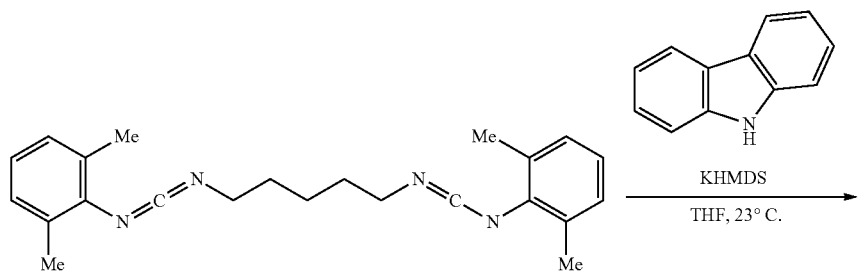

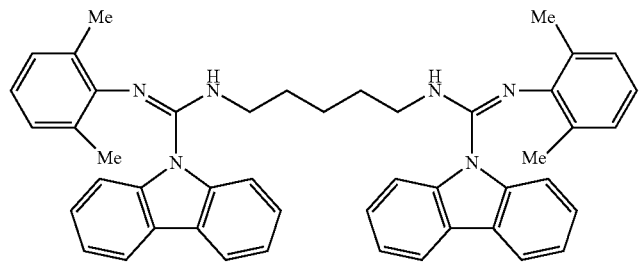

To a solution of carbazole (39.0 mg, 0.2330 mmol, 2.00 eq) in anhydrous deoxygenated THF (2.5 mL) in a nitrogen filled glovebox at 23° C. was added a solution KHMDS (23.0 μL, 0.0117 mmol, 0.20 eq, non-titrated 0.5 M in PhMe). The now clear pale orange solution was stirred (300 rpm) for 2 mins following which a solution of the biscarbodiimide (42.5 mg, 0.1165 mmol, 1.00 eq) in THF (2.5 mL) was added in a slow dropwise manner. After stirring (300 rpm) for 72 hrs the clear golden orange solution was concentrated, suspended in hexanes (3 mL), concentrated, this suspension/concentration process was continued 3× more to remove residual THF and triturate insoluble impurities, the pale yellow amorphous solid was suspended in PhH/hexanes (5 mL, 1:1), stirred vigorously (1000 rpm) for 2 mins, filtered through a 0.45 μm PTFE filter, rinsed with PhH/hexanes (3×5 mL, 1:1), and concentrated to afford the bisguanidine as a clear pale yellow amorphous foam (67.5 mg, 0.0971 mmol, 84%). NMR indicated product which exists as a complex mixture of isomers and tautomers and contains hexanes.

Product Exists as a Complex Mixture of Isomers: (*) Denotes Minor Isomer $^1$H NMR (500 MHz, Benzene-$d_6$) δ (8.04-7.88 (m, 4H)*) 7.88-7.78 (m, 4H), 7.40-7.24 (m, 4H), 7.18-7.08 (m, 4H), 7.09-6.97 (m, 6H), 6.97-6.85 (m, 4H), 4.33-4.07 (m, 2H), 4.04-3.76 (br s, 4H), 2.35-2.15 (br s, 12H), 2.15-1.97 (m, 4H), 1.30-1.15 (m, 2H). $^{13}$C NMR (126 MHz, Benzene-$d_6$) δ 145.44, 139.70, 128.59, 128.32, (128.17*), 127.23, 126.30, (125.49*), 124.20 (123.16*), 120.93, (120.27*) 120.22, 112.17 (110.39*), 43.22, 30.44, 25.24, 18.67.

Example 26

Synthesis of Procatalyst 1

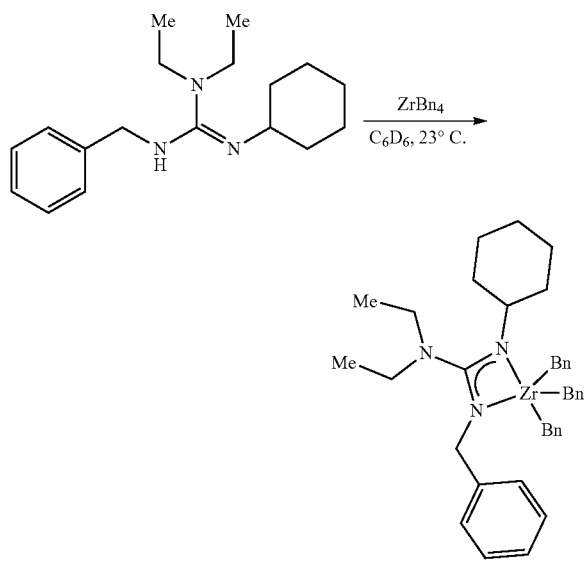

To a clear golden orange solution of the ZrBn$_4$ (23.8 mg, 0.0512 mmol, 1.00 eq) in a nitrogen filled glovebox in anhydrous deoxygenated C$_6$D$_6$ (1.0 mL) at 23° C. was added a solution of the guanidine (15.0 mg, 0.0512 mmol, 1.00 eq) in C$_6$D$_6$ (0.60 mL) in a dropwise manner. The now canary golden yellow solution was stirred vigorously (1000 rpm) for 1 hr, an aliquot was removed and NMR indicated complete conversion of the starting ligand, the solution was concentrated, suspended in anhydrous deoxygenated hexanes (3 mL), concentrated, the suspension/concentration process was repeated 2× more to remove residual C$_6$D$_6$ and PhMe, the resultant mixture was suspended in hexanes (2 mL), PhMe (2 mL) was added, the mixture was stirred vigorously (1000 rpm) for 2 mins, filtered through a 0.20 μm PTFE filter, rinsed with hexanes/PhMe (3×3 mL, 1:1), and the filtrate was concentrated to afford the zirconium complex as a canary yellow foam (31.3 mg, 0.0481 mmol, 94%). NMR indicated product.

$^1$H NMR (400 MHz, Benzene-$d_6$) δ 7.21-7.17 (m, 2H), 7.15-7.09 (m, 3H), 7.08-7.03 (m, 6H), 6.89-6.83 (m, 3H), 6.80-6.75 (m, 6H), 4.13-4.04 (m, 2H), 3.14-3.00 (m, 1H), 2.58 (q, J=7.1 Hz, 4H), 2.30 (s, 6H), 1.71 (dt, J=30.7, 12.2 Hz, 6H), 1.53-1.46 (m, 1H), 1.20-0.99 (m, 3H), 0.58 (t, J=7.0 Hz, 6H). $^{13}$C NMR (101 MHz, Benzene-$d_6$) δ 175.90, 143.85, 141.97, 130.53, 129.21, 128.36, 126.27, 125.76, 122.28, 72.74, 58.53, 51.12, 41.12, 34.64, 26.51, 25.54, 12.61.

Example 27

Synthesis of Procatalyst 3

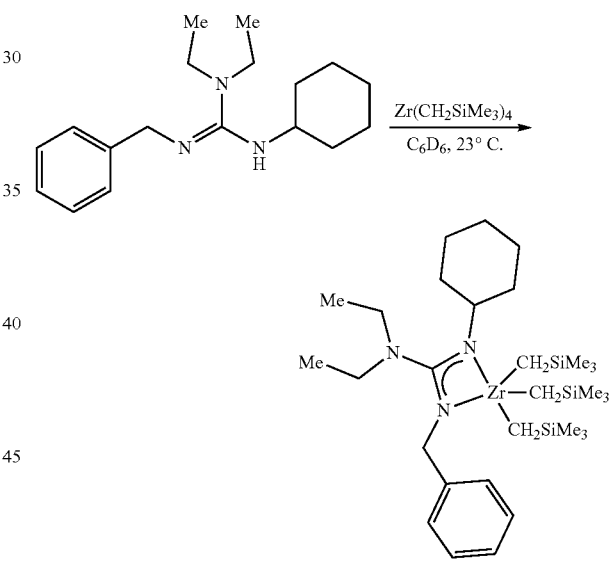

To a solution of tetrakis-trimethylsilylmethyl zirconium (18.4 mg, 0.0418 mmol, 1.00 eq) in C$_6$D$_6$ (0.38 mL) in a nitrogen filled glovebox at 23° C. was added a solution of the guanidine (12.0 mg, 0.0418 mmol, 1.00 eq) in C$_6$D$_6$ (0.24 mL) in a dropwise manner. The clear pale yellow solution was stirred (300 rpm) for 1 hr upon which an aliquot was removed and NMR indicated complete conversion to the desired complex. The solution was concentrated, suspended in anhydrous deoxygenated pentane (3 mL), concentrated, this suspension/concentration process was repeated 3× more, the resultant pale yellow foam was suspended in pentane (3 mL), the resultant pale yellow mixture was stirred vigorously (1000 rpm) for 1 min, filtered through a 0.45 μm PTFE filter, rinsed with pentane (3×3 mL), and the filtrate was concentrated to afford the zirconium complex as a pale yellow amorphous foam (22.8 mg, 0.0356 mmol, 85%). NMR indicated product.

$^1$H NMR (400 MHz, Benzene-d$_6$) δ 7.31-7.28 (m, 2H), 7.20-7.14 (m, 2H), 7.01 (t, J=7.4 Hz, 1H), 4.52 (s, 2H), 3.03 (tt, J=11.4, 3.8 Hz, 1H), 2.70 (q, J=7.1 Hz, 4H), 1.89-1.78 (m, 2H), 1.74-1.64 (m, 2H), 1.63-1.43 (m, 4H), 1.09 (d, J=8.2 Hz, 2H), 1.01 (s, 6H), 0.59 (t, J=7.1 Hz, 6H), 0.28 (s, 27H). $^{13}$C NMR (101 MHz, Benzene-d$_6$) δ 174.64, 141.89, 128.26, 126.43, 126.22, 65.84, 56.20, 51.93, 41.75, 35.85, 26.01, 25.63, 12.58, 3.05.

Example 28

Synthesis of Procatalyst 4

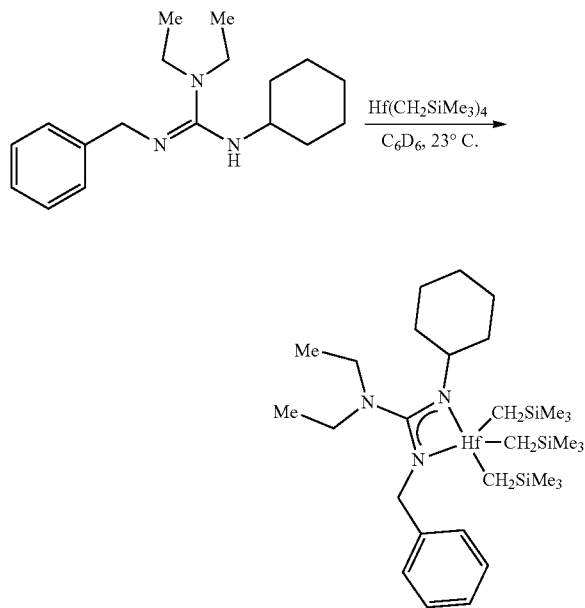

To a solution of tetrakis-trimethylsilylmethyl hafnium (22.1 mg, 0.0418 mmol, 1.00 eq) in C$_6$D$_6$ (0.44 mL) in a nitrogen filled glovebox at 23° C. was added a solution of the guanidine (12.0 mg, 0.0418 mmol, 1.00 eq) in C$_6$D$_6$ (0.24 mL). The clear pale yellow solution was stirred (300 rpm) for 1 hr upon which an aliquot was removed and NMR indicated complete conversion to the desired complex. The solution was concentrated, suspended in anhydrous deoxygenated pentane (3 mL), concentrated, this suspension/concentration process was repeated 3× more, the resultant pale yellow foam was suspended in pentane (3 mL), the resultant pale yellow mixture was stirred vigorously (1000 rpm) for 1 min, filtered through a 0.45 μm PTFE filter, rinsed with pentane (3×3 mL), and the filtrate was concentrated to afford the hafnium complex as a pale yellow amorphous foam (27.0 mg, 0.0371 mmol, 89%). NMR indicated product.

$^1$H NMR (500 MHz, Benzene-d$_6$) δ 7.30 (d, J=7.5 Hz, 2H), 7.18 (t, J=7.5 Hz, 2H), 7.02 (t, J=7.4 Hz, 1H), 4.61 (s, 2H), 3.22 (d, J=12.1 Hz, 1H), 2.70 (q, J=7.1 Hz, 4H), 1.82 (m, 2H), 1.68 (m, 2H), 1.60 (m, 2H), 1.49 (m, 1H), 1.09 (m, 3H), 0.58 (t, J=7.1 Hz, 6H), 0.48 (s, 6H), 0.31 (s, 27H). $^{13}$C NMR (126 MHz, Benzene-d$_6$) δ 173.68, 141.70, 128.28, 126.50, 126.26, 72.71, 55.92, 51.41, 41.70, 35.71, 26.05, 25.64, 12.59, 3.44.

Example 29

Synthesis of Procatalyst 7

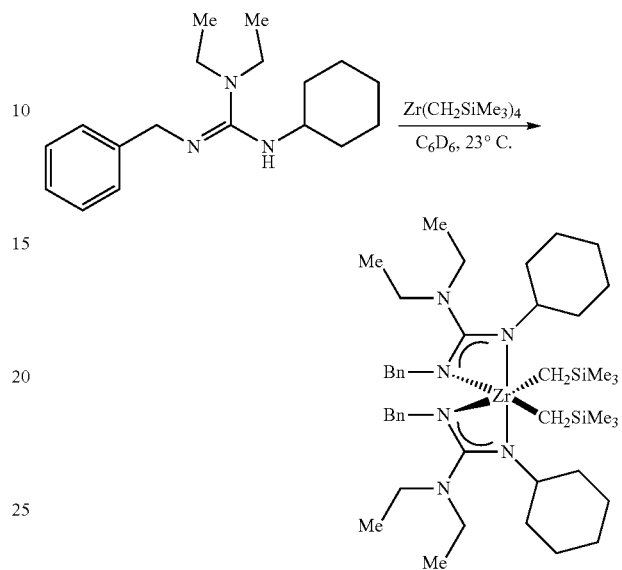

To a solution of tetrakis-trimethylsilylmethyl zirconium (7.7 mg, 0.0174 mmol, 1.00 eq) in C$_6$D$_6$ (0.16 mL) in a nitrogen filled glovebox at 23° C. was added a solution of the guanidine (10.0 mg, 0.0348 mmol, 2.00 eq) in C$_6$D$_6$ (0.20 mL). The clear pale yellow solution was stirred (300 rpm) for 1 hr upon which an aliquot was removed and NMR indicated complete conversion to the desired complex. The solution was concentrated, suspended in anhydrous deoxygenated pentane (3 mL), concentrated, this suspension/concentration process was repeated 3× more, the resultant pale yellow foam was suspended in pentane (3 mL), the resultant pale yellow mixture was stirred vigorously (1000 rpm) for 1 min, filtered through a 0.45 μm PTFE filter, rinsed with pentane (3×3 mL), and the filtrate was concentrated to afford the zirconium complex as a pale yellow amorphous foam (13.1 mg, 0.0156 mmol, 90%). NMR indicated product.

$^1$H NMR (400 MHz, Benzene-d$_6$) δ 7.41 (d, J=7.5 Hz, 4H), 7.14-7.07 (m, 4H), 7.01 (t, J=7.3 Hz, 2H), 4.67 (s, 4H), 3.22-3.08 (m, 2H), 2.85 (q, J=7.0 Hz, 8H), 1.91-1.48 (m, 14H), 1.27-1.10 (m, 6H), 0.89 (s, 4H), 0.72 (t, J=7.0 Hz, 12H), 0.38 (s, 18H). $^{13}$C NMR (101 MHz, Benzene-d$_6$) δ 176.24, 142.93, 128.26, 126.65, 125.94, 56.99, 56.81, 52.46, 41.40, 35.69, 26.44, 12.85, 3.73.

Example 30

Synthesis of Procatalyst 13

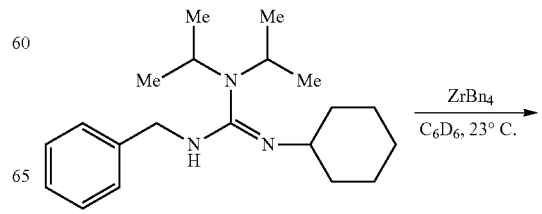

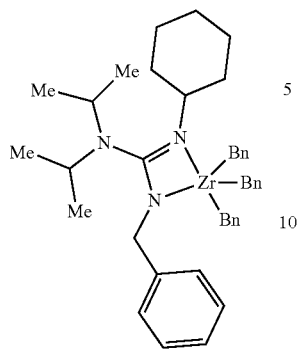

To a clear golden orange solution of the ZrBn₄ (36.1 mg, 0.0792 mmol, 1.00 eq) in a nitrogen filled glovebox in anhydrous deoxygenated C₆D₆ (1.0 mL) at 23° C. was added a solution of the guanidine (25.0 mg, 0.0792 mmol, 1.00 eq) in C₆D₆ (1.00 mL) in a dropwise manner. The now canary golden yellow solution was stirred vigorously (1000 rpm) for 1 hr, an aliquot was removed and NMR indicated complete conversion of the starting ligand, the solution was concentrated, suspended in anhydrous deoxygenated hexanes (3 mL), concentrated, the suspension/concentration process was repeated 2× more to remove residual C₆D₆ and PhMe, the resultant mixture was suspended in hexanes (2 mL), PhMe (2 mL) was added, the mixture was stirred vigorously (1000 rpm) for 2 mins, filtered through a 0.20 µm PTFE filter, rinsed with hexanes/PhMe (3×3 mL, 1:1), and the filtrate was concentrated to afford the zirconium complex as a light golden brown foam (52.8 mg, 0.0778 mmol, 98%). NMR indicated product.

Characterization @ 23° C.:

¹H NMR (500 MHz, Benzene-d₆) δ 7.22-7.05 (m, 11H), 6.92-6.87 (m, 3H), 6.82-6.78 (m, 6H), 4.33 (s, 2H), 3.40-3.32 (m, 1H), 3.28 (hept, J=6.9 Hz, 2H), 2.30 (s, 6H), 1.75-1.62 (m, 4H), 1.18-0.97 (m, 6H), 0.94 (br s, 12H).

Characterization @ 50° C.:

¹H NMR (500 MHz, Benzene-d₆) δ 7.16 (dt, J=15.2, 7.5 Hz, 5H), 7.08 (t, J=7.6 Hz, 6H), 6.88 (t, J=7.4 Hz, 3H), 6.82-6.78 (m, 6H), 4.36 (s, 2H), 3.37 (dq, J=14.2, 6.9, 6.3 Hz, 1H), 3.29 (h, J=6.8 Hz, 2H), 2.29 (s, 6H), 1.72-1.62 (m, 3H), 1.55-1.47 (m, 1H), 1.20-0.99 (m, 6H), 0.94 (d, J=6.8 Hz, 12H). ¹³C NMR (126 MHz, Benzene-d₆) δ 178.01, 144.00, 141.64, 129.14, 128.27, 127.86, 126.26, 126.08, 122.35, 74.48, 57.39, 51.00, 49.79, 34.88, 26.29, 25.55, 22.91.

Example 31

Synthesis of Procatalyst 15

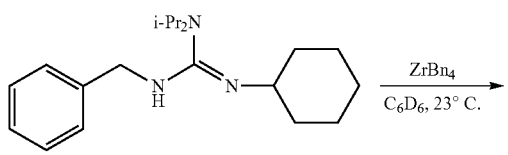

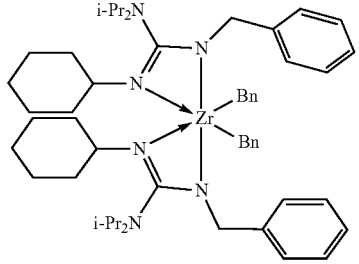

To a solution of the guanidine ligand (20.2 mg, 0.0640 mmol, 2.00 eq) in C₆D₆ (1.0 mL) in a nitrogen filled glovebox at 23° C. was added a solution of ZrBn₄ (14.6 mg, 0.0320 mmol, 1.00 eq) in C₆D₆ (0.58 mL). After stirring for 1 hr NMR indicated complete consumption of the starting ligand. The golden yellow solution was filtered through a 0.20 µm PTFE filter, rinsed with PhH (3×2 mL), and concentrated to afford the zirconium complex as a golden yellow foam (27.0 mg, 0.0272 mmol, 85%). NMR and VT-NMR indicated product which exists as a rotomeric mixture.

Chemical Shifts are Listed at VT-NMR @ 70° C.:

¹H NMR (500 MHz, Benzene-d₆) δ 7.31 (d, J=7.6 Hz, 4H), 7.26 (d, J=7.5 Hz, 4H), 7.17 (t, J=7.6 Hz, 4H), 7.08 (t, J=7.6 Hz, 4H), 6.99 (dq, J=15.5, 8.5 Hz, 2H), 6.84 (t, J=7.3 Hz, 2H), 4.56 (s, 4H), 3.45 (p, J=6.9 Hz, 4H), 3.40-3.32 (m, 2H), 2.57 (s, 4H), 1.83-1.42 (m, 10H), 1.29-1.12 (m, 10H), 1.06 (d, J=7.0 Hz, 24H). ¹³C NMR (126 MHz, Benzene-d₆) δ 179.02, 149.03, 142.43, 128.79, 128.04, 128.01, 126.42, 125.74, 120.23, 56.19, 52.10, 50.07, 35.48, 26.36, 25.71, 23.51.

Example 32

Synthesis of Procatalyst 17

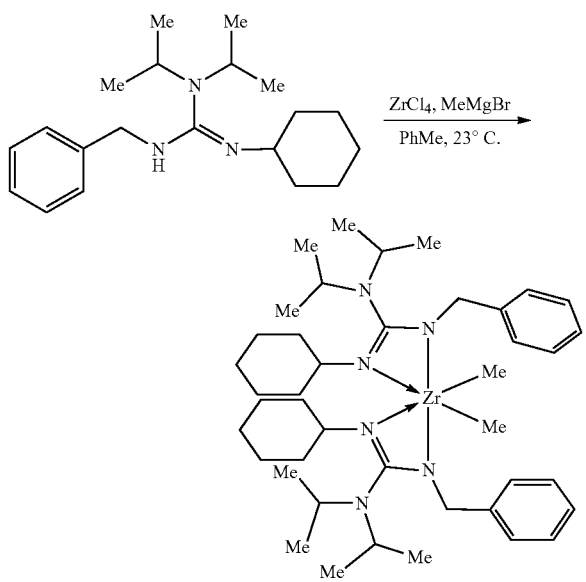

To a yellow suspension of ZrCl₄ (7.0 mg, 0.0301 mmol, 1.00 eq) in a nitrogen filled glovebox in anhydrous deoxygenated PhMe (1.0 mL) at 23° C. was added MeMgBr (0.12 mL, 0.3612 mmol, 6.00 eq, titrated 3.0 M in Et$_2$O), after stirring vigorously (1000 rpm) for 20 seconds a solution of the guanidine (19.0 mg, 0.0602 mmol, 2.00 eq) in PhMe (1.0 mL) in a quick dropwise manner. The now dark brown mixture was stirred vigorously (1000 rpm) for 2 hrs, the now black mixture was diluted with anhydrous deoxygenated PhMe/hexanes (4 mL, 1:1), stirred vigorously (1000 rpm) for 2 mins, filtered through a 0.45 μm PTFE filter, rinsed with PhMe/hexanes (3×3 mL, 1:1), concentrated, the grey mixture was suspended in hexanes (3 mL), concentrated, this suspension/concentration process was repeated 2× more to remove residual Et$_2$O and triturate insoluble impurities, the mixture was suspended in hexanes/PhMe (3 mL, 1:1), stirred vigorously (1000 rpm) for 2 mins, filtered through a 0.45 μm PTFE filter, rinsed with hexanes/PhMe (3×3 mL, 1:1), the filtrate was concentrated, the hexanes suspension/concentration process aforementioned was repeated 3×, the resultant pale golden brown mixture was suspended in hexanes/PhMe (3 mL, 1:1), filtered through a 0.20 μm PTFE filter, rinsed with hexanes/PhMe (3×3 mL, 1:1), and the filtrate was concentrated to afford the zirconium complex as a pale golden brown foam (20.9 mg, 0.0279 mmol, 93%). NMR indicated product.

$^1$H NMR (400 MHz, Benzene-d$_6$) δ 7.51-7.45 (m, 4H), 7.18-7.12 (m, 4H), 7.05-7.00 (m, 2H), 4.64 (s, 4H), 3.46-3.32 (m, 6H), 1.87 (d, J=12.1 Hz, 4H), 1.81-1.67 (m, 6H), 1.60-1.53 (m, 2H), 1.34-1.07 (m, 8H), 1.02 (d, J=6.8 Hz, 24H), 0.81 (s, 6H). $^{13}$C NMR (101 MHz, Benzene-d$_6$) δ 176.77, 142.99, 128.01, 126.59, 125.87, 55.98, 51.22, 49.46, 43.65, 35.84, 26.28, 25.93, 23.06.

Example 33

Synthesis of Procatalyst 35

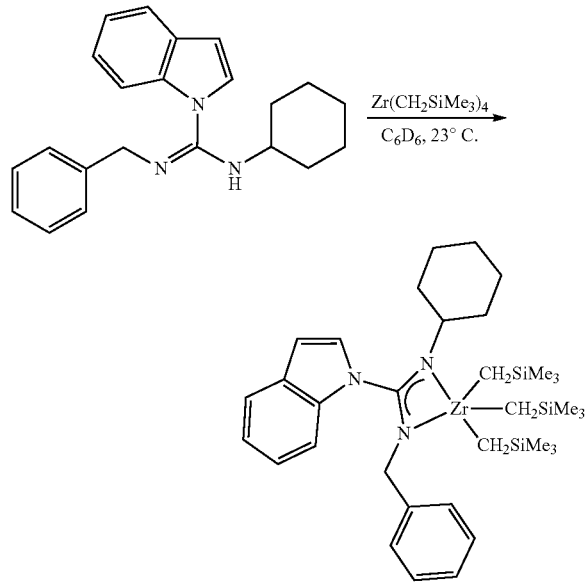

To a solution of tetrakis-trimethylsilylmethyl zirconium (13.3 mg, 0.0302 mmol, 1.00 eq) in C$_6$D$_6$ (0.26 mL) in a nitrogen filled glovebox at 23° C. was added a solution of the substrate (10.0 mg, 0.0302 mmol, 1.00 eq) in C$_6$D$_6$ (0.20 mL) in a dropwise manner. After stirring (300 rpm) for 1.5 hrs an aliquot was removed and NMR indicated full conversion of the starting guanidine to the desired zirconium complex. The clear pale yellow solution was concentrated, suspended in anhydrous de-oxygenated pentane (3 mL), concentrated, this suspension/concentration process was repeated 3× more to remove residual C$_6$D$_6$, the resultant pale yellow amorphous foam was suspended in pentane (3 mL), stirred vigorously (1000 rpm) for 1 min, filtered through a 0.45 μm PTFE filter, rinsed with pentane (3×3 mL), and the filtrate was concentrated to afford the zirconium complex as a pale yellow amorphous foam (17.0 mg, 0.0248 mmol, 82%). NMR indicated product.

$^1$H NMR (500 MHz, Benzene-d$_6$) δ 7.54 (d, J=8.3 Hz, 1H), 7.49 (d, J=7.9 Hz, 1H), 7.18 (t, J=7.7 Hz, 1H), 7.07 (t, J=7.5 Hz, 1H), 7.02 (t, J=7.5 Hz, 2H), 6.94 (d, J=7.9 Hz, 3H), 6.77 (d, J=3.3 Hz, 1H), 6.38 (d, J=3.3 Hz, 1H), 4.26 (d, J=15.1 Hz, 1H), 4.16 (d, J=15.1 Hz, 1H), 3.07-2.94 (m, 1H), 1.71-1.60 (m, 2H), 1.49-1.37 (m, 3H), 1.37-1.28 (m, 1H), 1.22 (d, J=26.3 Hz, 6H), 0.84 (q, J=12.5 Hz, 1H), 0.68 (dt, J=46.7, 13.5 Hz, 1H), 0.29 (s, 27H). $^{13}$C NMR (126 MHz, Benzene-d$_6$) δ 165.30, 140.35, 134.89, 128.35, 128.27, 127.10, 126.80, 124.93, 123.67, 121.63, 121.39, 111.07, 105.25, 70.93, 56.08, 51.20, 35.97, 35.62, 25.15, 25.11, 25.04, 2.91.

Example 34

Synthesis of Procatalyst 36

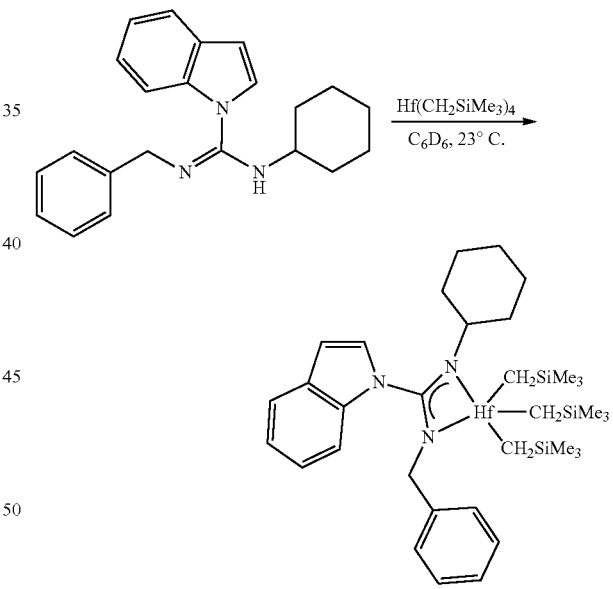

To a solution of tetrakis-trimethylsilylmethyl hafnium (16.0 mg, 0.0302 mmol, 1.00 eq) in C$_6$D$_6$ (0.26 mL) in a nitrogen filled glovebox at 23° C. was added a solution of the guanidine (10.0 mg, 0.0302 mmol, 1.00 eq) in C$_6$D$_6$ (0.20 mL) in a dropwise manner. After stirring (300 rpm) for 90 mins an aliquot was removed and NMR indicated full conversion of the starting guanidine to the desired hafnium complex. The clear pale yellow solution was concentrated, suspended in anhydrous deoxygenated pentane (3 mL), concentrated, this suspension/concentration process was repeated 3× more to remove residual C$_6$D$_6$, the resultant pale yellow amorphous foam was suspended in pentane (3 mL), stirred vigorously (1000 rpm) for 1 min, filtered through a 0.45 μm PTFE filter, rinsed with pentane (3×3 mL), and the filtrate was concentrated to afford the hafnium complex as a pale yellow amorphous foam (20.1 mg, 0.0261 mmol, 86%). NMR indicated product.

$^1$H NMR (400 MHz, Benzene-$d_6$) δ 7.52 (dq, J=8.3, 0.9 Hz, 1H), 7.48-7.45 (m, 1H), 7.18-7.13 (m, 1H), 7.05 (ddd, J=8.1, 7.2, 1.0 Hz, 2H), 7.02-6.97 (m, 2H), 6.93-6.88 (m, 2H), 6.74 (dd, J=3.3, 0.4 Hz, 1H), 6.36 (dd, J=3.4, 0.9 Hz, 1H), 4.31 (d, J=15.0 Hz, 1H), 4.24 (d, J=15.0 Hz, 1H), 3.17 (tt, J=11.4, 4.0 Hz, 1H), 1.63 (m, 2H), 1.51-1.12 (m, 8H), 0.60 (s, 6H), 0.28 (s, 27H). $^{13}$C NMR (101 MHz, Benzene-$d_6$) δ 164.78, 140.04, 134.87, 128.42, 128.25, 127.49, 126.84, 124.89, 123.70, 121.70, 121.40, 111.11, 105.47, 77.15, 55.88, 50.85, 35.79, 35.43, 25.11, 25.03, 3.27.

Example 35

Synthesis of Procatalyst 37

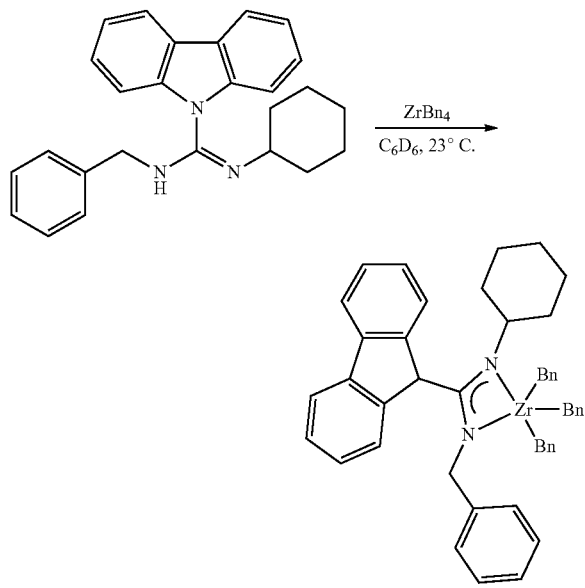

To a clear golden orange solution of the ZrBn$_4$ (23.9 mg, 0.0524 mmol, 1.00 eq) in a nitrogen filled glovebox in anhydrous deoxygenated C$_6$D$_6$ (1.0 mL) at 23° C. was added a solution of the guanidine (20.0 mg, 0.0524 mmol, 1.00 eq) in C$_6$D$_6$ (0.80 mL) in a dropwise manner. The now canary golden yellow solution was stirred vigorously (1000 rpm) for 1 hr, an aliquot was removed and NMR indicated complete conversion of the starting ligand, the solution was concentrated, suspended in anhydrous deoxygenated hexanes (3 mL), concentrated, the suspension/concentration process was repeated 2× more to remove residual C$_6$D$_6$ and PhMe, the resultant mixture was suspended in hexanes (2 mL), PhMe (2 mL) was added, the mixture was stirred vigorously (1000 rpm) for 2 mins, filtered through a 0.20 μm PTFE filter, rinsed with hexanes/PhMe (3×3 mL, 1:1), and the filtrate was concentrated to afford the zirconium complex as a light golden brown foam (36.1 mg, 0.0485 mmol, 92%). NMR indicated product.

$^1$H NMR (400 MHz, Benzene-$d_6$) δ 7.79-7.75 (m, 2H), 7.24 (ddd, J=8.3, 7.1, 1.3 Hz, 2H), 7.17-7.08 (m, 8H), 7.03-6.88 (m, 6H), 6.87-6.82 (m, 4H), 6.80-6.72 (m, 4H), 6.62-6.57 (m, 2H), 4.09 (s, 2H), 2.83 (tt, J=11.6, 4.1 Hz, 1H), 2.42 (s, 6H), 1.54-1.45 (m, 1H), 1.41-1.27 (m, 3H), 1.22 (d, J=13.5 Hz, 2H), 1.02 (d, J=13.2 Hz, 1H), 0.66 (qt, J=13.0, 3.5 Hz, 1H), 0.41 (dddd, J=16.8, 13.1, 8.3, 3.6 Hz, 2H). $^{13}$C NMR (101 MHz, Benzene-$d_6$) δ 165.27, 142.64, 139.77, 138.29, 130.53, 129.66, 128.30, 128.28, 128.15, 127.12, 126.57, 126.38, 124.09, 123.29, 123.17, 121.02, 120.44, 110.69, 76.72, 57.47, 50.73, 34.69, 25.19, 24.93.

Example 36

Synthesis of Procatalyst 38

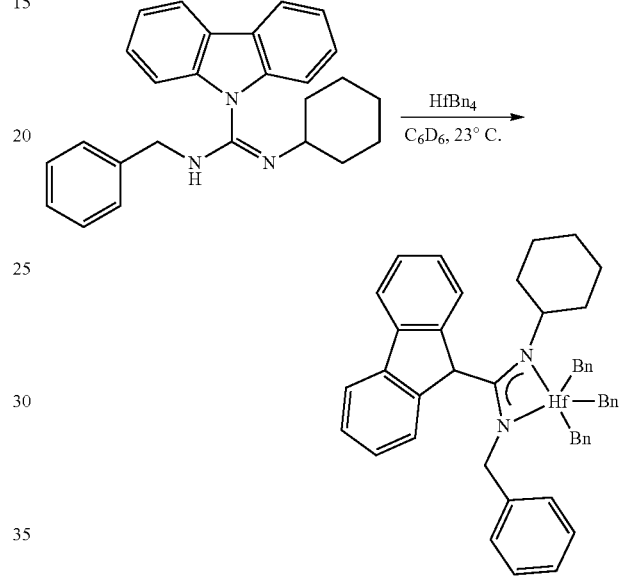

To a clear golden yellow solution of the HfBn$_4$ (28.5 mg, 0.0524 mmol, 1.00 eq) in a nitrogen filled glovebox in anhydrous deoxygenated C$_6$D$_6$ (1.0 mL) at 23° C. was added a solution of the guanidine (20.0 mg, 0.0524 mmol, 1.00 eq) in C$_6$D$_6$ (0.80 mL) in a dropwise manner. The now canary golden yellow solution was stirred vigorously (1000 rpm) for 1 hr, an aliquot was removed and NMR indicated complete conversion of the starting ligand, the solution was concentrated, suspended in anhydrous deoxygenated hexanes (3 mL), concentrated, the suspension/concentration process was repeated 2× more to remove residual C$_6$D$_6$ and PhMe, the resultant mixture was suspended in hexanes (2 mL), PhMe (2 mL) was added, the mixture was stirred vigorously (1000 rpm) for 2 mins, filtered through a 0.20 μm PTFE filter, rinsed with hexanes/PhMe (3×3 mL, 1:1), and the filtrate was concentrated to afford the hafnium complex as a light golden brown foam (40.3 mg, 0.0484 mmol, 92%). NMR indicated product.

$^1$H NMR (400 MHz, Benzene-$d_6$) δ 7.75 (ddd, J=7.8, 1.3, 0.7 Hz, 2H), 7.23-7.17 (m, 8H), 7.00 (dt, J=7.6, 1.2 Hz, 6H), 6.95 (dddd, J=8.7, 3.5, 2.5, 1.2 Hz, 6H), 6.76 (d, J=2.0 Hz, 1H), 6.75-6.73 (m, 2H), 6.54-6.46 (m, 3H), 4.07 (s, 2H), 2.99 (tt, J=11.5, 4.2 Hz, 1H), 2.30 (s, 6H), 1.45-1.14 (m, 5H), 1.02 (d, J=13.1 Hz, 1H), 0.68 (qt, J=13.2, 3.7 Hz, 2H), 0.38 (tdd, J=13.1, 9.4, 3.6 Hz, 2H). $^{13}$C NMR (101 MHz, Benzene-$d_6$) δ 164.21, 143.05, 139.33, 138.06, 128.99, 128.54, 128.22, 128.15, 128.03, 127.29, 126.65, 126.55, 123.45, 122.94, 121.22, 120.44, 110.78, 86.80, 56.88, 50.48, 34.52, 25.05, 24.81.

Example 37

Synthesis of Procatalyst 41

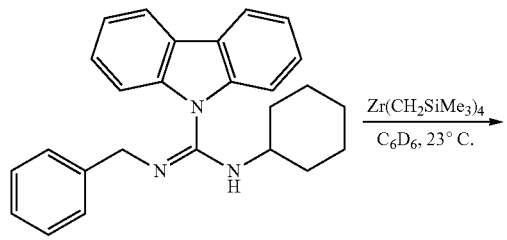

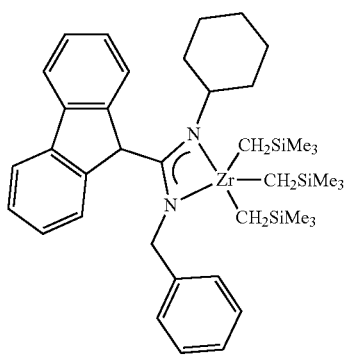

To a solution of tetrakis-trimethylsilylmethyl zirconium (11.5 mg, 0.0262 mmol, 1.00 eq) in $C_6D_6$ (0.23 mL) in a nitrogen filled glovebox at 23° C. was added a solution of the substrate (10.0 mg, 0.0262 mmol, 1.00 eq) in $C_6D_6$ (0.20 mL) in a dropwise manner. After stirring (300 rpm) for 90 mins an aliquot was removed and NMR indicated full conversion of the starting guanidine to the desired zirconium complex. The clear pale yellow solution was concentrated, suspended in anhydrous de-oxygenated pentane (3 mL), concentrated, this suspension/concentration process was repeated 3× more to remove residual $C_6D_6$, the resultant pale yellow amorphous foam was suspended in pentane (3 mL), stirred vigorously (1000 rpm) for 1 min, filtered through a 0.45 μm PTFE filter, rinsed with pentane (3×3 mL), and the filtrate was concentrated to afford the zirconium complex as a pale yellow amorphous foam (15.5 mg, 0.0211 mmol, 81%). NMR indicated product.

$^1$H NMR (500 MHz, Benzene-$d_6$) δ 7.82 (d, J=7.8 Hz, 2H), 7.53 (d, J=8.2 Hz, 2H), 7.28 (t, J=7.7 Hz, 2H), 7.13-7.08 (m, 2H), 6.86-6.82 (m, 2H), 6.80-6.76 (m, 3H), 4.21 (s, 2H), 3.10-3.01 (m, 1H), 1.75-1.68 (m, 2H), 1.48 (qd, J=11.8, 11.1, 6.9 Hz, 2H), 1.30 (s, 6H), 1.30-1.25 (m, 1H), 1.12-1.04 (m, 1H), 0.90-0.73 (m, 2H), 0.57-0.45 (m, 2H), 0.34 (s, 27H). $^{13}$C NMR (126 MHz, Benzene-$d_6$) δ 164.76, 140.05, 138.27, 128.17, 128.06, 126.72, 126.65, 123.61, 121.30, 120.64, 110.60, 71.46, 56.20, 51.62, 35.89, 25.04, 24.96, 2.96.

Example 38

Synthesis of Procatalyst 43

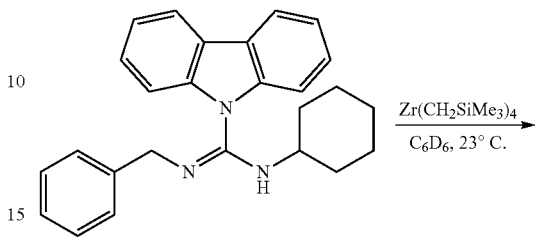

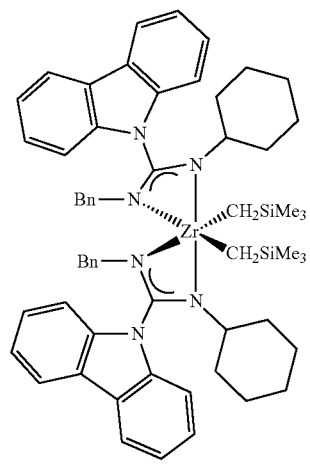

To a solution of tetrakis-trimethylsilylmethyl zirconium (14.4 mg, 0.0328 mmol, 1.00 eq) in $C_6D_6$ (0.29 mL) in a nitrogen filled glovebox at 23° C. was added a solution of the guanidine (25.0 mg, 0.0655 mmol, 2.00 eq) in $C_6D_6$ (0.50 mL). The clear pale yellow solution was stirred (300 rpm) for 1 hr upon which an aliquot was removed and NMR indicated complete conversion to the desired complex. The solution was concentrated, suspended in anhydrous deoxygenated pentane (3 mL), concentrated, this suspension/concentration process was repeated 3× more, the resultant pale yellow foam was suspended in pentane (3 mL), the resultant pale yellow mixture was stirred vigorously (1000 rpm) for 1 min, filtered through a 0.45 μm PTFE filter, rinsed with pentane (3×3 mL), and the filtrate was concentrated to afford the zirconium complex as an off-white amorphous foam (29.4 mg, 0.0286 mmol, 87%). NMR indicated product.

$^1$H NMR (500 MHz, Benzene-$d_6$) δ 7.85 (d, J=7.8 Hz, 4H), 7.68 (d, J=8.2 Hz, 4H), 7.30 (t, J=7.8 Hz, 4H), 7.12 (t, J=5.2 Hz, 4H), 6.87 (d, J=7.4 Hz, 4H), 6.80 (t, J=7.5 Hz, 4H), 6.73 (t, J=7.3 Hz, 2H), 4.57 (s, 4H), 3.18-3.05 (m, 2H), 1.91-1.83 (m, 4H), 1.67-1.55 (m, 4H), 1.45 (s, 4H), 1.42-1.34 (m, 4H), 1.25-1.12 (m, 2H), 1.01-0.87 (m, 2H), 0.70-0.54 (m, 4H), 0.49 (s, 18H). $^{13}$C NMR (126 MHz, Benzene-$d_6$) δ 165.34, 140.20, 138.60, 128.14, 128.05, 126.41, 126.36, 123.56, 121.09, 120.57, 111.12, 68.13, 56.49, 51.91, 35.88, 24.96, 22.32, 13.87, 3.72.

Example 39

Synthesis of Procatalyst 44

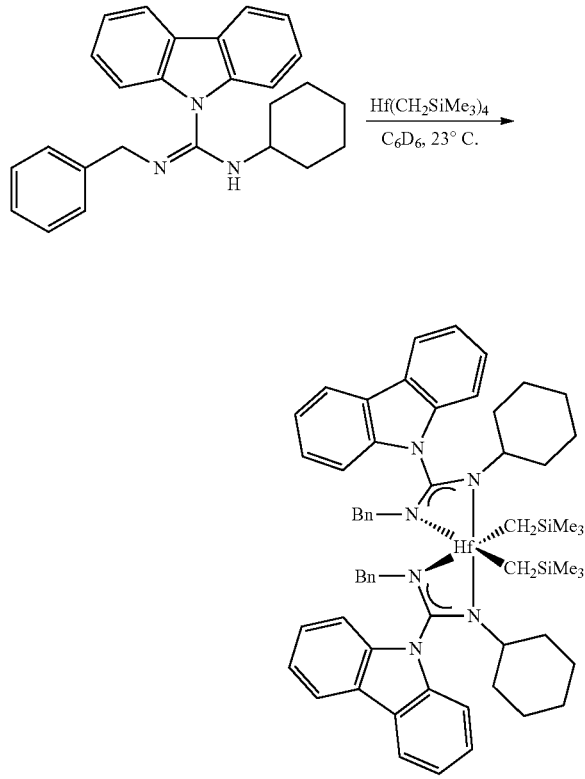

To a solution of tetrakis-trimethylsilylmethyl hafnium (17.3 mg, 0.0328 mmol, 1.00 eq) in $C_6D_6$ (0.35 mL) in a nitrogen filled glovebox at 23° C. was added a solution of the guanidine (25.0 mg, 0.0655 mmol, 2.00 eq) in $C_6D_6$ (0.50 mL). The clear pale yellow solution was stirred (300 rpm) for 1 hr upon which an aliquot was removed and NMR indicated complete conversion to the desired complex. The solution was concentrated, suspended in anhydrous deoxygenated pentane (3 mL), concentrated, this suspension/concentration process was repeated 3× more, the resultant pale yellow foam was suspended in pentane (3 mL), the resultant pale yellow mixture was stirred vigorously (1000 rpm) for 1 min, filtered through a 0.45 μm PTFE filter, rinsed with pentane (3×3 mL), and the filtrate was concentrated to afford the hafnium complex as a pale yellow amorphous foam (33.4 mg, 0.0299 mmol, 91%). NMR indicated product.

$^1$H NMR (500 MHz, Benzene-$d_6$) δ 7.84 (d, J=7.8 Hz, 4H), 7.67 (d, J=8.2 Hz, 4H), 7.29 (t, J=7.7 Hz, 4H), 7.12 (d, J=7.2 Hz, 4H), 6.86 (d, J=7.5 Hz, 4H), 6.79 (t, J=7.5 Hz, 4H), 6.74 (d, J=7.3 Hz, 2H), 4.62 (s, 4H), 3.26 (t, J=11.9 Hz, 2H), 1.92-1.82 (m, 4H), 1.68-1.58 (m, 4H), 1.42-1.33 (m, 4H), 1.25-1.12 (m, 2H), 1.01-0.87 (m, 2H), 0.85 (s, 4H), 0.67-0.54 (m, 4H), 0.51 (s, 18H). $^{13}$C NMR (126 MHz, Benzene-$d_6$) δ 164.40, 140.01, 138.67, 128.14, 126.46, 126.34, 123.58, 121.14, 120.57, 111.17, 68.15, 56.34, 51.70, 35.86, 24.96, 4.20.

Example 40

Synthesis of Procatalyst 49

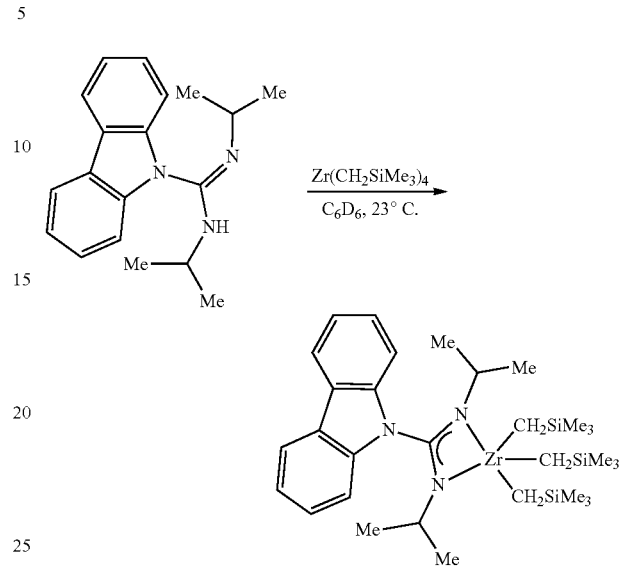

To a clear colorless solution of the $Zr(CH_2SiMe_3)_4$ (30.0 mg, 0.0682 mmol, 1.00 eq) in a nitrogen filled glovebox in anhydrous deoxygenated $C_6D_6$ (1.0 mL) at 23° C. was added a solution of the guanidine (20.0 mg, 0.0682 mmol, 1.00 eq) in $C_6D_6$ (0.80 mL) in a dropwise manner. The now canary golden yellow solution was stirred vigorously (1000 rpm) for 1 hr, an aliquot was removed and NMR indicated complete conversion of the starting ligand, the solution was concentrated, suspended in anhydrous deoxygenated pentane (3 mL), concentrated, the suspension/concentration process was repeated 2× more to remove residual $C_6D_6$ and $Me_4Si$, the resultant mixture was suspended in pentane (3 mL), filtered through a 0.20 μm PTFE filter, rinsed with pentane (3×3 mL), and the filtrate was concentrated to afford the zirconium complex as a canary yellow foam (35.2 mg, 0.0545 mmol, 80%). NMR indicated product.

$^1$H NMR (400 MHz, Benzene-$d_6$) δ 7.88 (dt, J=7.8, 1.1 Hz, 2H), 7.58 (dt, J=8.2, 0.9 Hz, 2H), 7.32 (ddd, J=8.3, 5.8, 1.2 Hz, 2H), 7.17-7.11 (m, 2H), 3.10 (q, J=6.5 Hz, 2H), 1.32 (s, 6H), 0.90 (d, J=6.5 Hz, 12H), 0.35 (s, 27H). $^{13}$C NMR (101 MHz, Benzene-$d_6$) δ 163.21, 138.78, 126.76, 123.39, 121.18, 120.79, 109.98, 71.04, 48.01, 24.89, 2.99.

Example 41

Synthesis of Procatalyst 50

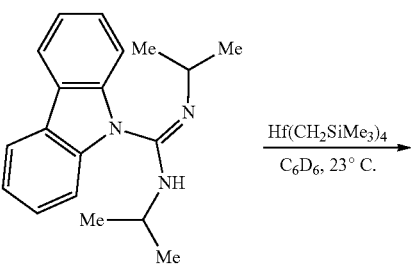

-continued

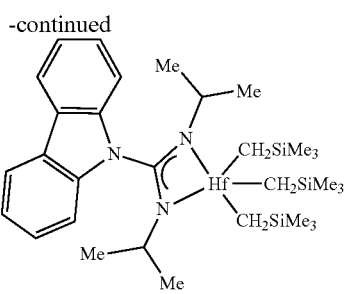

To a clear colorless solution of the Hf(CH$_2$SiMe$_3$)$_4$ (36.0 mg, 0.0682 mmol, 1.00 eq) in a nitrogen filled glovebox in anhydrous deoxygenated C$_6$D$_6$ (1.0 mL) at 23° C. was added a solution of the guanidine (20.0 mg, 0.0682 mmol, 1.00 eq) in C$_6$D$_6$ (0.80 mL) in a dropwise manner. The now canary golden yellow solution was stirred vigorously (1000 rpm) for 1 hr, an aliquot was removed and NMR indicated complete conversion of the starting ligand, the solution was concentrated, suspended in anhydrous deoxygenated pentane (3 mL), concentrated, the suspension/concentration process was repeated 2× more to remove residual C$_6$D$_6$ and Me$_4$Si, the resultant mixture was suspended in pentane (3 mL), filtered through a 0.20 μm PTFE filter, rinsed with pentane (3×3 mL), and the filtrate was concentrated to afford the hafnium complex as a canary yellow foam (43.0 mg, 0.0587 mmol, 86%). NMR indicated product.

$^1$H NMR (500 MHz, Benzene-d$_6$) δ 7.88 (d, J=7.7 Hz, 2H), 7.59 (d, J=8.1 Hz, 2H), 7.37-7.30 (m, 2H), 7.14 (dd, J=15.5, 7.8 Hz, 2H), 3.31 (p, J=6.5 Hz, 2H), 0.90 (d, J=6.4 Hz, 12H), 0.72 (s, 6H), 0.37 (s, 27H). $^{13}$C NMR (126 MHz, Benzene-d$_6$) δ 163.07, 138.81, 126.79, 123.49, 121.29, 120.81, 110.03, 77.17, 47.83, 24.78, 3.39.

Example 42

Synthesis of Procatalyst 55

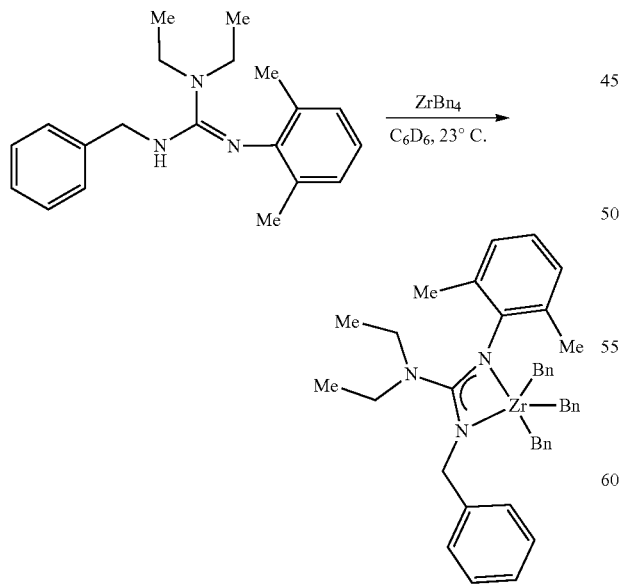

To a clear golden yellow solution of the ZrBn$_4$ (32.4 mg, 0.0711 mmol, 1.00 eq) in a nitrogen filled glovebox in anhydrous deoxygenated C$_6$D$_6$ (1.0 mL) at 23° C. was added a solution of the guanidine (22.0 mg, 0.0711 mmol, 1.00 eq) in C$_6$D$_6$ (0.88 mL) in a dropwise manner. The now canary golden yellow solution was stirred vigorously (1000 rpm) for 1 hr, an aliquot was removed and NMR indicated complete conversion of the starting ligand, the solution was concentrated, suspended in anhydrous deoxygenated hexanes (3 mL), concentrated, the suspension/concentration process was repeated 2× more to remove residual C$_6$D$_6$ and PhMe, the resultant mixture was suspended in hexanes (2 mL), PhMe (2 mL) was added, the mixture was stirred vigorously (1000 rpm) for 2 mins, filtered through a 0.20 μm PTFE filter, rinsed with hexanes/PhMe (3×3 mL, 1:1), and the filtrate was concentrated to afford the zirconium complex as a golden orange foam (47.1 mg, 0.0560 mmol, 79%). NMR indicated product.

$^1$H NMR (500 MHz, Benzene-d$_6$) δ 7.34-7.30 (m, 2H), 7.18-7.13 (m, 2H), 7.09-7.04 (m, 5H), 7.04-6.99 (m, 2H), 6.98-6.95 (m, 2H), 6.90-6.86 (m, 4H), 6.68-6.63 (m, 6H), 4.02 (s, 2H), 2.58 (q, J=7.1 Hz, 4H), 2.31 (s, 6H), 2.11 (s, 6H), 0.39 (t, J=7.1 Hz, 6H). $^{13}$C NMR (126 MHz, Benzene-d$_6$) δ 174.22, 146.19, 143.48, 141.85, 132.84, 129.39, 128.82, 128.43, 128.32, 128.17, 125.80, 124.10, 122.35, 72.59, 50.69, 39.72, 19.48, 11.98.

Example 43

Synthesis of Procatalyst 57

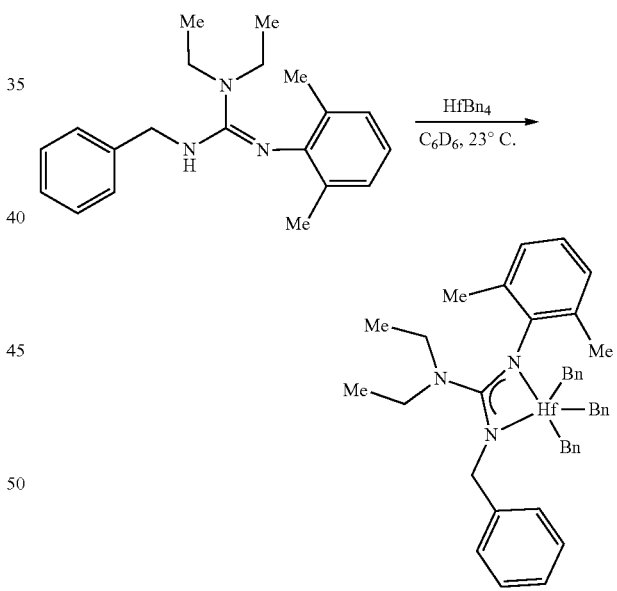

To a clear golden yellow solution of the HfBn$_4$ (22.0 mg, 0.0404 mmol, 1.00 eq) in a nitrogen filled glovebox in anhydrous deoxygenated C$_6$D$_6$ (1.0 mL) at 23° C. was added a solution of the guanidine (12.5 mg, 0.0404 mmol, 1.00 eq) in C$_6$D$_6$ (0.48 mL) in a dropwise manner. The now canary golden yellow solution was stirred vigorously (1000 rpm) for 1 hr, an aliquot was removed and NMR indicated complete conversion of the starting ligand, the solution was concentrated, suspended in anhydrous deoxygenated hexanes (3 mL), concentrated, the suspension/concentration process was repeated 2× more to remove residual C$_6$D$_6$ and PhMe, the resultant mixture was suspended in hexanes (2 mL), PhMe (2 mL) was added, the mixture was stirred vigorously (1000 rpm) for 2 mins, filtered through a 0.20 μm PTFE filter, rinsed with hexanes/PhMe (3×3 mL, 1:1), and the filtrate was concentrated to afford the hafnium complex as a golden orange foam (29.0 mg, 0.0381 mmol, 94%). NMR indicated product.

$^1$H NMR (500 MHz, Benzene-d$_6$) δ 7.33-7.29 (m, 2H), 7.18-7.13 (m, 2H), 7.11-7.08 (m, 4H), 6.95 (dq, J=7.3, 0.6 Hz, 3H), 6.90-6.82 (m, 6H), 6.75-6.70 (m, 6H), 4.13 (s, 2H), 2.53 (q, J=7.1 Hz, 4H), 2.30 (s, 6H), 1.91 (s, 6H), 0.35 (t, J=7.1 Hz, 6H). $^{13}$C NMR (126 MHz, Benzene-d$_6$) δ 172.41, 145.18, 143.74, 141.53, 133.14, 128.94, 128.71, 128.45, 128.17, 126.47, 125.78, 124.54, 122.38, 80.43, 50.24, 39.89, 19.31, 12.00.

Example 44

Synthesis of Ligand 17

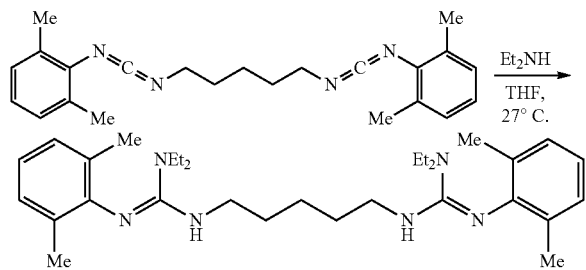

To a stirring (300 rpm) solution of Et$_2$NH (5 mL) was added a solution of the biscarbodiimide (98.0 mg, 0.2718 mmol, 1.00 eq) in anhydrous de-oxygenated THF (2 mL) in a slow dropwise manner over 1 minute. After stirring for 72 hrs at 27° C. the pale yellow solution was concentrated, hexanes (5 mL) was added, the mixture was concentrated, this process was repeated 3× more to remove residual Et$_2$NH, the viscous foam was suspended in hexanes (5 mL), stirred vigorously (1000 rpm), filtered through a 0.45 μm submicron PTFE filter, rinsed with hexanes (3×3 mL), and concentrated to afford the bisguanidine as a viscous white foam (128.0 mg, 0.2526 mmol, 93%). NMR indicated product.

$^1$H NMR (400 MHz, Benzene-d$_6$) δ 7.07 (d, J=7.5 Hz, 4H), 6.88 (t, J=7.4 Hz, 2H), 3.13 (q, J=7.0 Hz, 10H), 2.59-2.47 (m, 4H), 2.21 (s, 12H), 1.06 (t, J=7.1 Hz, 12H), 0.76 (p, J=7.5 Hz, 4H), 0.55 (p, J=7.7, 7.2 Hz, 2H). $^{13}$C NMR (101 MHz, Benzene-d$_6$) δ 153.15, 148.13, 129.14, 128.07, 121.44, 44.37, 42.61, 30.19, 23.61, 18.55, 12.85.

Example 45

Synthesis of Ligand 18

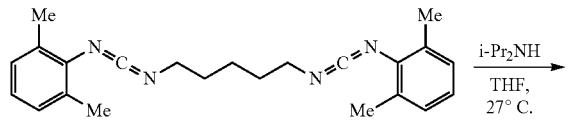

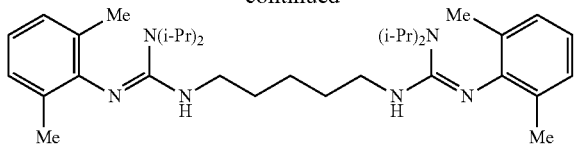

To a stirring (300 rpm) solution of i-Pr$_2$NH (5 mL) was added a solution of the biscarbodiimide (98.0 mg, 0.2718 mmol, 1.00 eq) in anhydrous de-oxygenated THF (2 mL) in a slow dropwise manner. After stirring for 24 hrs at 27° C. the now pale yellow solution was concentrated, hexanes (5 mL) was added, the mixture was concentrated, this process was repeated 3× more to remove residual i-Pr$_2$NH, the viscous foam was suspended in hexanes (5 mL), stirred vigorously (1000 rpm), filtered through a 0.45 μm submicron PTFE filter, rinsed with hexanes (3×3 mL), and concentrated to afford the bisguanidine as a clear colorless oil (150.8 mg, 0.2679 mmol, 99%). NMR indicated product which exists as a mixture of isomers and rotomers.

Product Exists as a Mixture of Isomers: (*) Denotes Minor Isomer $^1$H NMR (400 MHz, Benzene-d$_6$) δ 7.06 (dd, J=7.5, 4.7 Hz, 4H), 6.90-6.78 (m, 2H), 3.69 (pd, J=6.8, 2.1 Hz, 4H), 3.21 (t, J=6.0 Hz, 2H) (2.84 (t, J=6.8 Hz, 2H)*), (2.50 (q, J=6.5 Hz, 4H)*) 2.47-2.40 (m, 4H), (2.27 (d, J=0.8 Hz, 6H*) (2.26 (s, 6H)*) 2.24 (s, 12H), 1.20 (d, J=6.8 Hz, 24H), (0.91-0.80 (m, 4H)*) 0.75 (p, J=7.5 Hz, 4H), 0.54 (p, J=7.6, 7.0 Hz, 2H). $^{13}$C NMR (101 MHz, Benzene-d$_6$) δ 152.22, 148.45, (132.07*) 128.77, 124.07, 120.84, 47.11 (46.09*), (44.03*) 44.01, (30.46*) 29.89 (29.76*), (23.83*) 23.77, 21.82, 18.87 (18.74*).

Example 46

Polymerization Processes

Catalyst activity (in terms of quench time, efficiency, and polymer yield) and resulting polymer characteristics were assessed for Procatalysts 1-74. The polymerization reactions were carried out in a parallel pressure reactor (PPR) and/or a semi-batch reactor.

The PPR polymerization experiments were conducted at both 120° C. and 150° C. using [HNMe(C$_{18}$H$_{37}$)$_2$][B(C$_6$F$_5$)$_4$] as the activator in amounts of 1.5 molar equivalents in relation to the procatalyst, and MMAO-3A (500 nmoles at 120° C. or 750 nmoles at 150° C.) was employed as the scavenger. When the reactor temperature was 120° C., the ethylene pressure was 150 psi. When the reactor temperature was 150° C., the ethylene pressure was 213 psi. The reaction run time was 30 mins or until 50 psi conversion at 120° C. or 75 psi conversion at 150° C. The reactions were quenched with 10% CO.

TABLE 1

Polymerization Data from PPR Experiments

| Procatalyst No. | Temp. (° C.) | Loading (nmoles) | Quench Time (seconds) | Yield (mg) | Mw (g/mol) | PDI (Mw/Mn) | Mol % Octene* |
|---|---|---|---|---|---|---|---|
| 1 | 120 | 100 | 73 | 141 | 319,449 | 6.6 | 4.5 |
| 1 | 150 | 50 | 184 | 124 | 187,144 | 7.1 | 2.6 |
| 2 | 120 | 100 | 206 | 85 | 416,441 | 5.7 | 4.0 |
| 2 | 150 | 50 | 1,801 | 38 | 195,040 | 8.2 | 3.0 |
| 3 | 150 | 50 | 510 | 114 | 253,721 | 12.6 | 2.5 |
| 3 | 150 | 100 | 167 | 129 | 173,628 | 10.4 | 2.8 |
| 4 | 150 | 50 | 1,801 | 10 | N.D. | N.D. | N.D. |
| 4 | 150 | 100 | 1,801 | 24 | 191,382 | 12.5 | 2.5 |
| 5 | 120 | 100 | 161 | 107 | 391,925 | 4.5 | 2.0 |
| 5 | 150 | 50 | 180 | 134 | 231,628 | 6.3 | 2.1 |
| 6 | 120 | 100 | 929 | 75 | 343,213 | 9.7 | 2.6 |
| 6 | 150 | 50 | 1,801 | 40 | 161,283 | 8.2 | 2.1 |
| 7 | 150 | 50 | 1,801 | 106 | 258,297 | 8.6 | 1.7 |
| 7 | 150 | 100 | 1,131 | 107 | 268,165 | 6.2 | 1.7 |
| 8 | 150 | 50 | 1,802 | 15 | N.D. | N.D. | N.D. |
| 8 | 150 | 100 | 1,801 | 9 | N.D. | N.D. | N.D. |
| 9 | 120 | 100 | 124 | 131 | 455,854 | 7.9 | 4.3 |
| 9 | 150 | 50 | 1,801 | 90 | 346,484 | 24.6 | 1.8 |
| 10 | 120 | 100 | 450 | 84 | 347,433 | 6.9 | 4.1 |
| 10 | 150 | 50 | 1,802 | 32 | 198,947 | 8.4 | 3.8 |
| 11 | 120 | 100 | 630 | 78 | 674,709 | 12.6 | 2.0 |
| 11 | 150 | 50 | 1,518 | 105 | 332,706 | 13.9 | 1.8 |
| 12 | 120 | 100 | 1,801 | 24 | 157,601 | 8.6 | 0.8 |
| 12 | 150 | 50 | 1,801 | 22 | 133,595 | 7.2 | 1.2 |
| 13 | 120 | 100 | 87 | 136 | 409,630 | 8.6 | 3.7 |
| 13 | 150 | 50 | 1,802 | 90 | 257,142 | 20.0 | 2.6 |
| 14 | 120 | 100 | 1,801 | 63 | 524,280 | 8.6 | 3.1 |
| 14 | 150 | 50 | 1,801 | 17 | N.D. | N.D. | N.D. |
| 15 | 120 | 100 | 56 | 168 | 258,221 | 9.1 | 6.1 |
| 15 | 150 | 50 | 219 | 123 | 203,198 | 9.0 | 3.4 |
| 16 | 120 | 100 | 126 | 126 | 430,551 | 5.1 | 4.0 |
| 16 | 150 | 50 | 1,801 | 55 | 202,575 | 6.9 | 3.4 |
| 19 | 120 | 100 | 98 | 98 | 821,752 | 20.1 | 4.2 |
| 19 | 150 | 50 | 1,801 | 41 | 464,865 | 24.1 | 1.8 |
| 20 | 120 | 100 | 115 | 127 | 834,676 | 5.3 | 0.7 |
| 20 | 150 | 50 | 1,801 | 34 | 311,785 | 5.8 | 1.1 |
| 21 | 120 | 100 | 89 | 103 | 729,175 | 5.8 | 3.2 |
| 21 | 150 | 50 | 1,800 | 40 | 582,475 | 6.3 | 0.7 |
| 22 | 120 | 100 | 66 | 144 | 543,655 | 5.9 | 1.1 |
| 22 | 150 | 50 | 1,801 | 47 | 310,887 | 5.6 | 0.7 |
| 23 | 120 | 100 | 1,222 | 68 | 1,270,947 | 22.4 | 3.2 |
| 23 | 150 | 50 | 1,801 | 54 | 366,580 | 27.5 | 2.3 |
| 24 | 120 | 100 | 1,802 | 21 | 632,536 | 13.4 | 1.5 |
| 24 | 150 | 50 | 1,801 | 10 | N.D. | N.D. | N.D. |
| 25 | 150 | 50 | 1,784 | 97 | 333,301 | 7.0 | 0.8 |
| 26 | 150 | 50 | 1,802 | 21 | 79,524 | 7.4 | 0.6 |
| 27 | 120 | 100 | 197 | 94 | 771,933 | 35.4 | 2.3 |
| 27 | 150 | 50 | 941 | 109 | 338,520 | 15.1 | 0.9 |
| 28 | 120 | 100 | 1,288 | 75 | 345,773 | 4.9 | 0.9 |
| 28 | 150 | 50 | 1,802 | 25 | 129,222 | 11.8 | 1.5 |
| 29 | 120 | 100 | 1,802 | 1 | N.D. | N.D. | N.D. |
| 29 | 150 | 50 | 1,801 | 33 | 248,844 | 7.3 | 0.4 |
| 30 | 120 | 100 | 1,802 | 0 | N.D. | N.D. | N.D. |
| 30 | 150 | 50 | 1,801 | 3 | N.D. | N.D. | N.D. |
| 31 | 120 | 100 | 61 | 147 | 752,081 | 8.3 | 4.2 |
| 31 | 150 | 50 | 1,800 | 104 | 420,275 | 18.7 | 1.5 |
| 32 | 120 | 100 | 134 | 131 | 979,095 | 4.8 | 0.7 |
| 32 | 150 | 50 | 1,801 | 16 | N.D. | N.D. | N.D. |
| 33 | 120 | 100 | 47 | 149 | 591,297 | 5.5 | 0.5 |
| 33 | 150 | 50 | 602 | 108 | 558,881 | 12.8 | 1.3 |
| 34 | 120 | 100 | 93 | 133 | 627,008 | 3.9 | 1.0 |
| 34 | 150 | 50 | 1,800 | 15 | N.D. | N.D. | N.D. |
| 35 | 150 | 50 | 1,802 | 38 | 824,139 | 38.6 | 0.6 |
| 36 | 150 | 50 | 1,801 | 1 | N.D. | N.D. | N.D. |
| 37 | 120 | 100 | 41 | 187 | 509,157 | 12.0 | 1.4 |
| 37 | 150 | 50 | 267 | 108 | 727,238 | 16.2 | 1.0 |
| 38 | 120 | 100 | 73 | 162 | 516,947 | 3.7 | 1.8 |
| 38 | 150 | 50 | 1,801 | 85 | 403,932 | 6.1 | 0.7 |
| 39 | 150 | 50 | 98 | 133 | 506,980 | 6.6 | 1.2 |
| 40 | 150 | 50 | 259 | 127 | 351,359 | 3.0 | 0.8 |
| 43 | 150 | 50 | 1,800 | 21 | 528,154 | 18.3 | 1.3 |
| 44 | 150 | 50 | 1,801 | 4 | N.D. | N.D. | N.D. |
| 45 | 120 | 100 | 125 | 99 | 413,959 | 9.7 | 4.4 |
| 45 | 150 | 150 | 1,802 | 77 | 130,015 | 23.0 | 3.2 |
| 46 | 120 | 100 | 1,800 | 35 | 151,190 | 3.3 | 6.2 |

TABLE 1-continued

Polymerization Data from PPR Experiments

| Procatalyst No. | Temp. (° C.) | Loading (nmoles) | Quench Time (seconds) | Yield (mg) | Mw (g/mol) | PDI (Mw/Mn) | Mol % Octene* |
|---|---|---|---|---|---|---|---|
| 46 | 150 | 150 | 1,800 | 11 | N.D. | N.D. | N.D. |
| 47 | 120 | 100 | 65 | 117 | 331,023 | 3.9 | 3.3 |
| 47 | 150 | 150 | 1,801 | 92 | 125,953 | 6.9 | 2.4 |
| 48 | 120 | 100 | 561 | 70 | 223,085 | 6.8 | 2.8 |
| 48 | 150 | 150 | 1,800 | 35 | 42,799 | 4.3 | 2.2 |
| 51 | 120 | 100 | 123 | 129 | 156,878 | 13.3 | 3.3 |
| 51 | 150 | 150 | 1,801 | 106 | 151,718 | 22.9 | 3.0 |
| 52 | 120 | 100 | 1,801 | 26 | 215,555 | 11.6 | 4.2 |
| 52 | 150 | 150 | 1,801 | 12 | N.D. | N.D. | N.D. |
| 53 | 120 | 100 | 78 | 133 | 139,435 | 8.2 | 3.4 |
| 53 | 150 | 150 | 1,294 | 115 | 187,768 | 17.2 | 2.6 |
| 54 | 120 | 100 | 1,802 | 35 | 207,656 | 9.7 | 3.5 |
| 54 | 150 | 150 | 1,801 | 17 | N.D. | N.D. | N.D. |
| 55 | 120 | 100 | 48 | 160 | 116,001 | 5.4 | 5.3 |
| 55 | 150 | 150 | 62 | 163 | 57,172 | 6.0 | 4.2 |
| 56 | 120 | 100 | 69 | 162 | 121,703 | 4.9 | 5.3 |
| 56 | 150 | 150 | 144 | 142 | 52,641 | 4.2 | 4.9 |
| 57 | 120 | 100 | 44 | 152 | 120,667 | 4.5 | 4.8 |
| 57 | 150 | 150 | 67 | 156 | 49,393 | 5.2 | 4.3 |
| 58 | 120 | 100 | 69 | 150 | 141,487 | 5.9 | 4.7 |
| 58 | 150 | 150 | 78 | 160 | 41,477 | 4.9 | 4.6 |
| 59 | 120 | 100 | 162 | 103 | 490,743 | 9.5 | 4.3 |
| 60 | 120 | 100 | 1,801 | 23 | 151,951 | 5.9 | 4.9 |
| 61 | 120 | 100 | 75 | 123 | 356,085 | 4.5 | 4.4 |
| 62 | 120 | 100 | 1,801 | 47 | 153,362 | 5.6 | 3.3 |
| 63 | 120 | 100 | 1,801 | 17 | N.D. | N.D. | N.D. |
| 64 | 120 | 100 | 1,801 | 1 | N.D. | N.D. | N.D. |
| 65 | 120 | 100 | 1,801 | 46 | 330,851 | 39.5 | 7.3 |
| 66 | 120 | 100 | 1,800 | 9 | N.D. | N.D. | N.D. |
| 67 | 120 | 100 | 200 | 124 | 322,671 | 5.3 | 3.2 |
| 68 | 120 | 100 | 1,800 | 31 | 186,803 | 6.5 | 3.2 |
| 69 | 120 | 100 | 103 | 96 | 555,671 | 12.7 | 3.2 |
| 70 | 120 | 100 | 101 | 140 | 560,358 | 4.7 | 3.0 |
| 71 | 120 | 100 | 197 | 98 | 419,183 | 7.4 | 9.8 |
| 72 | 120 | 100 | 1,800 | 52 | 253,239 | 11.1 | 9.7 |
| 73 | 120 | 100 | 700 | 72 | 603,691 | 17.2 | 9.6 |
| 74 | 120 | 100 | 1,802 | 47 | 286,568 | 12.2 | 10.4 |
| 56 | 120 | 100 | 69 | 162 | 121,703 | 4.9 | 5.3 |

*Mol % Octene or C8/olefin is defined as: (moles 1-octene/(total moles 1-octene and ethylene)) × 100.

TABLE 2

Polymerization Data from Semi-Batch Reactor Experiments

| Procatalyst No. | Temp. (° C.) | Ethylene Uptake (g) | Efficiency (g poly/g metal) | Mw (g/mol) | PDI (Mw/Mn) | Mol % Octene | $T_M$ (° C.) |
|---|---|---|---|---|---|---|---|
| 1 | 120 | 15.7 | N.D. | 736,074 | 6.9 | N.D. | 110.9 |
| 1 | 150 | 12.8 | N.D. | 287,596 | 5.4 | N.D. | 110.3 |
| 13 | 120 | 12.7 | 164,430 | 661,698 | 6.3 | 5.5 | 112.8 |
| 13 | 150 | 10.5 | 73,080 | 278,068 | 4.7 | 3.4 | 112.0 |
| 15 | 120 | 17.1 | 140,314 | 661,129 | 6.4 | 2.3 | 115.0 |
| 15 | 150 | 11.9 | 63,464 | 286,281 | 4.6 | 2.3 | 114.6 |
| 37 | 120 | 20.5 | 317,899 | 781,695 | 9.8 | 3.6 | 93.7 |
| 37 | 150 | 11.0 | 65,772 | 414,745 | 7.1 | 3.6 | 120.5 |
| 38 | 120 | 10.7 | 56,026 | 513,405 | 7.3 | 4.7 | 99.4 |
| 38 | 150 | 9.9 | 25,056 | 444,869 | 6.8 | 3.0 | 124.5 |
| 55 | 120 | 25.7 | 285,013 | 428,090 | 6.9 | 3.7 | 102.3 |
| 55 | 150 | 12.5 | 95,004 | 146,470 | 5.2 | 4.0 | 111.4 |
| 56 | 120 | 22.0 | 140,064 | 140,064 | 5.0 | 4.3 | 101.3 |
| 56 | 150 | 13.4 | 36,252 | 36,252 | 4.2 | 4.1 | 105.4 |

The semi-batch reactor polymerization reactions were carried out in a 4-L semi-batch reactor initially without diethyl zinc (DEZ) at 120° C. and 150° C., and then with three different loadings of DEZ added (in amounts of 0, 95, and 380 μmol) at 150° C. The activator was [HNMe(C$_{18}$H$_{37}$)$_2$][B(C$_6$F$_5$)$_4$] in amounts of 1.2 molar equivalents, and the scavenger was MMAO-3 (19.0 μmol). The run time for each polymerization experiment was 10 minutes.

To determine the chain transfer rate for the procatalysts, a semi-batch campaign was conducted using varying amounts of the chain transfer agent, Et$_2$Zn in amounts of 0 μmoles, 95 μmoles, and 380 μmoles). All reactions employed 1.2 equivalents of [HNMe(C$_{18}$H$_{37}$)$_2$][B(C$_6$F$_5$)$_4$] as the activator at 150° C. The batch campaign was conducted at 150° C. with 34 g of ethylene under a pressure of 163 psi, 110 g of 1-octene, and 1010 g of IsoparE. The run time for each polymerization experiment was 10 minutes. The measured ethylene uptake as well as the Mw, PDI and comonomer incorporation of the corresponding produced polymers is presented in Table 3. The Mn for each run was calculated using Equation 3 with the values of Ca and $Mn_0$ fit using the Microsoft Excel Solver to minimize the squared deviations between the fitted and experimental molecular weight data for all the runs with a particular catalyst. The calculated Ca values are presented in Table 4.

TABLE 3

Polymerization Data from Semi-Batch Reactor Experiments with $Et_2Zn$ (DEZ)

| Procatalyst No. | Temp. (° C.) | DEZ (μmol) | Ethylene Uptake (g) | Mw (g/mol) | PDI (Mw/Mn) | Mol % Octene* | $T_M$ (° C.) |
|---|---|---|---|---|---|---|---|
| 1 | 150 | 0 | 11.6 | 268,587 | 4.3 | 2.2 | 115.9 |
| 1 | 150 | 95 | 10.7 | 96,799 | 4.5 | 1.9 | 119.3 |
| 1 | 150 | 380 | 11.5 | 40,387 | 3.9 | 1.9 | 120.9 |
| 13 | 150 | 0 | 15.6 | 267,427 | 5.0 | 2.2 | 115.3 |
| 13 | 150 | 95 | 14.0 | 117,308 | 3.3 | 1.7 | 117.7 |
| 13 | 150 | 380 | 18.1 | 62,848 | 3.6 | 1.6 | 118.5 |
| 15 | 150 | 0 | 9.2 | 185,736 | 4.7 | 1.3 | 120.3 |
| 15 | 150 | 95 | 6.2 | 56,051 | 3.2 | 1.1 | 123.6 |
| 37 | 150 | 0 | 12.6 | 582,857 | 6.2 | 2.3 | 122.0 |
| 37 | 150 | 95 | 14.3 | 342,997 | 6.9 | 1.4 | 122.9 |
| 37 | 150 | 380 | 16.1 | 200,558 | 9.8 | 1.3 | 124.8 |
| 38 | 150 | 0 | 14.0 | 324,972 | 3.4 | 0.77 | 127.5 |
| 38 | 150 | 95 | 15.4 | 236,683 | 3.5 | 0.13 | 128.5 |
| 38 | 150 | 380 | 15.9 | 157,431 | 5.0 | 0.19 | 129.6 |
| 55 | 150 | 0 | 9.9 | 111,686 | 4.5 | 3.0 | 113.5 |
| 55 | 150 | 95 | 12.3 | 79,924 | 4.2 | 2.7 | 114.2 |
| 55 | 150 | 380 | 12.4 | 37,049 | 5.2 | 2.6 | 116.4 |
| 56 | 150 | 0 | 17.6 | 448,180 | 2.9 | 3.0 | 109.3 |
| 56 | 150 | 95 | 18.1 | 89,864 | 2.5 | 2.8 | 110.5 |
| 56 | 150 | 380 | 17.5 | 55,753 | 2.5 | 2.7 | 111.8 |

*Standard Semi-batch reactor conditions using $Et_2Zn$ as CSA: 150° C. - 34 g ethylene and 110 g 1-octene in 1010 g of IsoparE under a pressure of 163 psi.
*Mol % Octene or C8/olefin is defined as: (moles 1-octene/(total moles 1-octene and ethylene)) × 100.
N.D. = Not Determined.
Reactor run time = 10 mins.
Scavenger = MMAO-3 (19.0 μmol).
Activator = $[HNMe(C_{18}H_{37})_2][B(C_6F_5)_4]$ (1.2 eq).

TABLE 4

Chain Transfer Constants from Semi-Batch Reactor Experiments with $Et_2Zn$

| Procatalyst No. | Temp. (° C.) | Chain Transfer Constant (Ca) | PDI with no DEZ | PDI with 95 μmoles DEZ | PDI with μmoles DEZ |
|---|---|---|---|---|---|
| 1 | 150 | 1.7 | 4.3 | 4.5 | 3.9 |
| 13 | 150 | 0.58 | 5.0 | 3.3 | 3.6 |
| 15 | 150 | 2.0 | 4.7 | 3.2 | — |
| 37 | 150 | 0.58 | 6.2 | 6.9 | 9.8 |
| 38 | 150 | 0.29 | 3.4 | 3.5 | 5.0 |
| 55 | 150 | 1.1 | 4.5 | 4.2 | 5.2 |
| 56 | 150 | 0.59 | 2.9 | 2.5 | 2.5 |

The high chain transfer constants of greater than or equal to 1 for procatalysts 1, 15, and 55 at 150° C. indicate that these catalysts have a high sensitivity to chain transfer agents and rapidly undergo chain transfer with these chain transfer agents. Only a modest sensitivity to chain shuttling agents (Ca≥0.5) is observed for procatalysts 13, 37, and 56. For procatalysts 1, 13, 15, and 56, a decrease in PDI or a consistently narrow PDI is observed with increases in the amount of $Et_2Zn$ (DEZ). This trend is evidence that procatalysts 1, 13, 15, and 56 potentially undergo reversible chain transfer with a chain shuttling agent as opposed to irreversible chain transfer. These behaviors are not observed with procatalysts 37, 38, or 55, for which an increase in PDI is observed with increasing amount of DEZ, thereby suggesting behavior consistent with irreversible chain transfer with chain shuttling agents.

The invention claimed is:

1. A process for polymerizing polyolefin, the process comprising contacting ethylene and optionally one or more $(C_3-C_{12})$ α-olefin in the presence of a catalyst system, wherein the catalyst system comprises a metal-ligand structure according to formula (I):

$$\left( \begin{array}{c} R^1 \\ | \\ N \\ A \diagdown \diagup \\ \diagup \diagdown \\ N \\ | \\ R^4 \end{array} \right)_m M \!\!-\!\! (X)_n \quad (I)$$

where:
  M is a metal chosen from zirconium, or hafnium, the metal having a formal oxidation state of +2, +3, or +4;
  X is a monodentate or bidentate ligand independently chosen from unsaturated $(C_2-C_{20})$ hydrocarbon, unsaturated $(C_2-C_{50})$ heterohydrocarbon, $(C_1-C_{50})$ hydrocarbyl, $(C_6-C_{50})$ aryl, $(C_6-C_{50})$ heteroaryl, $(C_4-C_{12})$diene, halogen, —$OR^X$, —$N(R^X)_2$, or —$NCOR^X$, wherein each $R^X$ is $(C_1-C_{30})$ hydrocarbyl or —H;
  n is 1, 2, or 3;
  m is 1 or 2;
  m+n=3 or 4;
  each $R^1$ is $R^{1a}$ or $R^{1b}$;
  each $R^4$ is $R^{4a}$ or $R^{4b}$;
  $R^{1a}$, $R^{1b}$, $R^{4a}$, and $R^{4b}$ are independently chosen from —H, $(C_1-C_{40})$ hydrocarbyl, $(C_1-C_{40})$ heterohydrocarbyl, $(C_1$-$C_{40})$ aryl, $(C_1$-$C_{40})$ heteroaryl, $-P(R^P)_2$, $-N(R^N)_2$, $R^CS(O)-$, $R^CS(O)_2-$, or $(R^C)_2C=N-$, where each $R^C$ and each $R^P$ is unsubstituted $(C_1$-$C_{18})$ hydrocarbyl or $-H$, and where each $R^N$ is unsubstituted $(C_1$-$C_{18})$ hydrocarbyl;

each A is selected from the group consisting of:

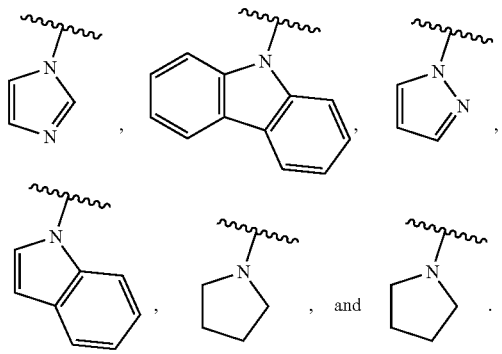

2. The process according to claim 1, wherein m is 2, n is 2, and the metal-ligand complex has a structure according to formula (II):

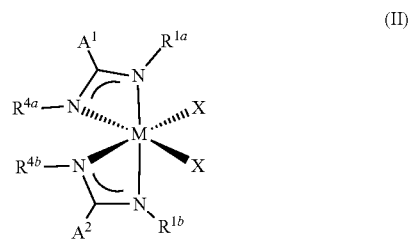

where:
$R^{1a}$, $R^{1b}$, $R^{4a}$, $R^{4b}$, M and X are as defined in formula (I), and $A^1$ and $A^2$ are independently A as defined in formula (I).

3. The process according to claim 2, wherein m is 2, n is 2, and $R^{4a}$ and $R^{4b}$ are covalently linked, whereby the metal-ligand complex comprises a divalent radical Q consisting of the two covalently linked groups $R^{4a}$ and $R^{4b}$ and the metal-ligand complex has a structure according to formula (III):

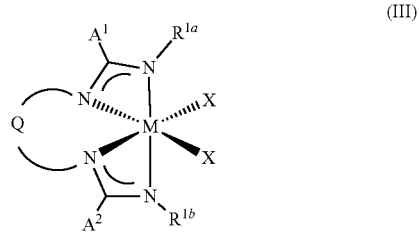

where:
Q is $(C_2$-$C_{12})$alkylene, $(C_2$-$C_{12})$ heteroalkylene, $(C_6$-$C_{50})$ arylene, $(C_4$-$C_{50})$ heteroarylene, $(-CH_2Si(R^C)_2CH_2-)$, $(-CH_2CH_2Si(R^C)_2CH_2CH_2-)$, $(-CH_2Ge(R^C)_2CH_2-)$, or $(-CH_2CH_2Ge(R^C)_2CH_2CH_2-)$, where each $R^C$ is unsubstituted $(C_1$-$C_{18})$ hydrocarbyl or $-H$; and $R^{1a}$, $R^{1b}$, $R^{4a}$, $R^{4b}$, M, and X are as defined in formula (I) and $A^1$ and $A^2$ are as defined in formula (II).

4. The process of claim 1, wherein each X is identical when n is 2 or 3.

5. The process of claim 1, wherein each X is benzyl, chloro, $-CH_2SiMe_3$, or phenyl.

6. The process of claim 1, wherein each $R^1$, $R^{1a}$, or $R^{1a}$ and each $R^4$, $R^{4a}$, or $R^{4b}$ are independently $(C_1$-$C_{20})$alkyl or $(C_1$-$C_{20})$ aryl.

7. The process of claim 1, wherein each $R^1$ and each $R^4$ are independently benzyl, cyclohexyl, 2,6-dimethylphenyl, tert-butyl, or ethyl.

8. The process of claim 3, wherein $R^{1a}$ and $R^{1b}$ are 2-propyl.

9. The process of claim 1, wherein each A has one of the following structures:

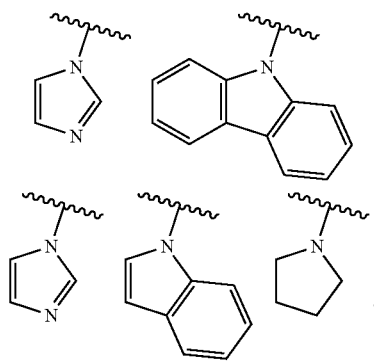

10. The process of claim 1, wherein $R^{1a}$, $R^{1b}$, $R^{4a}$, and $R^{4b}$ are independently chosen from 3,5-di-tert-butylphenyl; 2,4,6-trimethylphenyl; 2,6-dimethylphenyl; 2,4,6-triisopropylphenyl; 2,6-di-iso-propylphenyl; benzyl; cyclohexyl, or 2-propyl.

11. The process according to claim 3, wherein Q is chosen from $-(CH_2)_x-$, where x is from 2 to 5.

12. The process according to claim 3, wherein Q is $-(CH_2)_4-$.

13. The process of claim 1, wherein the catalyst system further comprises a chain transfer agent.

14. The process according to claim 13, wherein the chain transfer agent is diethylzinc.

* * * * *